United States Patent
Nakashima

(10) Patent No.: US 11,188,200 B2
(45) Date of Patent: Nov. 30, 2021

(54) DISPLAY TERMINAL, METHOD OF CONTROLLING DISPLAY OF INFORMATION, AND STORAGE MEDIUM

(71) Applicant: Akihiro Nakashima, Kanagawa (JP)

(72) Inventor: Akihiro Nakashima, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 35 days.

(21) Appl. No.: 16/574,098

(22) Filed: Sep. 18, 2019

(65) Prior Publication Data
US 2020/0104022 A1  Apr. 2, 2020

(30) Foreign Application Priority Data
Sep. 28, 2018 (JP) .............................. JP2018-184084

(51) Int. Cl.
 *G06F 3/0484* (2013.01)
 *G06F 3/0482* (2013.01)
 *G06F 9/451* (2018.01)
 *G06F 16/957* (2019.01)

(52) U.S. Cl.
 CPC .......... *G06F 3/0484* (2013.01); *G06F 3/0482* (2013.01); *G06F 9/451* (2018.02); *G06F 16/9577* (2019.01); *G06F 2203/04803* (2013.01)

(58) Field of Classification Search
 None
 See application file for complete search history.

(56) References Cited

U.S. PATENT DOCUMENTS

| 5,819,055 A * | 10/1998 | MacLean | G06F 3/0481 715/798 |
| 6,008,809 A * | 12/1999 | Brooks | G06F 3/0481 715/792 |
| 6,023,272 A * | 2/2000 | Malamud | G06F 9/451 715/779 |
| 2003/0210274 A1* | 11/2003 | Subramanian | G06F 3/0481 715/809 |
| 2006/0161859 A1* | 7/2006 | Holecek | G06F 3/048 715/781 |

(Continued)

FOREIGN PATENT DOCUMENTS

JP    2013-161407    8/2013

OTHER PUBLICATIONS

Kaufman, "The Best Application Launchers and Docks for Organizing Your Desktop," Jul. 11, 2017, https://www.howtogeek.com/116163/the-best-application-launchers-and-docks-for-organizing-your-desktop/.*

*Primary Examiner* — Ryan Barrett
(74) *Attorney, Agent, or Firm* — Xsensus LLP

(57) ABSTRACT

A display terminal includes a memory that stores a second application used for activating a first application that causes the display terminal to display a first operation display screen on a display, and circuitry configured to display, on the display, the first operation display screen by the first application, and a second operation display screen by the second application, the second operation display screen used for receiving an operation to cause specific processing and including a reception area, and change a display position of the first operation display screen on the display in response to a selection of the reception area for changing a display position of the second operation display screen on the display.

23 Claims, 44 Drawing Sheets

(56) References Cited

U.S. PATENT DOCUMENTS

| | | | |
|---|---|---|---|
| 2009/0307627 A1* | 12/2009 | Adams | G06F 9/451 |
| | | | 715/781 |
| 2011/0078625 A1* | 3/2011 | Mumford | G06F 9/451 |
| | | | 715/804 |
| 2012/0029661 A1* | 2/2012 | Jones | G06F 3/0484 |
| | | | 700/17 |
| 2014/0137019 A1* | 5/2014 | Paulsen | G06F 3/0486 |
| | | | 715/769 |
| 2015/0378518 A1* | 12/2015 | Heydlauf | G06F 9/451 |
| | | | 715/804 |
| 2017/0134446 A1 | 5/2017 | Kitada | |

* cited by examiner

PROCESS MANAGEMENT TABLE

| PROCESS ID | APPLICATION NAME | LINK SETTING | OPERATION DISPLAY SCREEN INFORMATION | | | |
|---|---|---|---|---|---|---|
| | | | WINDOWS HANDLE | DISPLAY INFORMATION | | |
| | | | | DISPLAY POSITION (X, Y) | DISPLAY SIZE (W, H) | DISPLAY/ NON-DISPLAY |
| L | MENU BAR (LAUNCHER) | - | 00000001 | (0,0) | (50,500) | DISPLAY |
| 1 | SCHEDULE VIEWER | ON | 00000003 | (100,200) | (400,300) | NON-DISPLAY |
| 2 | FILE VIEWER | OFF | 00000005 | (200,400) | (500,200) | DISPLAY |
| 3 | BROWSER APPLICATION | ... | 00000007 | ... | ... | ... |
| 4 | ... | ... | ... | ... | ... | ... |

USER AUTHENTICATION MANAGEMENT TABLE 6001

| USER ID | USER NAME | ORGANIZATION ID | PASSWORD |
|---|---|---|---|
| u0001 | TARO RICOH | o1001 | p9991 |
| u0002 | GORO KONDO | o1002 | p9992 |
| ... | ... | ... | ... |

FIG. 9B

ACCESS MANAGEMENT TABLE 6002

| ORGANIZATION ID | ACCESS ID | ACCESS PASSWORD |
|---|---|---|
| o1001 | a1001 | p1001 |
| ... | ... | ... |

FIG. 9C

PLAN MANAGEMENT TABLE 6003

PLANNED EVENT ID: pe0001, EXECUTED EVENT ID: ee0001

| ORGANI-ZATION ID | USER ID OF USER WHO MAKES RE-SERVATION | PARTICI-PATION | USER NAME OF USER WHO MAKES RESERVATION | SCHEDULED START DATE AND TIME | SCHEDULED END DATE AND TIME | EVENT NAME | USER ID OF OTHER PARTICI-PANT | PARTICI-PATION | NAME OF OTHER PARTICIPANT | FILE DATA |
|---|---|---|---|---|---|---|---|---|---|---|
| o1001 | u0001 | YES | TARO RICOH | 9:00 | 10:00 | POLICY MAKING MEETING | u0000 | YES | KOKUBAN DENSHI | ○○○.ppt |
|  |  |  |  |  |  |  | u0002 | YES | GORO KONDO | x x x.xsl |
|  |  |  |  |  |  |  | u0003 | YES | YOSHIO YAMASHITA | ... |

FIG. 10A

EXECUTED EVENT MANAGEMENT TABLE 6004

| PROJECT ID | EXECUTED EVENT ID |
|---|---|
| p0001 | ee0001, ee0011, ee0021 |
| p0002 | ee0002, ee0012 |
| ... | ... |

FIG. 10B

CONTENT MANAGEMENT TABLE 6005

EXECUTED EVENT ID: ee0001

| CONTENT PROCESSING ID | TYPE OF CONTENT PROCESSING | DETAIL OF CONTENT | START DATE | END DATE |
|---|---|---|---|---|
| c0001 | SOUND RECORDING | ・SOUND DATA URL: http://××× | 2018/1/15 9:00 | 2018/1/15 9:15 |
| c0002 | SNAP SHOT | ・IMAGE DATA URL: http://××× | 2018/1/15 9:00 | 2018/1/15 9:00 |
| c0003 | AUDIO TEXT RECEPTION | ・TEXT DATA URL: http://××× | 2018/1/15 9:00 | 2018/1/15 9:00 |
| ... | ... | ... | ... | ... |
| c0101 | ACTION ITEM OCCURRED | ・ACTION ITEM EXECUTING USER ID: u0003<br>・DUE DATE: 2018/1/30<br>・IMAGE DATA URL: http://××× | 2018/1/15 9:39 | 2018/1/15 9:39 |
| c0102 | SNAP SHOT | ・IMAGE DATA URL: http://××× | 2018/1/15 9:40 | 2018/1/15 9:40 |
| c0103 | AUDIO TEXT RECEPTION | ・TEXT DATA URL: http://××× | 2018/1/15 9:40 | 2018/1/15 9:40 |
| c0104 | SOUND RECORDING | ・SOUND DATA URL: http://××× | 2018/1/15 9:45 | 2018/1/15 10:00 |
| ... | ... | ... | ... | ... |
| c0201 | REFERENCE SENDING | ・REFERENCE DATA URL: http://××× | 2018/1/15 10:00 | 2018/1/15 10:00 |

FIG. 11A

USER AUTHENTICATION MANAGEMENT TABLE — 8001

| USER ID | ORGANIZATION ID | PASSWORD |
|---|---|---|
| u0001 | o1001 | p9991 |
| u0002 | o1002 | p9992 |
| ... | ... | ... |

FIG. 11B

USER MANAGEMENT TABLE — 8002

ORGANIZATION ID: o1001

| USER ID | USER NAME |
|---|---|
| u0001 | TARO RICOH |
| u0002 | GORO KONDO |
| u0003 | YOSHIO YAMASHITA |
| u0004 | Jim Berger |
| ... | ... |

FIG. 11C

SHARED RESOURCE MANAGEMENT TABLE — 8003

ORGANIZATION ID: o1001

| SHARED RESOURCE ID | SHARED RESOURCE NAME |
|---|---|
| s1001 | MEETING ROOM X |
| s1002 | MEETING ROOM Y |
| ... | ... |

FIG. 12A

SHARED RESOURCE RESERVATION MANAGEMENT TABLE

ORGANIZATION ID: o1001

| SHARED RESOURCE ID | SHARED RESOURCE NAME | USER ID OF COMMUNI-CATION TERMINAL | USER NAME OF USER WHO MAKES RESERVATION | SCHEDULED USE START DATE AND TIME | SCHEDULED USE END DATE AND TIME | EVENT NAME |
|---|---|---|---|---|---|---|
| s1001 | MEETING ROOM X | u0000 | u0001 | 2018/1/15 9:00 | 2018/1/15 10:00 | POLICY MAKING MEETING |
| s1001 | MEETING ROOM X | u0000 | u0004 | 2018/1/15 10:00 | 2018/1/15 11:00 | REGULAR MEETING |
| s1001 | MEETING ROOM X | u0000 | u0002 | 2018/1/15 10:11 | 2018/1/15 15:00 | MANAGEMENT MEETING |
| s1002 | MEETING ROOM Y | u1000 | u0005 | 2018/1/15 9:00 | 2018/1/15 10:00 | NEW PRODUCT DEVELOPMENT MEETING |
| ... | ... | ... | ... | ... | ... | ... |

FIG. 12B

EVENT MANAGEMENT TABLE

PLANNED EVENT ID: pa0001

| ORGANIZA-TION ID | USER ID | USER NAME | SCHEDULED EVENT START DATE AND TIME | SCHEDULED EVENT END DATE AND TIME | EVENT NAME | MEMO | FILE DATA |
|---|---|---|---|---|---|---|---|
| o1001 | u0000 | KOKUBAN DENSHI | 2018/1/15 9:00 | 2018/1/15 10:00 | POLICY MAKING MEETING | ... | ◦◦◦.ppt |
| o1001 | u0001 | TARO RICOH | 2018/1/15 9:00 | 2018/1/15 10:00 | POLICY MAKING MEETING | ... | x x x.xsl |
| o1001 | u0002 | GORO KONDO | 2018/1/15 9:00 | 2018/1/15 10:00 | POLICY MAKING MEETING | ... | ... |
| o1001 | u0003 | YOSHIO YAMASHITA | 2018/1/15 9:00 | 2018/1/15 10:00 | POLICY MAKING MEETING | ... | |

FIG. 13A

SERVER AUTHENTICATION MANAGEMENT TABLE ~8006

| ACCESS ID | ACCESS PASSWORD |
|---|---|
| a1001 | p1001 |
| a1002 | p1002 |
| ... | ... |

FIG. 13B

PROJECT MEMBER MANAGEMENT TABLE ~8007

ORGANIZATION ID: o1001

| PROJECT ID | PROJECT NAME | USER ID OF PROJECT MEMBER |
|---|---|---|
| p0001 | NEXT YEAR'S POLICY | u0000, u0001, u0002, u0003 |
| p0002 | PRODUCT DEVELOPMENT PROJECT | u0000, u0004, u0005 |
| p0003 | NEW PRODUCT DEVELOPMENT | u0000, u0005, u0006, u0007 |
| ... | ... | ... |

FIG. 14A

EXECUTED EVENT HISTORY MANAGEMENT TABLE

PROJECT ID: p0001, EXECUTED EVENT ID: ee0001                                                                                                    8008

| CONTENT PROCESSING ID | TYPE OF CONTENT PROCESSING | DETAIL OF CONTENT | START DATE | END DATE |
|---|---|---|---|---|
| c0001 | SOUND RECORDING | ·SOUND DATA URL: c://··· | 2018/1/15 9:00 | 2018/1/15 9:15 |
| c0002 | SNAP SHOT | ·IMAGE DATA URL: c://··· | 2018/1/15 9:00 | 2018/1/15 9:00 |
| c0003 | AUDIO TEXT RECEPTION | ·TEXT DATA URL: c://··· | 2018/1/15 9:00 | 2018/1/15 9:00 |
| ··· | ··· | ··· | ··· | ··· |
| c0101 | ACTION ITEM OCCURRED | ·ACTION ITEM EXECUTING USER ID: u0003<br>·DUE DATE: 2018/1/30<br>·IMAGE DATA URL: c://··· | 2018/1/15 9:39 | 2018/1/15 9:39 |
| c0102 | SNAP SHOT | ·IMAGE DATA URL: c://··· | 2018/1/15 9:40 | 2018/1/15 9:40 |
| c0103 | AUDIO TEXT RECEPTION | ·TEXT DATA URL: c://··· | 2018/1/15 9:40 | 2018/1/15 9:40 |
| c0104 | SOUND RECORDING | ·SOUND DATA URL: c://··· | 2018/1/15 9:45 | 2018/1/15 10:00 |
| ··· | ··· | ··· | ··· | ··· |
| c0201 | REFERENCE SENDING | ·REFERENCE DATA URL: c://··· | 2018/1/15 10:00 | 2018/1/15 10:00 |

FIG. 14B

EXECUTED EVENT MANAGEMENT TABLE                        8009

| EXECUTED EVENT ID | EVENT NAME | START DATE | END DATE |
|---|---|---|---|
| ee0001 | POLICY DECISION MEETING | 2018/1/15 9:00 | 2018/1/15 10:00 |
| ee0002 | PERIODIC MEETING | 2018/1/15 10:00 | 2018/1/15 11:00 |
| ··· | ··· | ··· | ··· |

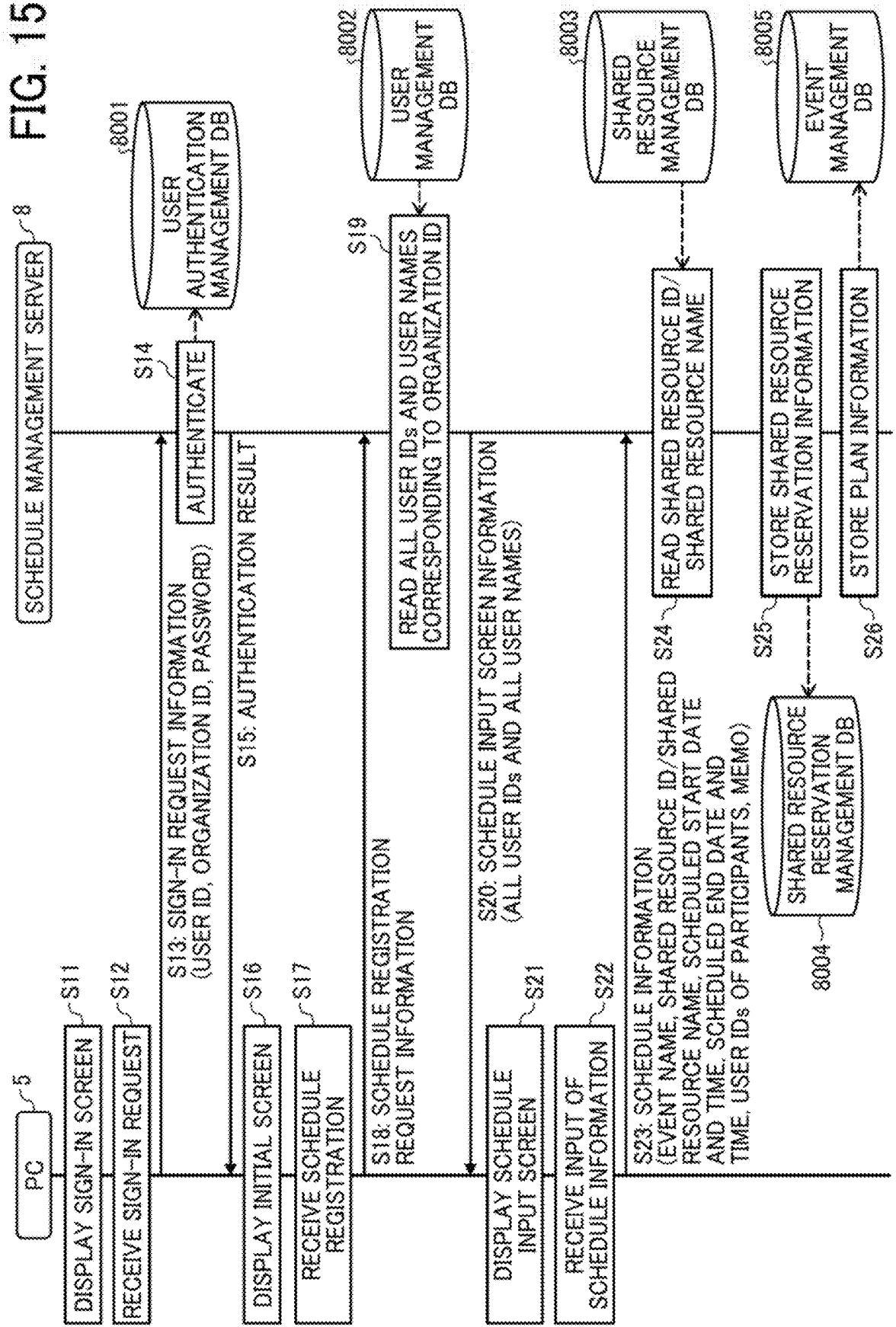

FIG. 18

SCHEDULE INPUT

EVENT NAME: POLICY MAKING MEETING
SHARED RESOURCE ID/ SHARED RESOURCE NAME: MEETING ROOM X
SCHEDULED START DATE AND TIME: 2018/1/15 9:00
SCHEDULED END DATE AND TIME: 2018/1/15 10:00
MEMO:
AGENDA
1) CHECK PROGRESS OF ACTION ITEMS
2) DISCUSS PENDING TOPICS

[PARTICIPANTS]
USER NAME OF USER WHO MAKES RESERVATION: TARO RICOH
NAME OF OTHER PARTICIPANTS:
REIJI ABE
...
GORO KONDO

OK
CANCEL

FIG. 21

RESERVATION LIST — 231

SHARED RESOURCE NAME: MEETING ROOM X — 232

TODAY : 2018/1/15

| SCHEDULED USE START/END TIME | EVENT NAME | USER NAME OF USER WHO MAKES RESERVATION | |
|---|---|---|---|
| 9:00 ~ 10:00 | POLICY MAKING MEETING | TARO RICOH | START |
| 10:00 ~ 11:00 | REGULAR MEETING | Jim Berger | START |
| 11:00 ~ 12:00 | MANAGEMENT MEETING | YOSHIO YAMASHITA | START |

• • •

230

235s, 236s, 237s

EVENT INFORMATION 235
EVENT INFORMATION 236
EVENT INFORMATION 237

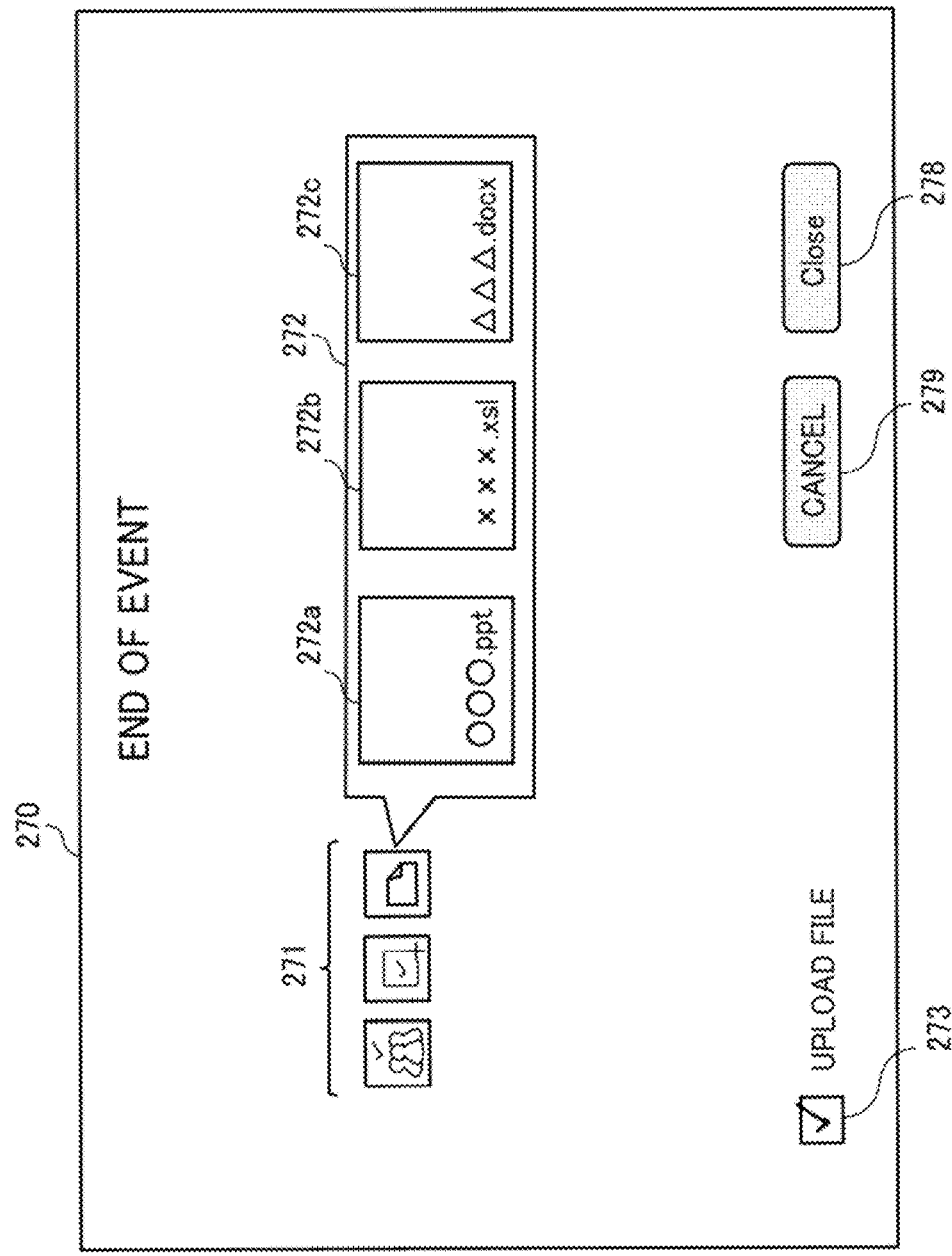

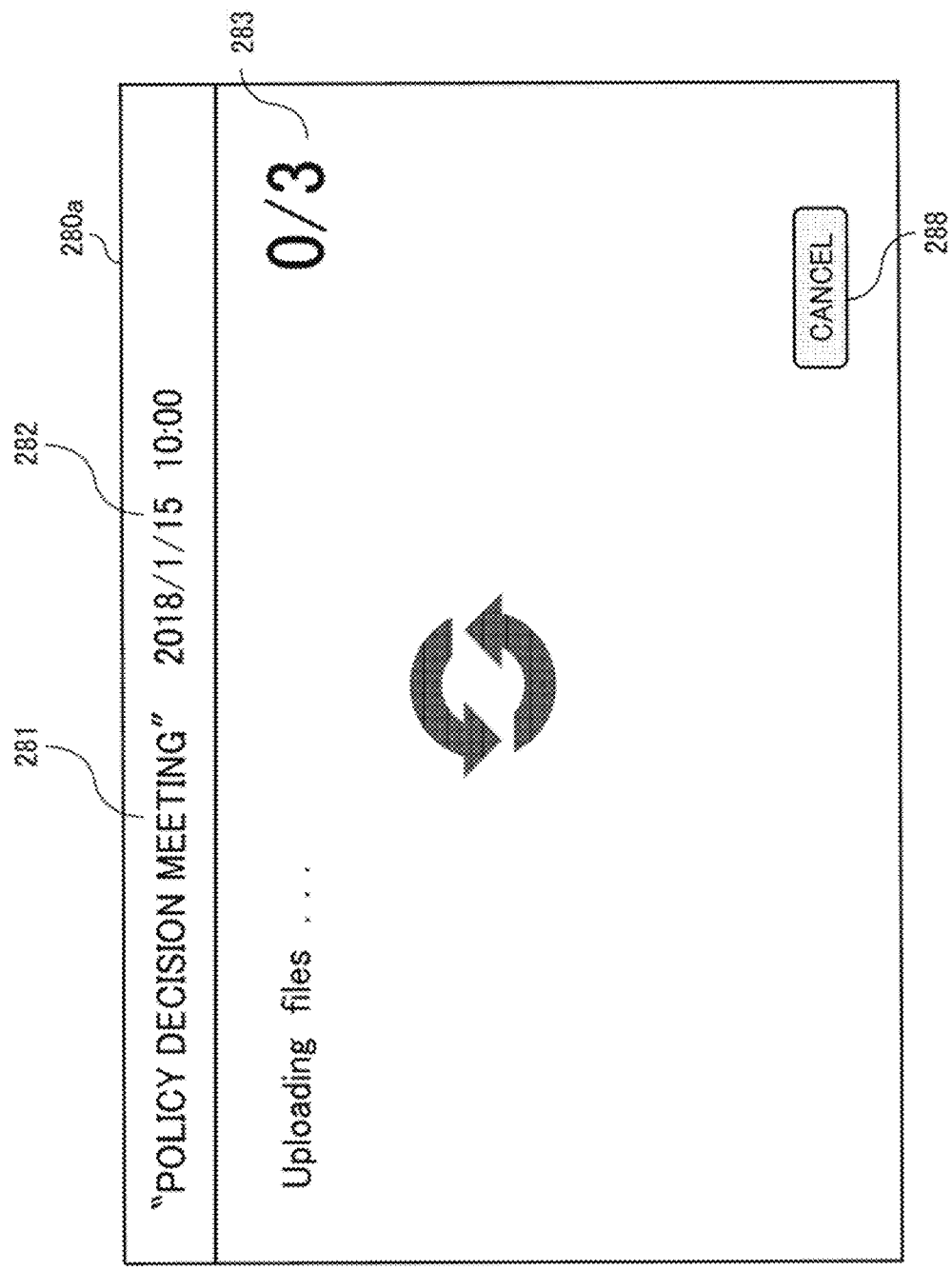

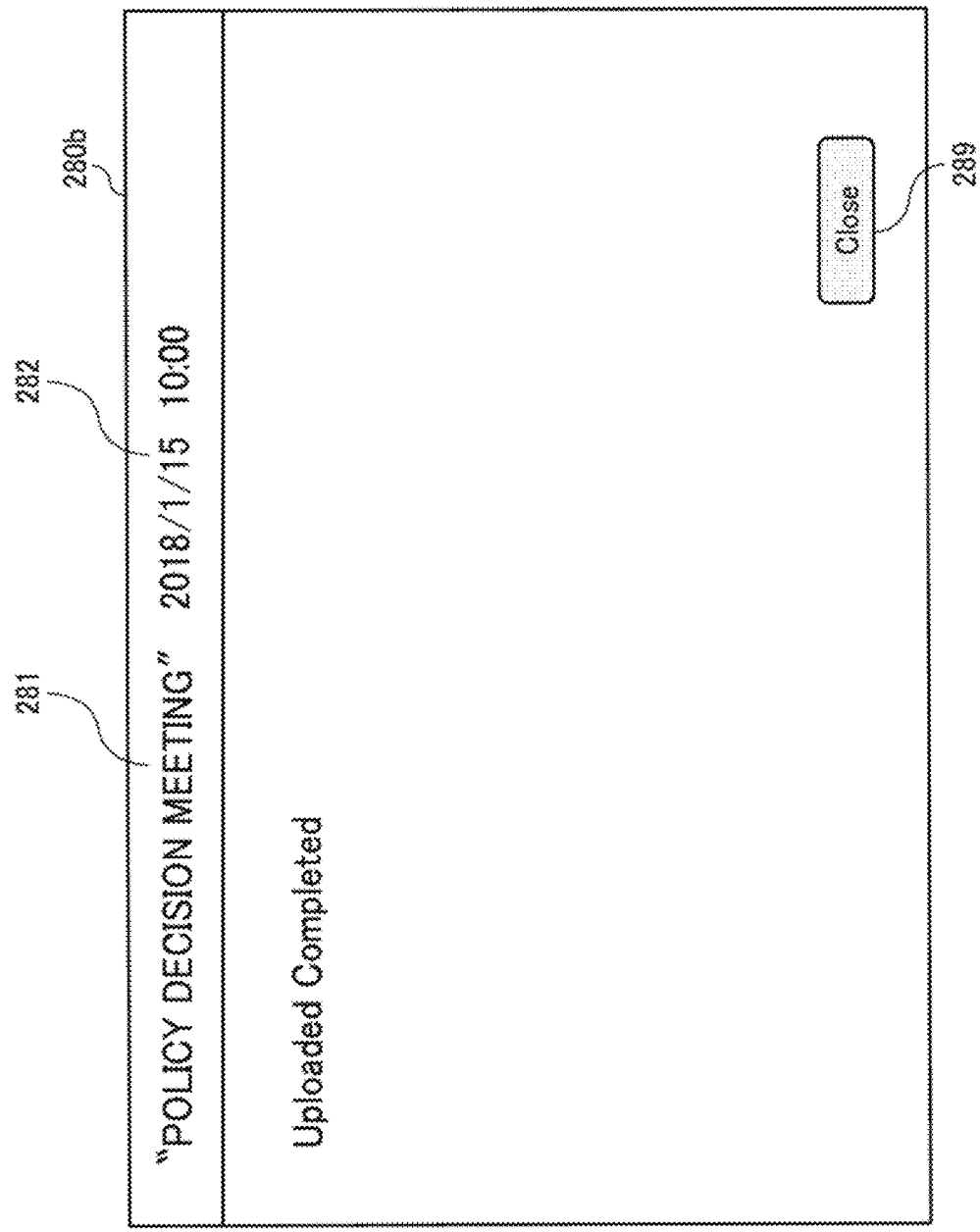

DISPLAY TERMINAL, METHOD OF CONTROLLING DISPLAY OF INFORMATION, AND STORAGE MEDIUM

CROSS-REFERENCE TO RELATED APPLICATION

This application claims priority pursuant to 35 U.S.C. § 119(a) to Japanese Patent Application No. 2018-184084, filed on Sep. 28, 2018 in the Japan Patent Office, the disclosure of which are incorporated by reference herein in its entirety.

BACKGROUND

Technical Field

This disclosure relates to a display terminal, a method of controlling display of information on the display terminal, and a non-transitory computer readable storage medium.

Background Art

Display terminals, such as electronic whiteboards, have been used for meetings held in various entities, such as companies, educational institutions, and administrative agencies, in which a background image is displayed on a display of an electronic whiteboard and a user can draw stroke images, such as characters, numbers, and figures on the background image. The display terminal is installed with a plurality of applications that can be operated on an operating system.

The applications installed on the display terminal include an external service application for implementing multiple functions, and a launcher application for activating the external service application. As to the display terminal installed with a plurality of applications, a method of controlling display by using windows of the plurality of applications is known.

SUMMARY

As one aspect of the present invention, a display terminal is devised. The display terminal includes a memory that stores a second application used for activating a first application that causes the display terminal to display a first operation display screen on a display, and circuitry configured to display, on the display, the first operation display screen by the first application, and a second operation display screen by the second application, the second operation display screen used for receiving an operation to cause specific processing and including a reception area, and change a display position of the first operation display screen on the display in response to a selection of the reception area for changing a display position of the second operation display screen on the display.

As another aspect of the present invention, a method of controlling display of information on a display terminal, installed with a second application used for activating a first application that causes the display terminal to display a first operation display screen on a display, is devised. The method includes displaying, on the display, the first operation display screen by the first application, and a second operation display screen by the second application, the second operation display screen used for receiving an operation to cause specific processing and including a reception area, and changing a display position of the first operation display screen on the display in response to a selection of the reception area for changing a display position of the second operation display screen on the display.

As another aspect of the present invention, a non-transitory computer readable storage medium storing one or more instructions that, when executed by one or more processors, cause the one or more processors to perform a method of controlling display of information on a display terminal, installed with a second application used for activating a first application that causes the display terminal to display a first operation display screen on a display, is devised. The method includes displaying, on the display, the first operation display screen by the first application, and a second operation display screen by the second application, the second operation display screen used for receiving an operation to cause specific processing and including a reception area, and changing a display position of the first operation display screen on the display in response to a selection of the reception area for changing a display position of the second operation display screen on the display.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 8 is a conceptual diagram illustrating a process management table, according to an embodiment of the disclosure;

FIG. 9A is a conceptual diagram illustrating a user authentication management table, according to an embodiment of the disclosure;

FIG. 9B is a conceptual diagram illustrating an access management table, according to an embodiment of the disclosure;

FIG. 9C is a conceptual diagram illustrating a plan management table, according to an embodiment of the disclosure;

FIG. 10A is a conceptual diagram illustrating an executed event management table, according to an embodiment of the disclosure;

FIG. 10B is a conceptual diagram illustrating a content management table, according to an embodiment of the disclosure;

FIG. 11A is a conceptual diagram illustrating a user authentication management table, according to an embodiment of the disclosure:

FIG. 1B is a conceptual diagram illustrating a user management table, according to an embodiment of the disclosure:

FIG. 11C is a conceptual diagram illustrating a shared resource management table, according to an embodiment of the disclosure;

FIG. 12A is a conceptual diagram illustrating a shared resource reservation management table, according to an embodiment of the disclosure;

FIG. 12B is a conceptual diagram illustrating an event management table, according to an embodiment of the disclosure;

FIG. 13A is a conceptual diagram illustrating a server authentication management table, according to an embodiment of the disclosure;

FIG. 13B is a conceptual diagram illustrating a project member management table, according to an embodiment of the disclosure;

FIG. 14A is a conceptual diagram illustrating an executed event history management table, according to an embodiment of the disclosure;

FIG. 14B is a conceptual diagram illustrating an executed event management table, according to an embodiment of the disclosure;

FIG. 15 is a sequence diagram illustrating a process of registering a schedule, according to an embodiment of the disclosure;

FIG. 18 is an illustration of a schedule input screen, according to an embodiment of the disclosure;

FIG. 21 is an illustration of a reservation list screen for shared resource, according to an embodiment of the disclosure:

FIG. 41 is an example of an event end screen displayed on an electronic whiteboard, according to an embodiment of the disclosure;

FIG. 42 is an example of an upload screen of file data displayed on an electronic whiteboard, according to an embodiment of the disclosure; and FIG. 43 is an example of an upload completion screen of file data displayed on an electronic whiteboard, according to an embodiment of the disclosure;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise.

Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a sharing system 1 according to an embodiment with reference to FIG. 1. In this disclosure, "file" represents "electronic file."

System Configuration:

Hereinafter, a description is given of an overview of a system configuration of the sharing system 1 with reference to FIG. 1. FIG. 1 is a schematic diagram illustrating an overview of the sharing system 1 according to an embodiment.

Figure 1:
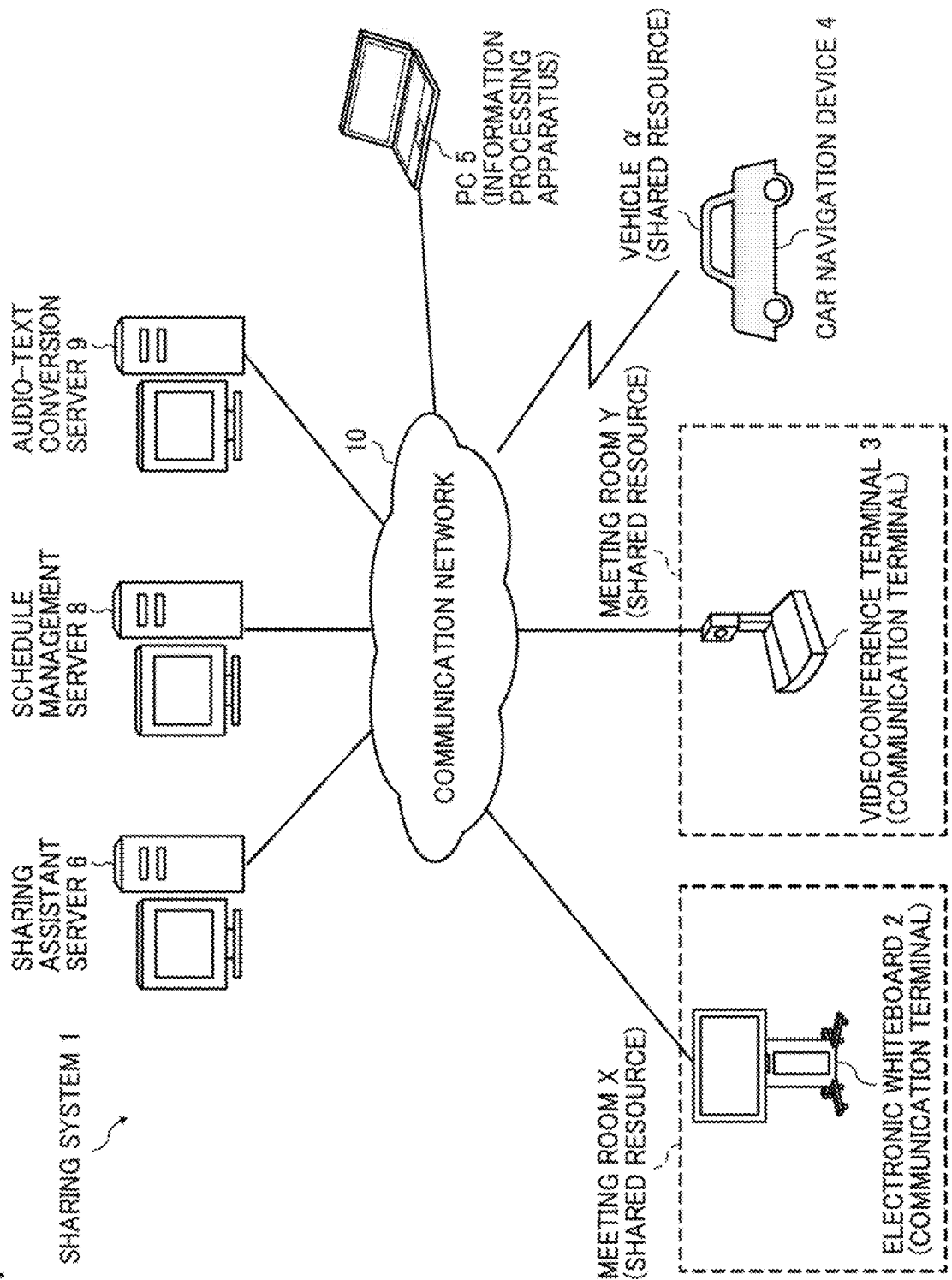
FIG. 1 is a schematic diagram illustrating a configuration of a sharing system according to an embodiment of the disclosure.

As illustrated in FIG. 1, the sharing system 1 includes, for example, an electronic whiteboard 2, a videoconference terminal 3, a car navigation device 4, a personal computer (PC) 5, a sharing assistant server 6, a schedule management server 8, and an audio-text conversion server 9.

The electronic whiteboard 2, the videoconference terminal 3, the car navigation device 4, the PC 5, the sharing assistant server 6, and the schedule management server 8 can communicate each other through a communication network 10. The communication network 10 is implemented, for example, by the Internet, a mobile communication network, and a local area network (LAN). The communication network 10 may include, in addition to a wired network, a wireless network in compliance with 3rd Generation (3G), Worldwide Interoperability for Microwave Access (WiMAX), Long Term Evolution (LTE), and the like.

The electronic whiteboard 2 is used in a meeting room X. The videoconference terminal 3 is used in a meeting room Y. The car navigation device 4 is used with a vehicle α. The vehicle α can be used as a vehicle for a car sharing, which means that the vehicle α can be shared by a plurality of users. The vehicle includes, for example, a car, a motorcycle, a bicycle, and a wheel chair. In this disclosure, the shared resource can be used as a target for reservation by each user.

The "shared resource," which may be also referred to as the "resource to be shared," includes, for example, a resource, a service, a space (room), a place, and information each of which is shared to be used by a plurality of users, groups of people, or the like, for example. The meeting room X, the meeting room Y, and the vehicle α are examples of the shared resources that can be shared by the plurality of users. Examples of information used as the shared resource include information on an account assigned to the user, but not limited thereto. For example, there is a case that an organization is assigned with one account only that allows any user in the organization to use a specific service provided on the Internet. Hereinafter, the shared resource may mean one or more specific shared resources.

The electronic whiteboard 2, videoconference terminal 3, and car navigation device 4 are examples of the display terminal in this description, but not limited thereto. Further, the display terminal provided for the vehicle α is not limited to the car navigation device 4. For example, a smart phone installed with a car navigation application can be provided for the vehicle α.

The PC 5, which is an information processing apparatus, is an example of a registration apparatus used by a user for registering, to the schedule management server 8, a reservation for use of each shared resource and an event scheduled by the user. The event is, for example, a meeting, a conference, a gathering, an assembly, a counseling, a driving, a riding, or the like. The event includes, for example, conferences, meetings, gathering, assembly, consultation, discussion, driving, boarding or moving.

The sharing assistant server 6, which can be implemented by one or more computers, remotely assists each display terminal when sharing the shared resource.

The schedule management server 8, which can be implemented by one or more computers, manages or controls the reservation for using each resource and the schedule of each user.

The audio-text conversion server 9, which can be implemented by one or more computers, converts audio data (e.g., sound data) received from an external computer (e.g., sharing assistant server 6) into text data.

In this disclosure, the sharing assistant server 6, the schedule management server 8 and the audio-text conversion server 9 can be collectively referred to as a management system or control system. The management system may be, for example, one or more servers that provide a part of all of the functions of the sharing assistant server 6, the schedule management server 8 and the audio-text conversion server 9. Each of the sharing assistant server 6, the schedule management server 8 and the audio-text conversion server 9 function as the information processing apparatus.

Hardware Configuration:

Hereinafter, a description is given of a hardware configuration of the apparatus or terminal used in the sharing system 1 with reference to FIGS. 2 to 5.

Figure 2:
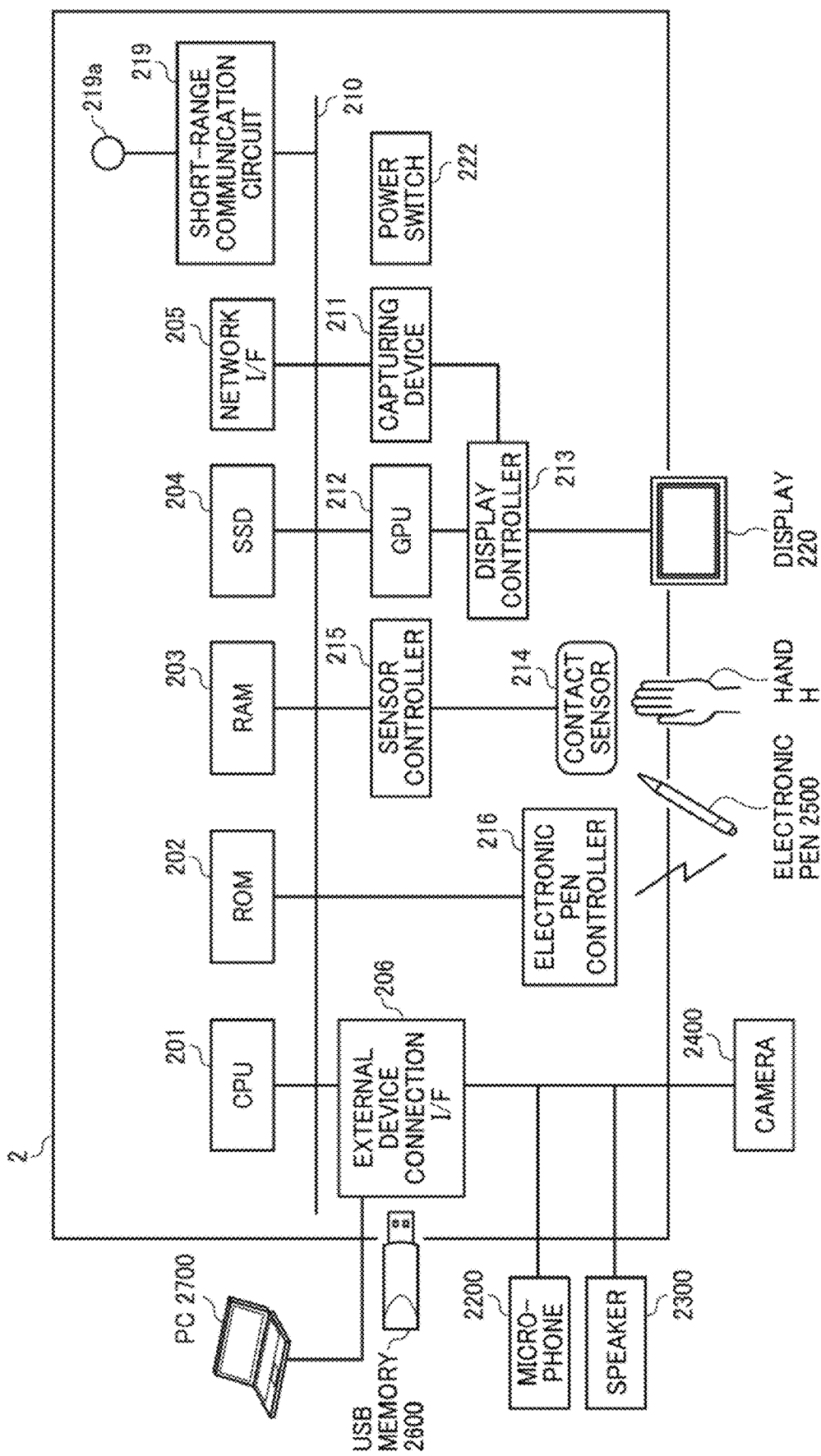
FIG. 2 is a schematic block diagram illustrating a hardware configuration of an electronic whiteboard, according to an embodiment of the disclosure.

Hardware Configuration of Electronic Whiteboard:

FIG. 2 is an example block diagram of a hardware configuration of the electronic whiteboard 2. As illustrated in FIG. 2, the electronic whiteboard 2 includes, for example, a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls the entire operation of the electronic whiteboard 2.

The ROM 202 stores programs including an initial program loader (IPL) to boot the CPU 201. The RAM 203 is used as a work area for the CPU 201. The SSD 204 stores various types of data, such as a control program for the electronic whiteboard 2. The network I/F 205 controls communication established with an external device through the communication network 10. The external device connection I/F 206 controls communication with a universal serial bus (USB) memory 2600, a PC 2700, and external devices, such as a microphone 2200, a speaker 2300, and, a camera 2400.

The electronic whiteboard 2 further includes, for example, a capturing device 211, a graphics processing unit (GPU) 212, a display controller 213, a contact sensor 214, a sensor controller 215, an electronic pen controller 216, a short-range communication circuit 219, an antenna 219*a* for the short-range communication circuit 219, and a power switch 222.

The capturing device 211 acquires image data of an image displayed on a display 220 under the control of the display controller 213, and stores the image data in the RAM 203 or the like. The GPU 212 is a semiconductor chip dedicated to graphics. The display controller 213 controls and manages a screen display to output an image captured by the capturing device 211 and processed at the GPU 212 to the display 220 of the electronic whiteboard 2.

The contact sensor 214 detects a contact made onto the display 220 with an electronic pen 2500 or a user's hand H. The sensor controller 215 controls the contact sensor 214. The contact sensor 214 detects an input of a specific coordinate and a detection of the specific coordinate on the display 220 using the infrared blocking system. To implement the method of inputting and detecting the specific coordinate, the display 220 is provided with two light emitting/receiving elements disposed on both upper side ends of the display 220, and a reflector frame surrounding the sides of the display 220. The light emitting/receiving elements emit a plurality of infrared rays in parallel to a surface of the display 220, and then the plurality of infrared rays is reflected by the reflector frame, in which the light emitting/receiving elements receive the infrared rays coming back along an optical path of the emitted infrared rays. The contact sensor 214 outputs an identifier (ID) of the infrared ray that is blocked by an object (e.g., user's hand) after being emitted from the light emitting/receiving elements, to the sensor controller 215. Based on the ID of the infrared ray, the sensor controller 215 detects the specific coordinate that is touched by the object.

The electronic pen controller 216 communicates with the electronic pen 2500 to detect a touch by using the tip or bottom of the electronic pen 2500 to the display 220. The short-range communication circuit 219 is a communication circuit that communicates in compliance with the near field communication (NFC), the Bluetooth (registered trademark) or the like. The power switch 222 turns on or off the power of the electronic whiteboard 2.

The electronic whiteboard 2 further includes a bus line 210. The bus line 210 is an address bus and a data bus, which electrically connects the components, such as the CPU 201, illustrated FIG. 2.

The contact sensor 214 is not limited to the infrared blocking system type. For example, the contact sensor 214 can be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by a contact of an object to a display. Further, in addition or in alternative to detecting a touching by the tip or bottom of the electronic pen 2500, the electronic pen controller 216 can be also configured to detect a touching by another part of the electronic pen 2500, such as a part held by a hand of the user.

Figure 3:
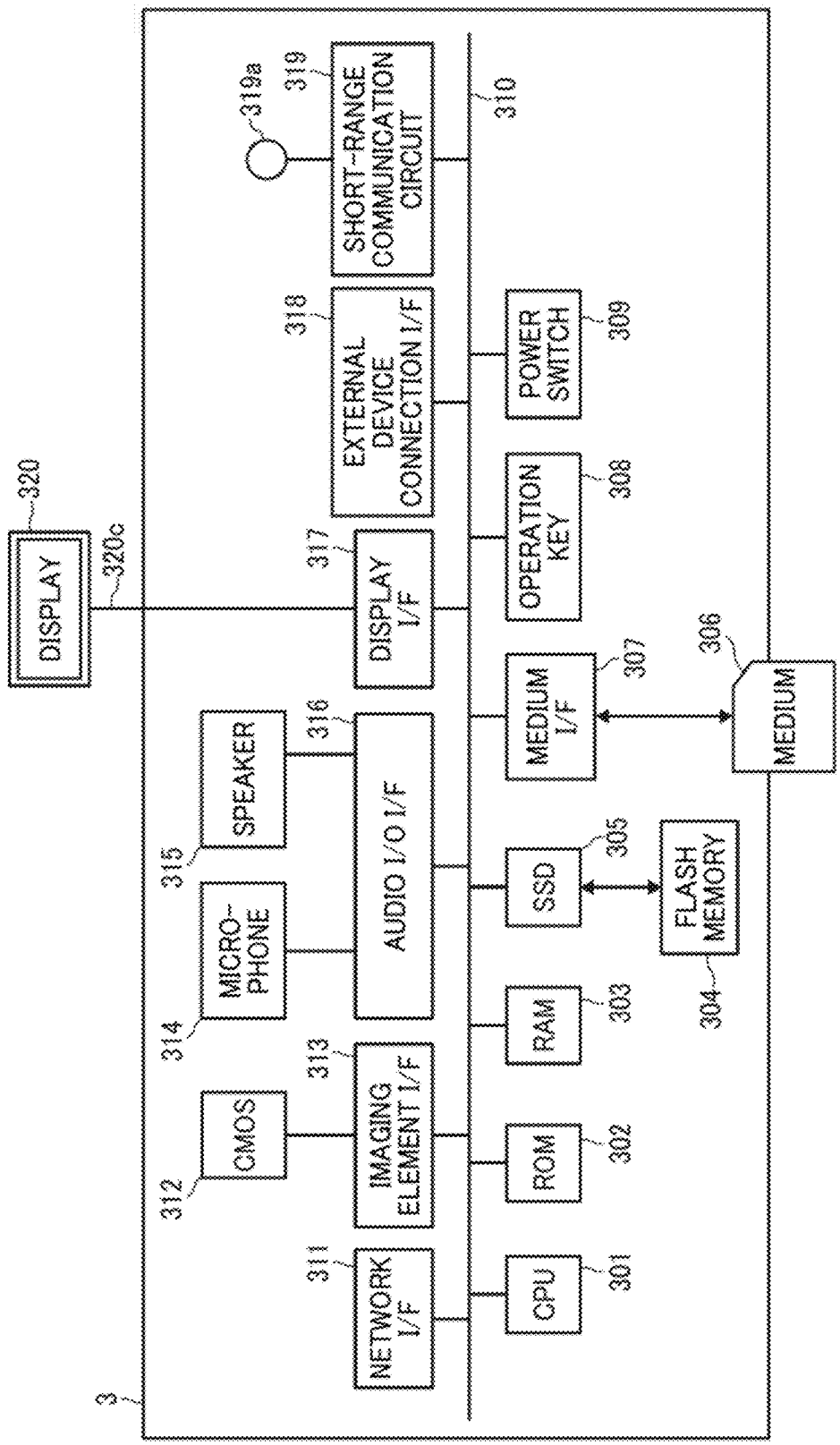
FIG. 3 is a schematic block diagram illustrating a hardware configuration of a videoconference terminal, according to an embodiment of the disclosure.

Hardware Configuration of Videoconference Terminal:

FIG. 3 is an example block diagram illustrating a hardware configuration of the videoconference terminal 3, which can be used as a teleconference terminal. As illustrated in FIG. 3, the videoconference terminal 3 includes, for example, a CPU 301, a ROM 302, a RAM 303, a flash memory 304, an SSD 305, a medium I/F 307, an operation key 308, a power switch 309, a bus line 310, a network i/F 311, a complementary metal oxide semiconductor (CMOS) sensor 312, an imaging element I/F 313, a microphone 314, a speaker 315, an audio input/output (I/O) I/F 316, a display I/F 317, an external device connection I/F 318, a short-range communication circuit 319, and an antenna 319a for the short-range communication circuit 319.

The CPU 301 controls the entire operation of the videoconference terminal 3. The ROM 302 stores programs including an initial program loader (IPL) to boot the CPU 301. The RAM 303 is used as a work area for the CPU 301.

The flash memory 304 stores various types of data such as a communication control program, image data, and audio data. The SSD 305 controls reading or writing of various types of data from or to the flash memory 304 under the control of the CPU 301. In alternative to the SSD, a hard disk drive (HDD) may be used.

The medium I/F 307 reads and/or writes (stores) data from and/or to a recording medium 306 such as a flash memory. The operation key 308, such as one or more buttons, is operated according to a user input indicating an instruction of selecting a destination of a communication from the videoconference terminal 3. The power switch 309 is a switch that receives an instruction to turn on or off the power of the videoconference terminal 3.

The network I/F 311 allows communication of data with an external device through the communication network 10 such as the Internet. The CMOS sensor 312 is an example of a built-in imaging device capable of capturing an image of an object and acquiring image data under the control of the CPU 301. The imaging element I/F 313 is a circuit that controls driving of the CMOS sensor 312.

The microphone 314 is an example of a built-in sound collecting device capable of inputting sounds. The audio input/output (I/O) I/F 316 is a circuit for processing the input and output of an audio signal between the microphone 314 and the speaker 315 under the control of the CPU 301. The display IF 317 is a circuit for transmitting the image data to the display 320, which is externally disposed, under the control of the CPU 301. The external device connection I/F 318 is an interface that connects the videoconference terminal 3 to various external devices. The short-range communication circuit 319 is a communication circuit that communicates in compliance with the NFC, the Bluetooth, and the like.

The bus line 310 is an address bus and a data bus, which electrically connects the components such as the CPU 301 illustrated in FIG. 3.

The display 320 may be a liquid crystal or organic electroluminescence (EL) display that displays an image of an object, an operation icon, or the like. The display 320 is connected to the display I/F 317 using a cable 320c. The cable 320c may be an analog red-green-blue (RGB) (video graphic array (VGA)) signal cable, a component video cable, and a cable for DisplayPort signal, high-definition multimedia interface (HDMI) (registered trademark) signal, and a digital video interactive (DVI) signal.

As an alternative to the CMOS sensor 312, another imaging element such as a charge-coupled device (CCD) sensor can be used. The external device connection i/F 318 is capable of connecting an external device such as an external camera, an external microphone, and an external speaker through a USB cable or the like. If the external camera is connected, the external camera can be driven under the control of the CPU 301 before driving the CMOS sensor 312 of built-in type. Similarly, in a case where the external microphone is connected and the external speaker is connected, the external microphone and the external speaker can be driven under the control of the CPU 301 before driving the microphone 314 of built-in type and the speaker 315 of built-in type.

The recording medium 306 is removable from the videoconference terminal 3. Further, the non-volatile memory recording is not limited to the flash memory 304. The non-volatile memory can be any non-volatile memory that reads and writes data under the control of the CPU 301, such as an electrically erasable and programmable read-only memory (EEPROM).

Figure 4:
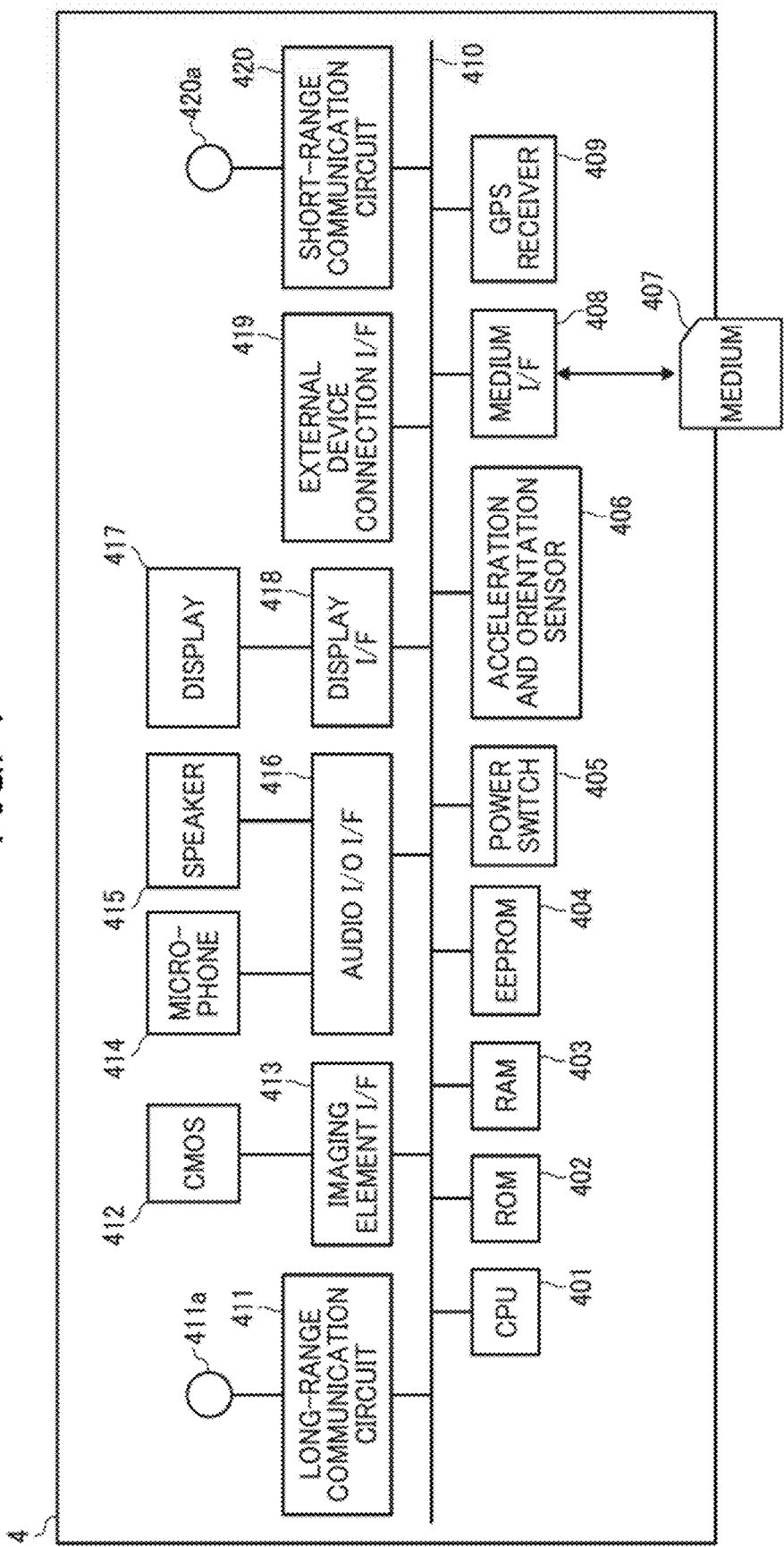
FIG. 4 is a schematic block diagram illustrating a hardware configuration of a car navigation device, according to an embodiment of the disclosure.

Hardware Configuration of Car Navigation Device:

FIG. 4 is an example block diagram illustrating of a hardware configuration of the car navigation device 4. As illustrated in FIG. 4, the car navigation device 4 includes, for example, a CPU 401, a ROM 402, a RAM 403, an EEPROM 404, a power switch 405, an acceleration and orientation sensor 406, a medium I/F 408, and a global positioning system (GPS) receiver 409.

The CPU 401 controls the entire operation of the car navigation device 4. The ROM 402 stores programs including an IPL to boot the CPU 401. The RAM 403 is used as a work area for the CPU 401. The EEPROM 404 reads and writes various types of data, such as a control program for the car navigation device 4 under the control of the CPU 401. The power switch 405 is a switch that turns on or off the power of the car navigation device 4. The acceleration and orientation sensor 406 includes various sensors such as an electromagnetic compass, which detects geomagnetism, a gyrocompass, and an acceleration sensor. The medium IF 408 controls reading and writing of data with respect to a recording medium 407 such as a flash memory. The GPS receiver 409 receives a GPS signal from a GPS satellite.

The car navigation device 4 further includes, for example, a long-range communication circuit 411, an antenna 411a for the long-range communication circuit 411, a CMOS sensor 412, an imaging element I/F 413, a microphone 414, a speaker 415, an audio input/output (I/O) I/F 416, a display 417, a display I/F 418, an external device connection I/F 419, a short-range communication circuit 420, and an antenna 420a for the short-range communication circuit 420.

The long-range communication circuit 411 is a circuit, which receives traffic jam information, road construction information, traffic accident information and the like provided from an infrastructure system external to the vehicle, and transmits information on the location of the vehicle, life-saving signals, etc. in a case of emergency back to the infrastructure system. The external infrastructure system is, for example, a road information guidance system, such as a vehicle information and communication system (VICS: registered trademark).

The CMOS sensor 412 is an example of a built-in imaging device capable of capturing an image of an object and acquiring image data under the control of the CPU 401. The imaging element I/F 413 is a circuit that controls driving of the CMOS sensor 412.

The microphone 414 is an example of a built-in sound collecting device capable of inputting audio under the control of the CPU 401. The audio input/output (I/O) IF 416 is a circuit for processing the input and output of an audio signal between the microphone 414 and the speaker 415 under the control of the CPU 401.

The display 417 is an example of a display device or unit, such as a liquid crystal or organic electroluminescence (EL) display that displays an image of an object, and/or an operation icon, for example. The display 417 has a function of a touch panel. The touch panel is an example of input device that enables a user to input a user instruction for operating the car navigation device 4. The display I/F 418 is a circuit for transmitting display data to the display 417 under the control of the CPU 401.

The external device connection I/F 419 is an interface that connects the car navigation device 4 to various external devices. The short-range communication circuit 420 is a communication circuit that communicates in compliance with, for example, NFC and Bluetooth.

The car navigation device 4 is further provided with a bus line 410. The bus line 410 is an address bus and a data bus that electrically connects the components such as the CPU 401 illustrated in FIG. 4.

Figure 5:
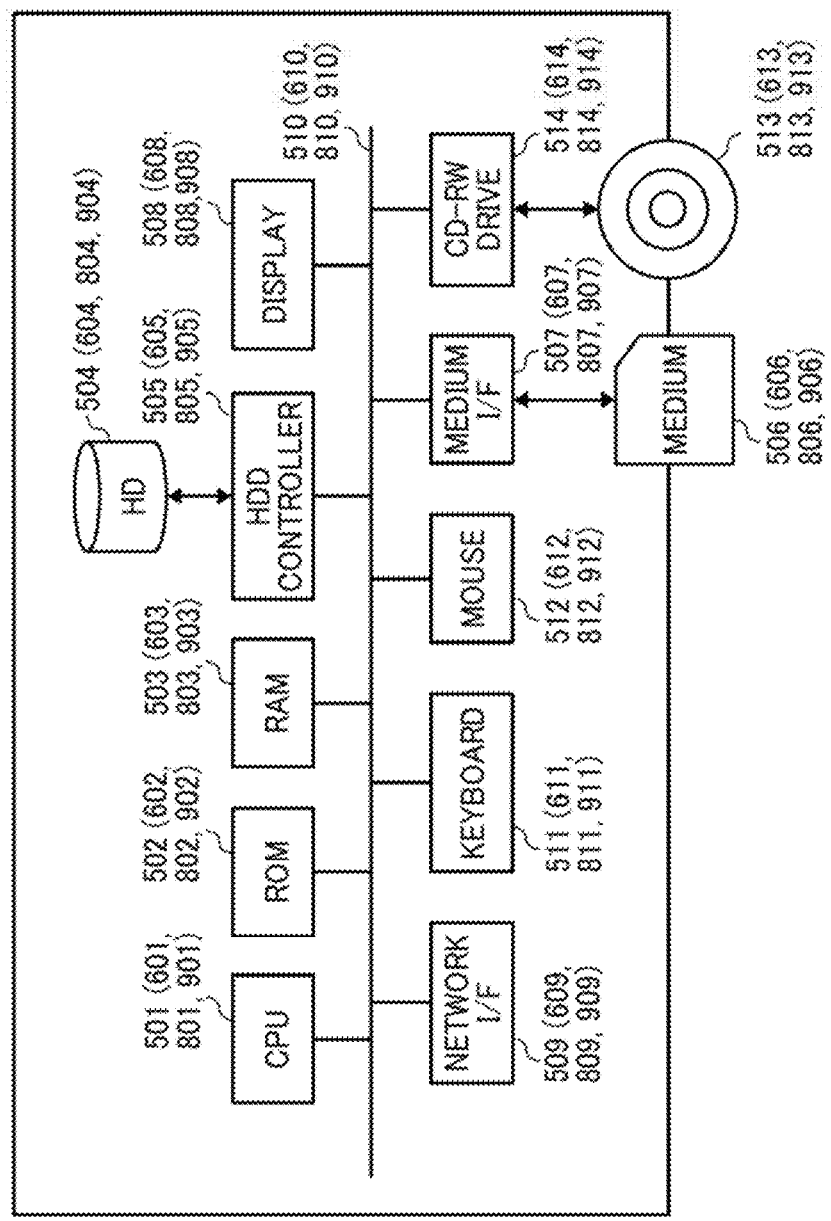
FIG. 5 is a schematic block diagram illustrating a hardware configuration of each of a personal computer (PC) and servers, according to an embodiment of the disclosure.

Hardware Configurations of PC and Server:

FIG. 5 is an example block diagram illustrating a hardware configuration of each of the PC 5 and sharing assistant server 6, schedule management server 8 and audio-text conversion server 9. As illustrated in FIG. 5, the PC 5, which is implemented by a computer, includes, for example, a CPU 501, a ROM 502, a RAM 503, a hard disk (HD) 504, a hard disk drive (HDD) controller 505, a medium I/F 507, a display 508, a network I/F 509, a keyboard 511, a mouse 512, a compact disc rewritable (CD-RW) drive 514, and a bus line 510.

The CPU 501 controls the entire operation of the PC 5. The ROM 502 stores programs including an IPL to boot the CPU 501. The RAM 503 is used as a work area for the CPU 501. The HD 504 stores various data, such as a control program. The HDD controller 505 controls reading and writing of various data to or from the HD 504 under the control of the CPU 501. The medium I/F 507 controls reading and writing of data with respect to a recording medium 506 such as a flash memory. The display 508 displays various types of information including a cursor, a menu, a window, characters, and image. The display 508 is an example of a display device or unit. The network I/F 509 is an interface that controls data communication performed with an external device through the communication network 10.

The keyboard 511 is one example of an input device provided with a plurality of keys for allowing a user to input characters, numerals, or various instructions. The mouse 512 is another example of the input device, with which a user selects a specific instruction or execution, selects a target for processing, and moves a displayed cursor. The CD-RW drive 514 controls reading and writing of various types of data with respect to a CD-RW 513, which is one example of a detachable storage medium.

The PC 5 is further provided with a bus line 510. The bus line 510 is an address bus and a data bus that electrically connects the components such as the CPU 501 illustrated in FIG. 5.

As indicated in FIG. 5, the sharing assistant server 6, which is implemented a computer, includes, for example, a CPU 601, a ROM 602, a RAM 603, a HD 604, an HDD controller 605, a medium I/F 607, a display 608, a network I/F 609, a keyboard 611, a mouse 612, a CD-RW drive 614, and a bus line 610. The sharing assistant server 6 may be provided with a recording medium 606. Since these components of the sharing assistant server 6 have substantially the same configuration of the components of the PC 5 including the CPU 501, the ROM 502, the RAM 503, the HD 504, the HDD controller 505, the medium I/F 507, the display 508, the network I/F 509, the keyboard 511, the mouse 512, the CD-RW drive 514, and the bus line 510, the redundant description is omitted hereto.

As indicated in FIG. 5, the schedule management server 8, which is implemented by a computer, includes, for example, a CPU 801, a ROM 802, a RAM 803, a HD 804, an HDD controller 805, a medium I/F 807, a display 808, a network I/F 809, a keyboard 811, a mouse 812, a CD-RW drive 814, and a bus line 810. The schedule management server 8 may be provided with a recording medium 806. These components of the schedule management server 8 have substantially the same configuration of the components of the PC 5 including the CPU 501, the ROM 502, the RAM 503, the HD 504, the HDD controller 505, the medium I/F 507, the display 508, the network I/F 509, the keyboard 511, the mouse 512, the CD-RW drive 514, and the bus line 510, and the redundant description is omitted hereto.

As indicated in FIG. 5, the audio-text conversion server 9, which is implemented by a computer, includes, for example, a CPU 901, a ROM 902, a RAM 903, a HD 904, an HDD controller 905, a medium I/F 907, a display 908, a network I/F 909, a keyboard 911, a mouse 912, a CD-RW drive 914, and a bus line 910. The audio-text conversion server 9 may be provided with a recording medium 906. These components of the audio-text conversion server 9 have substantially the same configuration of the components of the PC 5 including the CPU 501, the ROM 502, the RAM 503, the HD 504, the HDD controller 505, the medium I/F 507, the display 508, the network I/F 509, the keyboard 511, the mouse 512, the CD-RW drive 514, and the bus line 510, and the redundant description is omitted hereto.

Further, any one of the above-described programs may be recorded in a file in an installable or executable format as a computer-readable recording medium, or non-transitory recording medium, for distribution. The recording medium includes, for example, a compact disc-recordable (CD-R), a digital versatile disc (DVD), a blue-ray disc, and a secure digital (SD) card. In addition, the recording medium may be provided in the form of a program product to users within a certain country or outside the country.

The sharing assistant server 6 can be configured by a single computer or a plurality of computers to which divided portions (functions, means, or storages) are arbitrarily assigned. This also applies to the schedule management server 8.

Software Configuration of Electronic Whiteboard:

Hereinafter, a description is given of computer software installed on the electronic whiteboard 2 with reference to FIG. 6. In this disclosure, the computer software (hereinafter, referred to as software) is the program related to the operation of the computer and the information used for the processing by the computer, and is something equivalent to the program. The program includes instructions directed to the computer, and the instructions are combined so that program can obtain a processing result. Further, something equivalent to the program is not a program because these are not direct instructions to the computer, but has a property similar to the program in terms of specifying the processing of the computer. For example, a data structure, such as a logical structure of data represented by a mutual relationship between data elements, is an example of something equivalent to the program.

An application is a generic term for software that is used to perform specific processing among classifications of software. On the other hand, the operating system (hereinafter, OS) is software that controls the computer and enables each application to use the computer resource. The OS provides basic management and control of computers, such as control of input and output, hardware control or management, such as memory and hard disks, and process control or management. The application works with the functionality provided by the operating system.

Figure 6:
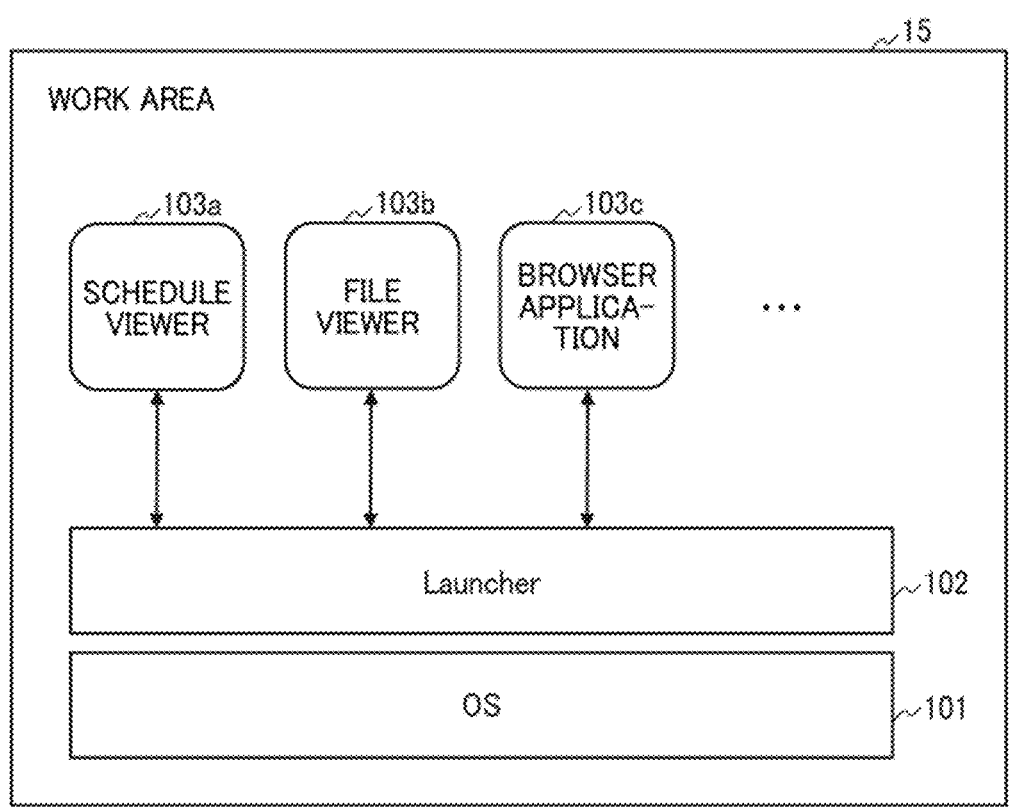
FIG. 6 is a diagram illustrating a software configuration of an electronic whiteboard, according to an embodiment of the disclosure.

FIG. 6 is a diagram illustrating a software configuration of the electronic whiteboard 2, according to the embodiment. As illustrated in FIG. 6, an operating system (OS) 101, a Launcher 102, a schedule viewer 103a, a file viewer 103b, and a browser application 103c, which can operate on a work area 15 of the RAM 203. The OS 101 provides a basic function of the electronic whiteboard 2 and is basic software for managing or controlling the electronic whiteboard 2.

The Launcher 102 is a launcher application operating on the OS 101. For example, the Launcher 102 manages or controls the start and end of an event, such as a meeting, which is executed using the electronic whiteboard 2, or manages or controls external applications such as the schedule viewer 103a, the file viewer 103b, and the browser application 103c, which are used while executing the event. The Launcher 102 is an example of a second application in this disclosure.

The schedule viewer 103a, the file viewer 103b, and the browser application 103c are external applications or external service applications operating on the Launcher 102. Hereinafter, the schedule viewer 103a, the file viewer 103b, and the browser application 103c are referred to as "external application 103" when distinguishing each one of them is not necessary. The external application 103 is executed independently of the Launcher 102, and implements a service or a function provided on the OS 101. The external application 103 is an example of a first application in this disclosure.

In an example case of FIG. 6, the three external applications such as the schedule viewer 103a, the file viewer 103b, and the browser application 103c are installed on the electronic whiteboard 2. However, the number of the external applications are not limited to thereto.

Figure 7A:
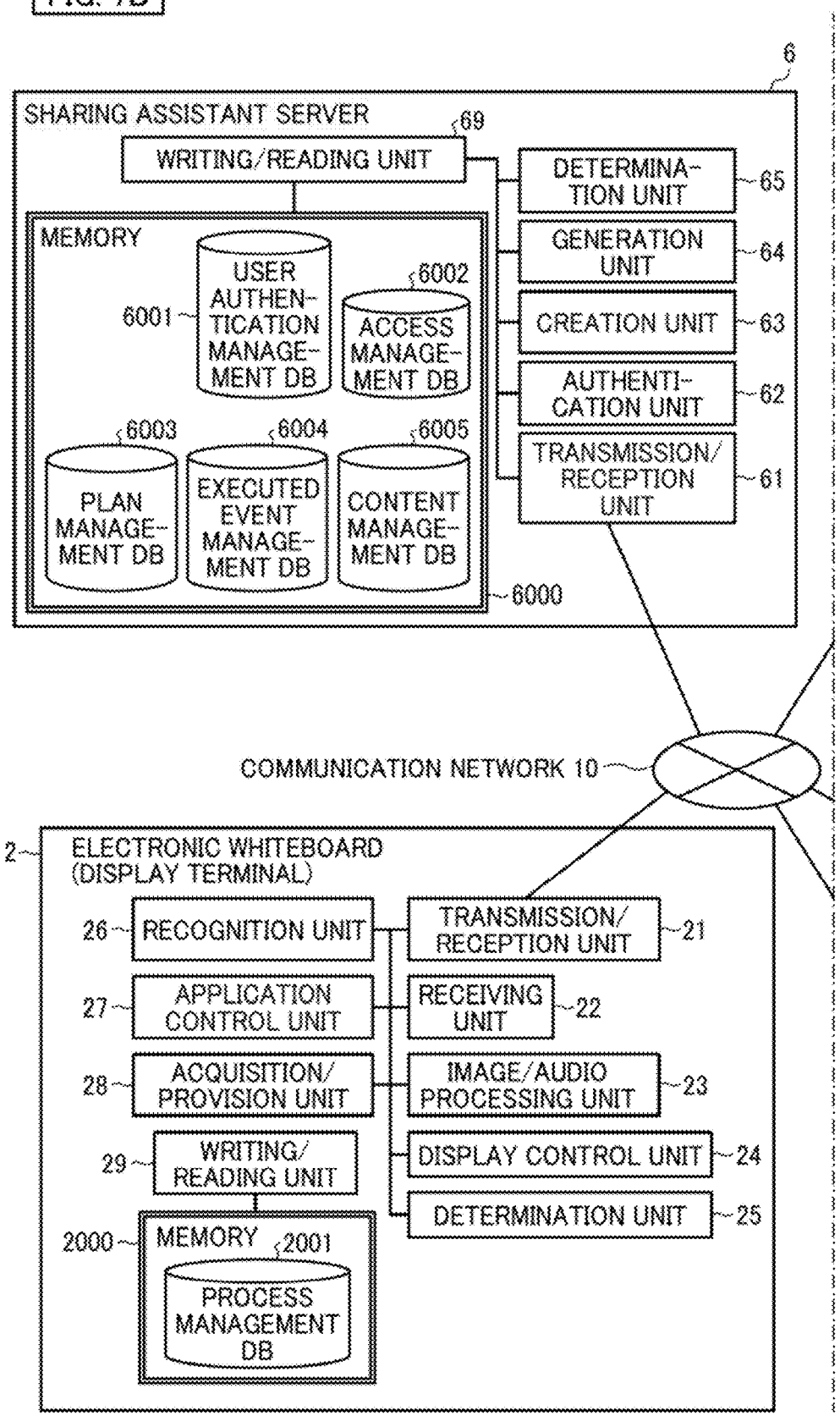
FIG. 7A and FIG. 7B (FIG. 7) are a schematic block diagram illustrating a functional configuration of a sharing system according to an embodiment of the disclosure.
Figure 7B:
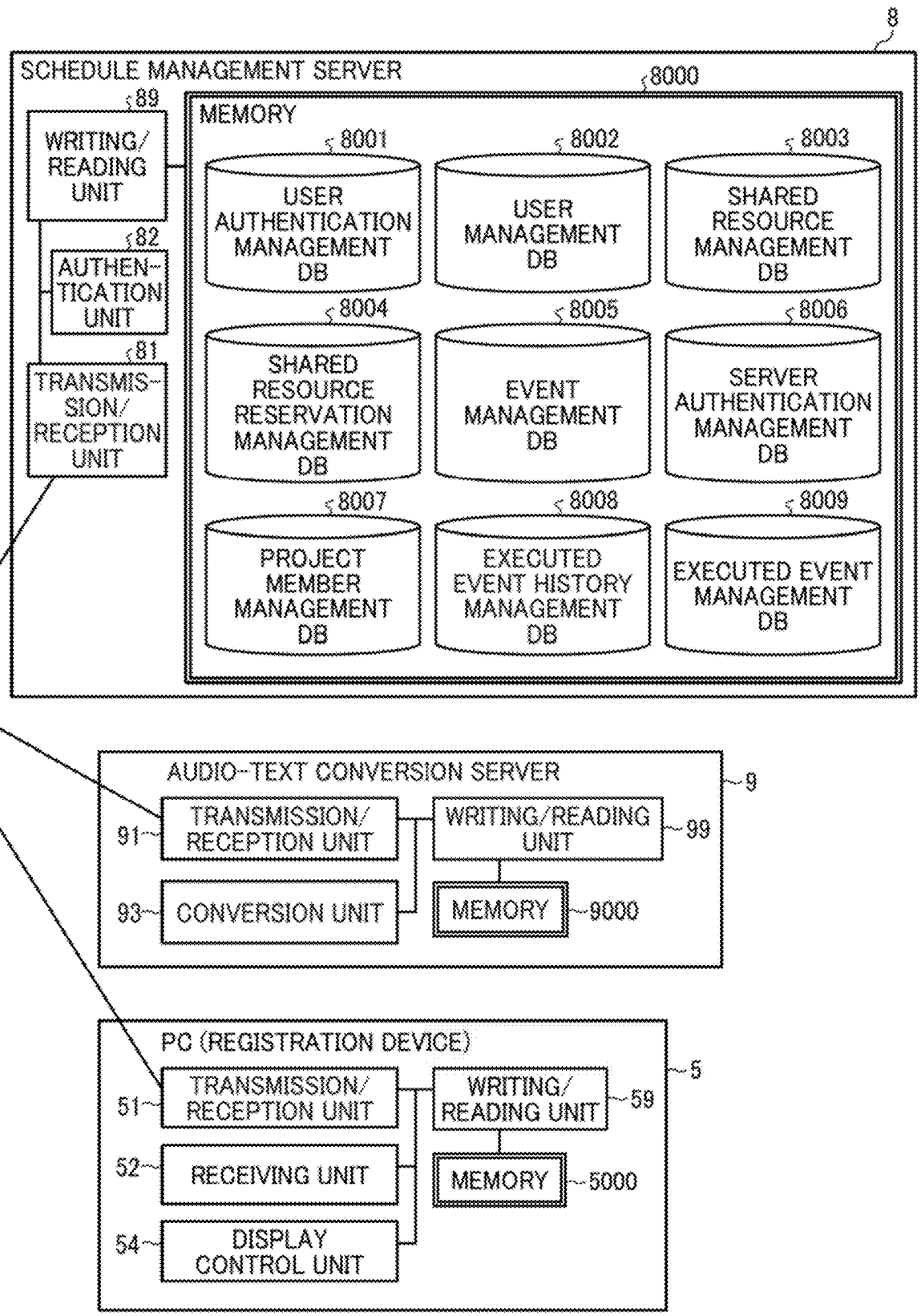

Functional Configuration of Sharing System:

Hereinafter, a description is given of a functional configuration of the sharing system 1 with reference to FIGS. 7 to 14. FIG. 7A and FIG. 7B (FIG. 7) are an example block diagram illustrating a functional configuration of the sharing system 1. FIG. 7A and FIG. 7B (FIG. 7) indicate the terminals, apparatuses, and servers illustrated in FIG. 1, which are related to processes or operations described to be described later.

Functional Configuration of Electronic Whiteboard:

As illustrated in FIG. 7, the electronic whiteboard 2 includes, for example, a transmission/reception unit 21, a receiving unit 22, an image/audio processing unit 23, a display control unit 24, a determination unit 25, a recognition unit 26, an application control unit 27, an acquisition/provision unit 28, and writing-reading unit 29. Each of these units is a function that is implemented by operating any one or more of the components illustrated in FIG. 2 in accordance with an instruction from the CPU 201 executing one or more programs, loaded from the SSD 204 to the RAM 203. The electronic whiteboard 2 further includes, for example, a memory 2000, which is implemented by the RAM 203 and SSD 204 illustrated in FIG. 2.

Process Control Table:

FIG. 8 is a conceptual diagram of a process management table. The memory 2000 stores, for example, a process management database (DB) 2001 storing the process management table indicated in FIG. 8. The process management table is used to control or manage process ID, application name, operation display screen information, and link setting to a menu bar of the Launcher 102, which are associated with each other.

The process ID is information identifying the particular processing of an application activated on the OS 101. In this disclosure, the particular processing is a collection of instructions for one sequential process performed by the CPU executing one or more programs on the computer. The process ID is acquired by the application control unit 27 in response to an activation of each application. The process ID is an example of process identification information.

The operation display screen information is information related to an operation display screen (window) of each application, and includes, for example, windows handle and display information of the application.

The windows handle is an example of a storage area identification information used for accessing a storage area, such as a memory storing information related to the operation display screen. The windows handle is acquired by the application control unit 27 using the process ID obtained or acquired when the application is activated.

The display information of application includes, for example, information on display position, display size, and display/non-display of the operation display screen for each application.

The link setting is information indicating whether or not a display position of the operation display screen of the external application 103 is changed by linking or interlocking the display position of the operation display screen of the external application 103 and a display position of the operation display screen of the Launcher 102 (e.g., menu bar). The link setting is an example of setting information indicating whether or not there is a link to the change of the display position of the operation display screen of the Launcher 102 (e.g., menu bar). In this disclosure, the link indicates that the display position of the operation display screen of the external application 103 is changed in connection with the change of the display position of the operation display screen of the Launcher 102. For example, when the link setting is "ON," the display position of the operation display screen of the external application 103 is changed simultaneously with the change of the display position of the operation display screen of the Launcher 102.

Further, when the link setting is "ON," that is, when the link setting indicates that the display position of one operation display screen is changed in response to the change of the display position of the operation display screen of the Launcher 102, the display position of the operation display screen of the external application 103 is changed in connection with the display position of the operation display screen of the Launcher 102. For example, when the link setting is "ON," the operation display screen of the external application 103 is displayed adjacent to the operation display screen of the Launcher 102.

On the other hand, when the link setting is "OFF", that is, when the link setting indicates that the display position of one operation display screen is not changed in response to the change of the display position of the operation display screen of the Launcher 102, the display position of the operation display screen of the external application 103 is not changed even if the display position of the operation display screen of the Launcher 102 is changed. In this case, the operation display screen of the external application 103 is displayed at the display position indicated in the display information of the application stored in association with the external application 103, in which the link setting is "OFF."

The process management table controls or manages the link setting for each application by associating the link setting with the menu bar (Launcher 102), the process ID and the operation display screen information. The application control unit 27 acquires the process ID in response to activating the application, and then acquires the windows handle from the acquired process ID. The application control unit 27 acquires display information of the application from the acquired windows handle. Then, the application control unit 27 stores and controls the application processing information associating the acquired each information and the link setting information.

In an example case of FIG. 8, the process ID of the menu bar (Launcher 102) is "L" and the windows handle is "00000001." In a case of the menu bar (Launcher 102), the link setting is set "blank" because the defining of the link setting is not required.

Further, the schedule viewer 103a is set with the process ID of "1," the windows handle of "00000003" and the link setting of "ON." Therefore, the display position of the operation display screen of the schedule viewer 103a is changed in connection with the change of the display position of the menu bar (Launcher 102).

On the other hand, the file viewer 103b is set with the process ID of "2," the windows handle of "00000005," and the link setting is "OFF." Therefore, the display position of the operation display screen of the file viewer 103b can be changed independently from the change of the display position of the menu bar (Launcher 102).

Functional Units of Electronic Whiteboard

Hereinafter, a description is given of each functional unit of the electronic whiteboard 2 with reference to FIG. 7. The transmission/reception unit 21, implemented by the instruction from the CPU 201, the network I/F 205, and the external device connection I/F 206, illustrated in FIG. 2, transmits and receives various types of data (or information) to or from other terminal, apparatus, and system through the communication network 10.

The receiving unit 22, implemented by the instruction from the CPU 201, the contact sensor 214, and the electronic pen controller 216, illustrated in FIG. 2, receives various inputs from a user.

The image/audio processing unit 23, which is implemented by the instruction from the CPU 201 and the capturing device 211, illustrated in FIG. 2, saves image data displayed on the display 220. Further, the image/audio processing unit 23, which is implemented by the instruction from the CPU 201 and the GPU 212, illustrated in FIG. 2, performs image processing to the image data to display an image on the display 220. Further, the image/audio processing unit 23 performs the image processing to image data that is obtained by capturing an image of an object using the camera 2400. Further, after voice sound generated by a user is converted to audio signals using the microphone 2200, the image/audio processing unit 23 performs audio processing on audio data corresponding to the audio signals. Further, the image/audio processing unit 23 outputs the audio signals corresponding to the audio data to the speaker 2300, and the speaker 2300 outputs the voice sound. Further, the image/audio processing unit 23 obtains drawn image data, which is drawn on the display 220 by the user using the electronic pen 2500 or the user's hand H, and converts the drawn image data to coordinate data. For example, when one electronic whiteboard (e.g., first electronic whiteboard 2a) provided in one site transmits coordinate data to another electronic whiteboard (e.g., second electronic whiteboard 2b) provided in another site, the second electronic whiteboard 2b causes the display 220 to display the drawn image having the same content with the image drawn at the first electronic whiteboard 2a based on the received coordinate data.

The display control unit 24, which is implemented by the instruction from the CPU 201 and the display controller 213 illustrated in FIG. 2, causes the display 220 to display the drawn image, and accesses the sharing assistant server 6 using a web browser to display various screen image data. For example, the display control unit 24 activates and executes the Launcher 102 and the external application 103 on the OS 101 illustrated in FIG. 6 to cause the display 220 to display various screen, such as a menu bar 120 and an application display screen 150 rendered by an application programming interface (API) provided by the OS 101.

The determination unit 25, which is implemented by the instruction from the CPU 201 illustrated in FIG. 2, performs various types of determination.

The recognition unit 26, implemented by the instruction from the CPU 201 illustrated in FIG. 2, recognizes a designated area 262 encircling an image 261 (drawn image) on the display 220, which is to be described later with reference to FIG. 36.

The application control unit 27, implemented by the instruction from the CPU 201, illustrated in FIG. 2, manages or controls processing and operation of various applications operating on the OS 101. For example, the application control unit 27 activates the external application 103 in accordance with the processing from the Launcher 102. Further, the application control unit 27 acquires, for example, the process ID and the operation display screen information of the activated external application 103 when the external application 103 is activated. Further, for example, the application control unit 27 switches the link setting stored in the process management table (see FIG. 8). The application control unit 27 is an example of a first acquisition unit. The application control unit 27 is also an example of a second acquisition unit. Further, the application control unit 27 is an example of a setting information switching unit.

The acquisition/provision unit 28, is implemented by the instruction from the CPU 201 and the short-range communication circuit 219 with the antenna 219a, illustrated in FIG. 2, communicates with a dedicated device or terminal, such as an integrated circuit (IC) card or a smartphone, to acquire or provide data from or to the IC card or the smartphone using the short-range communication.

The writing/reading unit 29, is implemented by the instruction from the CPU 201 and the SSD 204 illustrated in FIG. 2, stores various types of data in the memory 2000 and reads various types of data stored in the memory 2000 or the recording medium 2100. Further, the memory 2000 overwrites image data and audio data each time when the image data and the audio data are received in communicating with another electronic whiteboard or videoconference terminal. The display 220 displays an image based on the image data before being overwritten, and the speaker 2300 outputs audio based on the audio data before being overwritten. The recording medium 2100 is implemented by a USB memory 2600 illustrated in FIG. 2.

The functions of each of the videoconference terminal 3 and the car navigation device 4 are substantially the same as those of the electronic whiteboard 2 except for the receiving unit 22, and thereby the redundant description thereof is omitted hereto.

Functional Configuration of PC

As illustrated in FIG. 7, the PC 5 includes, for example, a transmission/reception unit 51, a receiving unit 52, a display control unit 54, and a writing/reading unit 59. Each of these units is a function that is implemented by operating any one or more of the components illustrated in FIG. 5 in accordance with an instruction from the CPU 501 executing one or more programs, loaded from the HD 504 to the RAM 503. The PC 5 further includes a memory 5000 implemented by the HD 504 illustrated in FIG. 5.

Functional Unit of PC

Hereinafter, a description is given of each functional unit of the PC 5 with reference to FIG. 7. The transmission/reception unit 51, implemented by the instruction from the CPU 501 and the network I/F 509 illustrated in FIG. 5, transmits and receives various types of data (or information) to or from each terminal, device, or system through the communication network 10.

The receiving unit 52, implemented by the instruction from the CPU 501, the keyboard 511, and the mouse 512 illustrated in FIG. 5, receives various inputs from a user.

The display control unit 54, implemented by the instruction from the CPU 501, illustrated in FIG. 5, causes the display 508 to display an image, and accesses the sharing assistant server 6 using a web browser to display various screen image data. Specifically, the display control unit 54 accesses the sharing assistant server 6 using the web browser, downloads web application (WebApp) including at least hypertext markup language (HTML), and further cascading style sheets (CSS) and JAVA SCRIPT (registered trademark), and causes the display 508 to display various screen image data generated by the WebAPP.

The writing/reading unit 59, implemented by the instruction from the CPU 501 and the HDD controller 505, illustrated in FIG. 5, stores various types of data in the memory 5000 and reads various types of data stored in the memory 5000.

Functional Configuration of Sharing Assistant Server:

As illustrated in FIG. 7, the sharing assistant server 6 includes, for example, a transmission/reception unit 61, an authentication unit 62, a creation unit 63, a generation unit 64, a determination unit 65, and a writing/reading unit 69. Each of these units is a function that is implemented by operating any one or more of the components illustrated in FIG. 5 in accordance with an instruction from the CPU 601 executing one or more programs, loaded from the HD 604 to the RAM 603. The sharing assistant server 6 further includes a memory 6000 implemented by, for example, the HD 604 illustrated in FIG. 5.

User Authentication Management Table:

FIG. 9A is a conceptual diagram illustrating a user authentication management table. The memory 6000 stores a user authentication management database (DB) 6001 including the authentication management table illustrated in FIG. 9A. The user authentication management table stores user ID identifying each user, user name, organization ID identifying an organization to which each user belongs, and password in association with each other, to manage or control the user authentication information. The organization ID may also include, for example, a domain name representing a group or an organization for managing or controlling a plurality of computers on the communication network.

Access Management Table:

FIG. 9B is a conceptual diagram illustrating an access management table.

The memory 6000 stores an access management DB 6002 including the access management table illustrated in FIG. 9B. The access management table stores organization ID, access ID required to authenticate an access right to the schedule management server 8, and access password in association with each other to manage or control the access authentication information. The access ID and the access password are required when the sharing assistant server 6 uses a service (function) provided by the schedule management server 8 via the web application programming interface (API) using a network communication using hypertext transfer protocol (HTTP) or hypertext transfer protocol secure (HTTPS). Since the schedule management server 8 manages or controls a plurality of schedulers which are different depending on organizations, the schedulers are required to be managed or controlled using the access management table.

Plan Management Table:

FIG. 9C is a conceptual diagram illustrating a plan management table. The memory 6000 stores a plan management DB 6003 including the plan management table illustrated in FIG. 9C. The plan management table stores, for each planned event ID and executed event ID, organization ID, user ID identifying user who makes a reservation, information on participation (i.e., presence (attending) or absence) of user who makes the reservation, name of user who makes the reservation, scheduled start date and time (planned event start time), scheduled end date and time (planned event end time), event name, user ID of other participant other than the user who makes the reservation, information on participation (i.e., presence (attending) or absence) of other participant, name of other participant, and file data in association with each other. Regarding the information on participation in the plan management table, the presence of other participant can be indicated by "YES" as illustrated in FIG. 9C, and the absence of other participant can be indicated by "NO."

The planned event ID is identification information identifying an event that is reserved. The planned event ID is an example of planned event identification information identifying a to-be-executed event.

The executed event ID is identification information identifying each event that is actually executed among the events that are reserved. In this description, the executed event ID is an example of executed event identification information identifying a specific event to be executed, being executed, or executed and then terminated.

The name of the user who makes the reservation is a name of a user who made the reservation of each shared resource. For example, when the shared resource is a meeting room, the name of the user who makes the reservation might be a name of a person who organizes a meeting, and when the shared resource is a vehicle, the user name of the user who makes the reservation might be a name of a driver of the vehicle.

The scheduled start date and time (planned event start time) indicates a scheduled time to start to use the shared resource. The scheduled end date and time (planned event end time) indicates a scheduled end date and time to end using the shared resource.

The event name indicates a name of an event planned to be executed by the user who makes the reservation.

The user ID of other participant is identification information identifying participant(s) other than the user who makes the reservation. The name of other participant includes the name of the participant(s) other than the user who makes the reservation, and also the name of the shared resource(s). That is, the participant means the shared resource in addition to the user who makes the reservation and other participant in this description.

The file data is file data of reference file used in the event corresponding to the planned event ID, registered by user A using a schedule input screen 550 (see FIG. 18), which will be described later. Further, the file data is data created by using various application and a given file format. The file format of file data is, for example, power point file, excel file, and the like.

Executed Event Management Table:

FIG. 10A is a conceptual diagram illustrating an executed event management table. The memory 6000 stores an executed event management DB 6004 including the executed event management table illustrated in FIG. 10A. The executed event management table stores project ID and executed event ID in association with each other, for each project ID.

Figure 23:
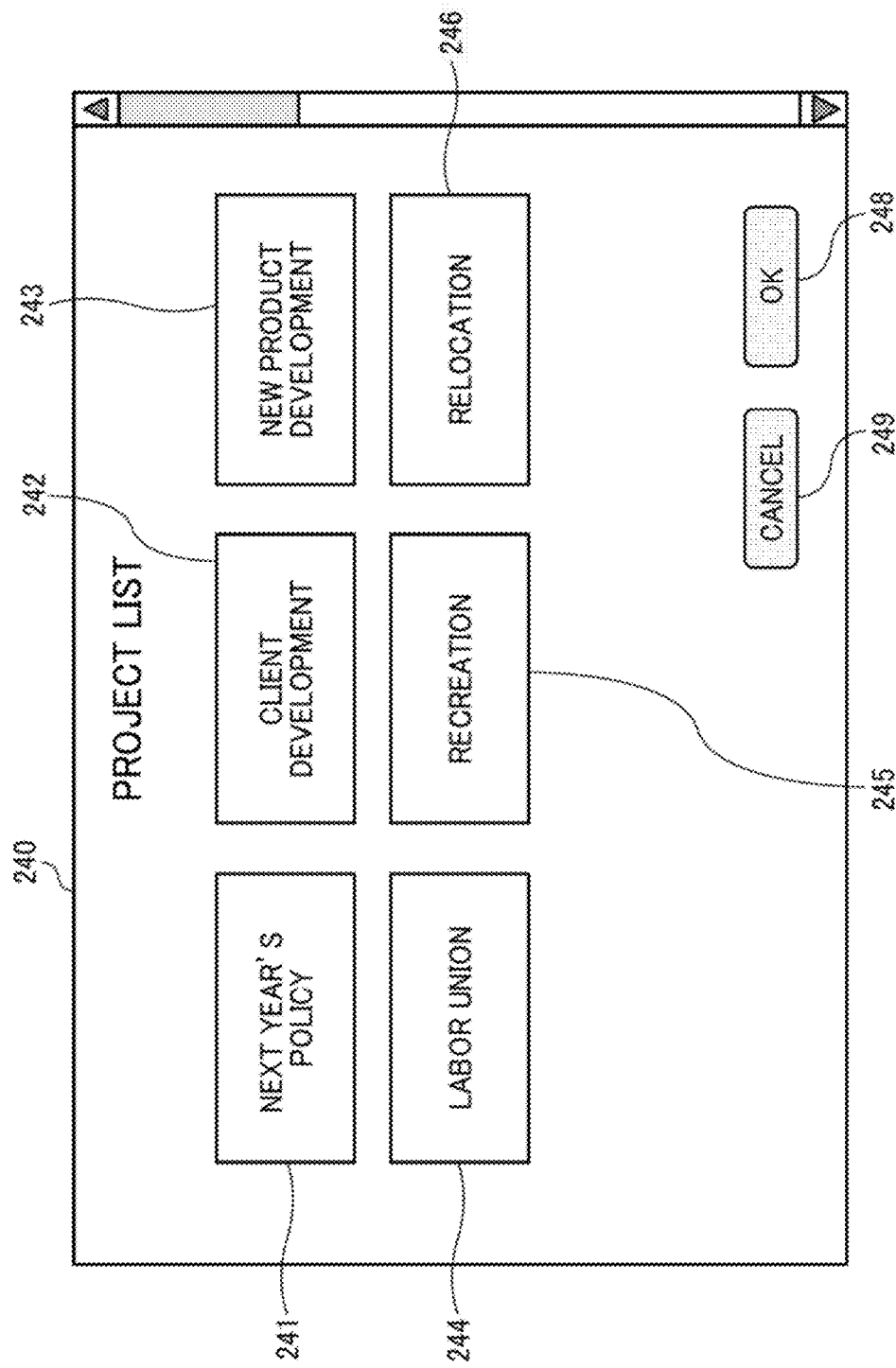
FIG. 23 is an illustration of a project list screen, according to an embodiment of the disclosure.

The project ID is identification information identifying each specific project, which is used as the project identification information. The specific project represents a group, a team, or an assembly consisting of a plurality of members assembled to achieve a specific goal, plan, or planning. The members belonging to the same project can share the executed event history, such as the minutes of event associated with the project ID. As illustrated in FIG. 23, which is to be described later, the project ID is assigned for each project, such as "next year's policy" and "customer development." The project ID can be also referred to as the group ID or team ID.

Content Management Table:

FIG. 10B is a conceptual diagram of a content management table. The memory 6000 stores a content management DB 6005 including the content management table indicated in FIG. 10B. The content management table stores, for each executed event ID, content processing ID, type of content processing, detail of content, and start and end date of the content processing, which are associated with each other.

In this disclosure, the content is, for example, the content of the executed event, which has occurred as a specific event, such as a meeting for one project, or materials used in the event. The type of content processing includes, for example, recording, snapshots, voice-text reception, occurrence of action item, and sending of reference materials. The content processing ID is identification information identifying the processing of the content generated at each event.

In this disclosure, the content includes history information indicating the execution of the event and the action item generated by the executed event. The history information includes, for example, various data such as recording data, snapshots, audio text, or reference materials.

If the type of content processing is "recording," the detail of content includes a universal resource locator (URL) indicating a storage destination of the recorded audio data. Further, if the type of content processing is "snapshot," the detail of content includes a URL indicating a storage destination of image data of a screen obtained by the snapshot (capture). The capture means storing the image (still image, movie image) displayed on the display 220 as image data. Further, if the type of content processing is "voice-text reception," the detail of content includes a URL indicating a storage destination of text data corresponding to the received voice-text.

In this disclosure, the action item indicates the content of an action to be performed by a person associated with the event when the action is generated at an event such as a meeting for one project. If the type of content processing is "action item generation," the detail of content includes, a user ID of a person to execute an action item, a due date to complete the action item, and a URL indicating a storage destination of image data indicating the action item.

Functional Configuration of Sharing Assistant Server:

Hereinafter, a description is given of each unit of the functional configuration of the sharing assistant server 6 with reference to FIG. 7. In the following description of the functional configuration of the sharing assistant server 6, the hardware components related to each functional unit of the sharing assistant server 6, illustrated in FIG. 5, are also described.

The transmission/reception unit 61 of the sharing assistant server 6 illustrated in FIG. 7, implemented by the instruction from the CPU 601 and the network I/F 609 illustrated in FIG. 5, transmits and receives various types of data (or information) to or from another terminal, device, or system through the communication network 10.

The authentication unit 62, implemented by the instruction from the CPU 601 illustrated in FIG. 5, determines whether or not information (e.g., user ID, organization ID, and password) transmitted from a shared resource is information that is already registered in the user authentication management DB 6001.

The creation unit 63, implemented by the instruction from the CPU 601 illustrated in FIG. 5, creates a reservation list screen 230, illustrated in FIG. 21, to be described later, based on reservation information and plan information transmitted from the schedule management server 8.

The generation unit 64, implemented by the instruction from the CPU 601 illustrated in FIG. 5, generates an executed event ID, a content processing ID, and a URL of storage destination.

The determination unit 65, implemented by the instruction from the CPU 601 illustrated in FIG. 5, performs various types of determination. The detail of the determination will be described later.

The writing/reading unit 69, implemented by the instruction from the CPU 601 and the HDD controller 605 illustrated in FIG. 5, stores various types of data in the memory 6000 or reads various types of data stored in the memory 6000.

Functional Configuration of Schedule Management Server:

As illustrated in FIG. 7, the schedule management server 8 includes, for example, a transmission/reception unit 81, an authentication unit 82, and a writing/reading unit 89. Each of these units is a function that is implemented by operating any one or more of the components illustrated in FIG. 5 in accordance with an instruction from the CPU 801 executing one or more programs, loaded from the HD 804 to the RAM 803. The schedule management server 8 further includes, for example, a memory 8000 implemented by the HD 804 illustrated in FIG. 5.

User Authentication Management Table:

FIG. 11A is a conceptual diagram illustrating a user authentication management table. The memory 8000 stores a user authentication management DB 8001 including the user authentication management table illustrated in FIG. 11A. The user authentication management table stores user ID identifying each user, organization ID identifying each organization to which each user belongs, and password, in association with each other to manage or control the user authentication information.

User Management Table:

FIG. 11B is a conceptual diagram illustrating a user management table. The memory 8000 stores a user management DB 8002 including the user management table illustrated in FIG. 11B. The user management table stores, for each organization ID, user ID, and user name of each user identified by the user ID in association with each other to manage or control the user information.

Shared Resource Management Table:

FIG. 11C is a conceptual diagram illustrating a shared resource management table. The memory 8000 stores a shared resource management DB 8003 including the shared resource management table illustrated in FIG. 11C. The shared resource management table stores, for each organization ID, shared resource ID identifying each shared resource and name of each shared resource (resource name) in association with each other to manage or control the shared resource information.

Shared Resource Reservation Management Table:

FIG. 12A is a conceptual diagram illustrating a shared resource reservation management table. The memory 8000 stores a shared resource reservation management DB 8004 including the shared resource reservation management table illustrated in FIG. 12A. The shared resource reservation management table stores reservation information associating each piece of information with each other. The reservation information includes shared resource ID, shared resource name, user ID of communication terminal, user ID of user who makes a reservation, scheduled use start date and time, scheduled use end date and time, and event name, for each organization ID.

The scheduled use start date and time indicates a scheduled date and time to start using the shared resource. The scheduled use end date and time indicates a scheduled date and time to end using the shared resource. Each of the scheduled use start date and time and the scheduled use end date and time usually includes year, month, day, hour, minute, second and a time zone. In FIG. 12A, year, month, day, and hour and minute are indicated due to the size limitation of a column.

Event Management Table

FIG. 12B is a conceptual diagram illustrating an event management table. The memory 8000 stores an event management DB 8005 including the event management table illustrated in FIG. 12B. The event management table stores plan information associating each piece of information with each other. The plan information includes organization ID, user ID, user name, scheduled event start date and time, scheduled event end date and time, and scheduled event name associated with each other, for each planned event ID, to manage or control the plan information.

The scheduled event start date and time indicates a scheduled date and time to start to execute a corresponding event. The scheduled event end date and time indicates a scheduled date and time to end the corresponding event. Each of the scheduled event start date and time and the scheduled event end date and time usually includes year, month, day, hour, minute, second and a time zone. In FIG. 12B, year, month, day, and hour and minute are indicated due to the size limitation of a column. Further, the event management table manages or controls the file data of reference file to be used in the event indicated in the plan information in association with the planned event ID.

Server Authentication Management Table:

FIG. 13A is a conceptual diagram illustrating a server authentication management table. The memory 8000 stores a server authentication management DB 8006 including the server authentication management table illustrated in FIG. 13A. The server authentication management table stores access ID and access password in association with each other to manage or control the server authentication information. The access ID and the access password are defined based on the same concept as the access ID and access password managed or controlled by the access management DB 6002 of the sharing assistant server 6.

Project Member Management Table:

FIG. 13B is a conceptual diagram illustrating a project member management table. The memory 8000 stores a project member management DB 8007 including the project member management table illustrated in FIG. 13B. The project member management table stores, for each organization ID, project ID, project name, and user ID of project member in association with each other to manage or control the project member information.

Executed Event History Management Table:

FIG. 14A is a conceptual diagram of an executed event history management table. The memory 8000 stores an executed event history management DB 8008 including the executed event history management table illustrated in FIG. 14A. The executed event history management table stores, for each of project ID and executed event ID, content processing ID, type of content processing, detail of content, and start date and time and end date and time of content processing associated with each other to manage or control the executed event history information or data. A part of the data items stored in the executed event history management DB 8008 (FIG. 14A) is the same as a part of the data items stored in the content management DB 6005 (FIG. 10B). The same data items are the executed event ID, the content processing ID, the type of content processing, and the start date and time and the end date and time of content processing. The detail of content includes different notation for the storage destination, such as http:// or c://, but the storage destination cam be the same destination.

Executed Event Management Table:

FIG. 14B is a conceptual diagram illustrating an executed event management table. The memory 8000 stores an executed event management DB 8009 including the executed event management table illustrated in FIG. 10B. The executed event management table stores, for each executed event ID, event name, start and end date of event in association with each other to manage or control the executed event information. The executed event management DB 8009 manages or controls information related to the actually executed event among the plan information managed or controlled by the event management DB 8005.

Functional Configuration of Schedule Management Server:

Hereinafter, a description is given of each unit of the functional configuration of the schedule management server 8 in detail with reference to FIG. 7. In the following description of the functional configuration of the schedule management server 8, the hardware components related to each functional unit of the schedule management server 8, illustrated in FIG. 5, are also described.

The transmission/reception unit 81 of the schedule management server 8 illustrated in FIG. 7, implemented by the instruction from the CPU 801 and the network I/F 809 illustrated in FIG. 5, transmits and receives various types of data (or information) to or from another terminal, device, or system through the communication network 10.

The authentication unit 82, implemented by the instruction from the CPU 801 illustrated in FIG. 5, determines whether information (e.g., user ID, organization ID, and password) transmitted from the shared resource is information that is previously registered in the user authentication management DB 8001 or not. Further, the authentication unit 82 performs authentication by determining whether the information (e.g., access ID and access password) transmitted from the sharing assistant server 6 is information that is previously registered in the server authentication management DB 8006.

The writing/reading unit 89, implemented by the instruction from the CPU 801 and the HDD 805 illustrated in FIG. 5, stores various types of data in the memory 8000 and reads various types of data stored in the memory 8000.

Functional Configuration of Audio-Text Conversion Server:

As indicated in FIG. 7, the audio-text conversion server 9 includes, for example, a transmission/reception unit 91, a conversion unit 93, and a writing/reading unit 99. Each of these units is a function that is implemented by operating any one or more of the components illustrated in FIG. 5 in accordance with an instruction from the CPU 901 executing one or more programs, loaded from the HD 904 to the RAM 903. The audio-text conversion server 9 further includes, for example, a memory 9000 implemented by, for example, the HD 904 illustrated in FIG. 5.

Functional Configuration of Audio-Text Conversion Server:

Hereinafter, a description is given of each unit of the functional configuration of the audio-text conversion server 9 in detail with reference to FIG. 7. In the following description of the functional configuration of the audio-text conversion server 9, the hardware components related to each functional unit of the audio-text conversion server 9, illustrated in FIG. 5, are also described.

The transmission/reception unit 91 of the audio-text conversion server 9 indicated in FIG. 7, implemented by an instruction from the CPU 901 and by the network I/F 909 illustrated in FIG. 5, transmits and receives various types of data (or information) to or from another terminal, device, or system through the communication network 10.

The conversion unit 93, implemented by the instruction from the CPU 901 illustrated in FIG. 5, converts audio sound data received by the transmission/reception unit 91 via the communication network 10 into text data.

The writing/reading unit 99, implemented by the instruction from the CPU 901 and the HDD controller 905 indicated in FIG. 5, stores various types of data in the memory 9000 and reads various types of data stored in the memory 9000.

The above described IDs are examples of identification information. The organization ID includes, for example, a company name, an office name, a department name, a region name, and the like. The user ID includes, for example, an employee number, a driver license number, and an individual number for the Japanese Social Security System and Tax Number System.

Operation and Processing:

Hereinafter, a description is given of processes and operations according to the embodiment with reference to FIGS. 15 to 18.

Registering of Schedule:

Hereinafter, a description is given of a process that a reservation making person A (e.g., Taro Ricoh) uses the PC 5 to register his or her schedule at the schedule management server 8 with reference to FIGS. 15 to 18. The reservation making person A may be referred to as the user A in the following description.

Figure 16:
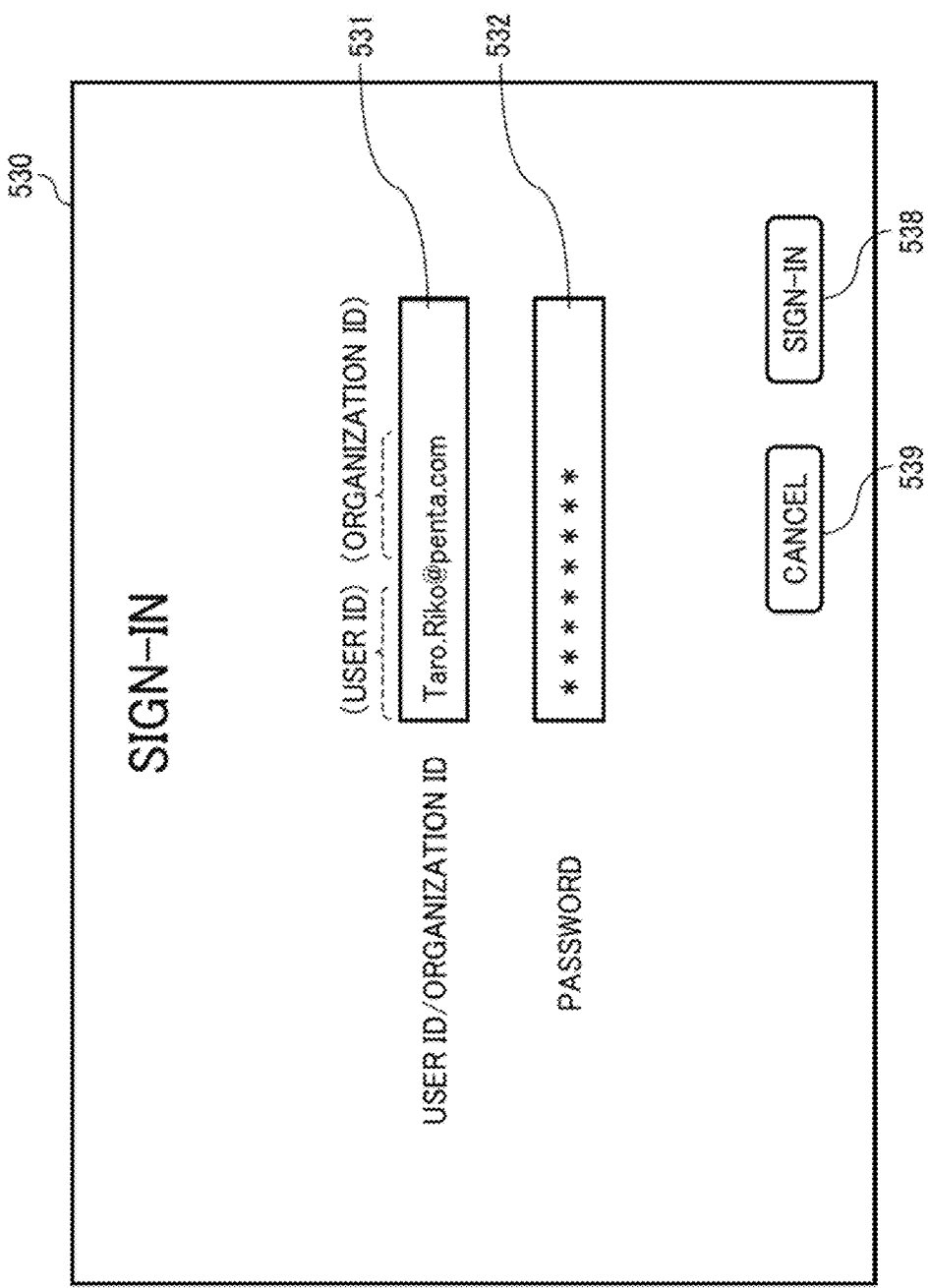
FIG. 16 is an illustration of a sign-in screen, according to an embodiment of the disclosure.
Figure 17:
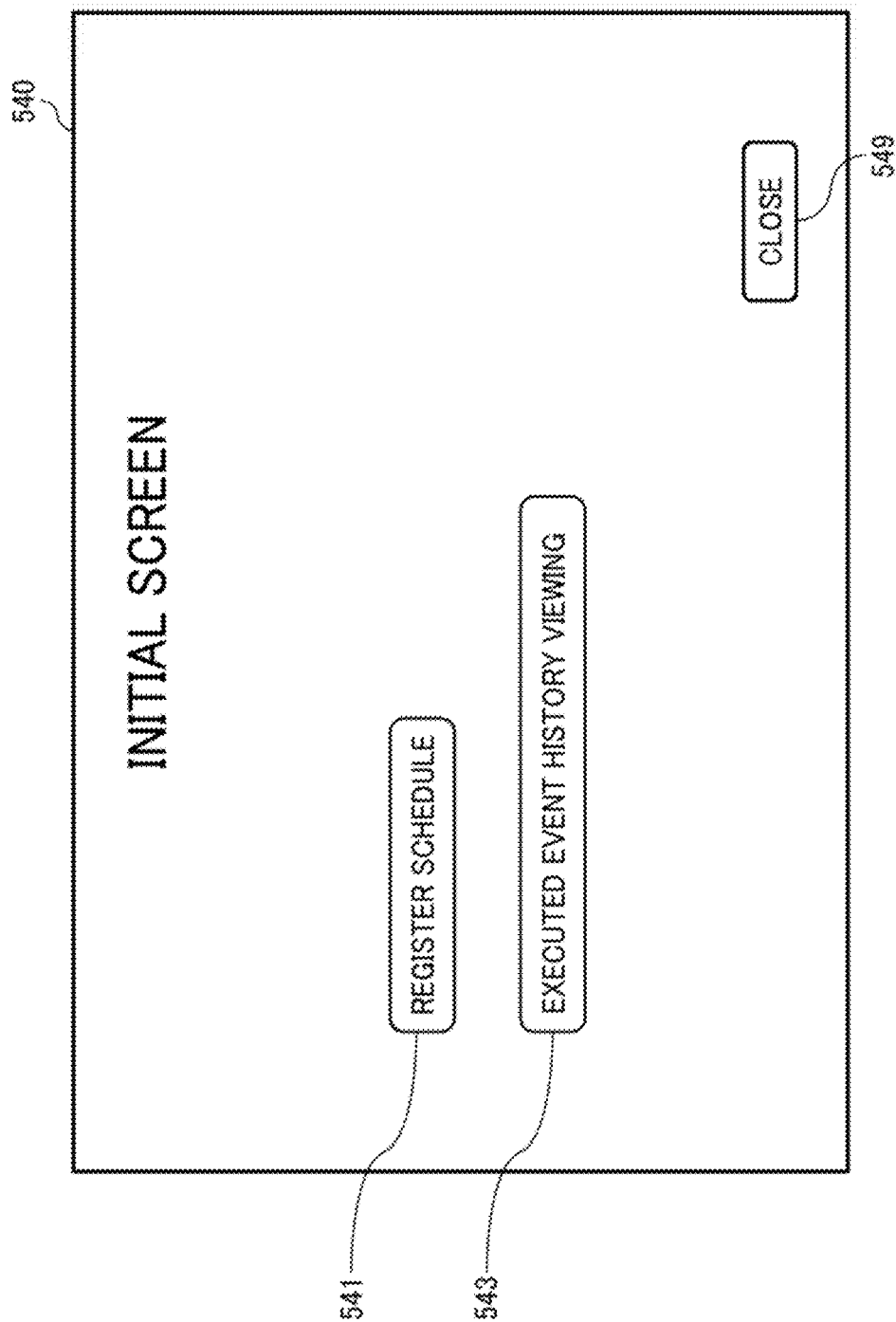
FIG. 17 is an illustration of an initial screen displayed on a PC, according to an embodiment of the disclosure.

FIG. 15 is a sequence diagram illustrating a process of registering a schedule. FIG. 16 is an illustration of a sign-in screen of the PC 5. FIG. 17 is an illustration of an initial screen displayed on the PC 5. FIG. 18 is an illustration of a screen for inputting a schedule, which is hereinafter, also referred to as a schedule input screen.

When the user A operates the keyboard 511 of the PC 5, the display control unit 54 of the PC 5 causes the display 508 to display a sign-in screen 530, which is illustrated in FIG. 16, to perform sign-in processing (step S11).

As illustrated in FIG. 16, the sign-in screen 530 includes an input field 531 for inputting user ID and organization ID of a user, an input field 532 for inputting a password of the user, a sign-in button 538 to be pressed to sign in, and a cancel button 539 to be pressed to cancel the sign-in. In this example case, the user ID and the organization ID defined by an electronic mail (e-mail) address of the user A are input in the input field 531. A part of the e-mail address indicating a user name represents the user ID, and remaining part of the e-mail address indicating a domain name represents the organization ID. Further, the input field 531 may have one field for inputting the user ID and another field for inputting the organization ID separately, instead of inputting the e-mail address in a single field.

Then, when the user A inputs his or her user ID and organization ID in the input field 531, enters his or her password in the input field 532, and then presses the sign-in button 538, the receiving unit 52 receives a sign-in request (step S12).

Then, the transmission/reception unit 51 of the PC 5 transmits, to the schedule management server 8, sign-in request information indicating the sign-in request (step S13). The sign-in request information includes the information (i.e., user ID, organization ID, password) received in step S12. Accordingly, the transmission/reception unit 81 of the schedule management server 8 receives the sign-in request information.

Then, the authentication unit 82 of the schedule management server 8 authenticates the user A using the user ID, the organization ID, and the password (step S14). Specifically, the writing/reading unit 89 refers to the user authentication management DB 8001 (FIG. 11A) to search a set of user ID, organization ID, and password corresponding to a set of the user ID, organization ID, and password received in step S13.

If there is the corresponding set in the user authentication management DB 8001 in step S14, the authentication unit 82 determines that the user A, who is a source of the sign-in request, is an authorized user. If there is no corresponding set in the user authentication management DB 8001 in step S14, the authentication unit 82 determines that the user A is not an authorized user that is the unauthorized user. If the user A is not the authorized user, the transmission/reception unit 81 transmits, to the PC 5, a notification indicating that the user A is not the authorized user. In the following description, it is assumed that the user A is the authorized user.

Then, the transmission/reception unit 81 transmits an authentication result to the PC 5 (step S15). Accordingly, the transmission/reception unit 51 of the PC 5 receives the authentication result.

Then, the display control unit 54 of the PC 5 causes the display 508 to display an initial screen 540, which is illustrated in FIG. 17 (step S16). The initial screen 540 includes a "register schedule" button 541 for registering a schedule, an "executed event history viewing" button 543 for viewing one or more action items, and a "close" button 549.

If the user presses the "register schedule" button 541, the receiving unit 52 receives a schedule registration (step S17).

Then, the transmission/reception unit 51 transmits a schedule registration request to the schedule management server 8 (step S18). Accordingly, the transmission/reception unit 81 of the schedule management server 8 receives the schedule registration request from the PC 5.

Then, the writing/reading unit 89 of the schedule management server 8 searches the user management DB 8002 (FIG. 11B) using the organization ID received in step S13 as a search key to read all user IDs and all user names corresponding to the search key (step S19).

Then, the transmission/reception unit 81 transmits schedule input screen information to the PC 5 (step S20). The schedule input screen information includes the all user IDs and all user names read out in step S19. The all user names include a user name of the user A (i.e., reservation making person) who has input the sign-in in step S12 to reserve the shared resource. Accordingly, the transmission/reception unit 51 of the PC 5 receives the schedule input screen information.

Then, the display control unit 54 of the PC 5 causes the display 508 to display a schedule input screen 550, which is illustrated in FIG. 18 (step S21).

As illustrated in FIG. 18, the schedule input screen 550 includes, for example, input fields 551 to 555, a display field 556, a selection menu 557, an "OK" button 558, and a "CANCEL" button 559.

The input field 551 is used for inputting an event name. The input field 552 is used for inputting a shared resource ID or a shared resource name. The input field 553 is used for inputting a scheduled start date and time of an event (date and time for starting of using a shared resource). The input field 554 is used for inputting a scheduled end date and time of an event (date and time for ending of using a shared resource). The input field 555 is used for entering a memo, such as an agenda. The display field 556 is used for displaying a name of a user who makes a reservation. The selection menu 557 is used for selecting participants other than the user who makes the reservation. The "OK" button 558 is to be pressed to register the reservation. The "CANCEL" button 559 is to be pressed to cancel the inputting of content and the input content. The user name of the user who makes the reservation is the name of the user who has input the sign-in using the PC 5 in step S12. Further, a mouse pointer p1 is also displayed on the schedule input screen 550.

In this example case, an e-mail address can be entered in the input field 552. Further, if a shared resource name is selected in the selection menu 557, the shared resource is also added as a participant.

Then, if the user A inputs information in each of the input fields 551 to 555, selects the name of users (user names) who are desirable participants of an event (e.g., meeting), from the selection menu 557 using the pointer p1, and then presses the "OK" button 558, the receiving unit 52 receives the input of schedule information (step S22).

Then, the transmission/reception unit 51 transmits the input schedule information to the schedule management server 8 (step S23). The schedule information includes event name, shared resource ID or shared resource name, scheduled start date and time, scheduled end date and time, user ID of each participant, and memo. If the shared resource ID is entered in the input field 552 on the schedule input screen 550, the shared resource ID is transmitted. If the shared resource name is entered in the input field 552, the shared resource name is transmitted. The user name can be selected in the selection menu 557 on the schedule input screen 550. Since the user ID is also received in step S20, the user ID corresponding to the user name is transmitted. Accordingly, the transmission/reception unit 81 of the schedule management server 8 receives the schedule information.

Then, the writing/reading unit 89 of the schedule management server 8 searches the shared resource management DB 8003 (FIG. 11C) using the shared resource ID or shared resource name received in step S23 as a search key to read a shared resource ID or shared resource name corresponding to the search key (step S24).

Then, the writing/reading unit 89 stores the reservation information in the shared resource reservation management DB 8004 (FIG. 12A) (step S25). In this case, the writing/reading unit 89 adds one record of the reservation information to the shared resource reservation management table included in the shared resource reservation management DB 8004 managed or controlled by the scheduler, which is registered in advance. The reservation information is configured based on the schedule information received in step S23 and the shared resource name or shared resource ID read out in step S24. Further, the scheduled use start date and time in the shared resource reservation management DB 8004 corresponds to the scheduled start date and time in the schedule information. Further, the scheduled use end date and time in the shared resource reservation management DB 8004 corresponds to the scheduled end date and time in the schedule information.

Further, the writing/reading unit 89 stores the plan information or event information in the event management DB 8005 (FIG. 12B) (step S26). In this case, the writing/reading unit 89 adds one record of plan information to the event management table included in the event management DB 8005 managed or controlled by the scheduler, which is previously registered. The plan information is configured based on the schedule information received in step S23. Further, the scheduled event start date and time in the event management DB 8005 corresponds to the scheduled start date and time in the schedule information. Further, the scheduled event end date and time in the event management DB 8005 corresponds to the scheduled end date and time in the schedule information.

By performing the above described processing, the user A can register his or her schedule at the schedule management server 8.

Figure 19:
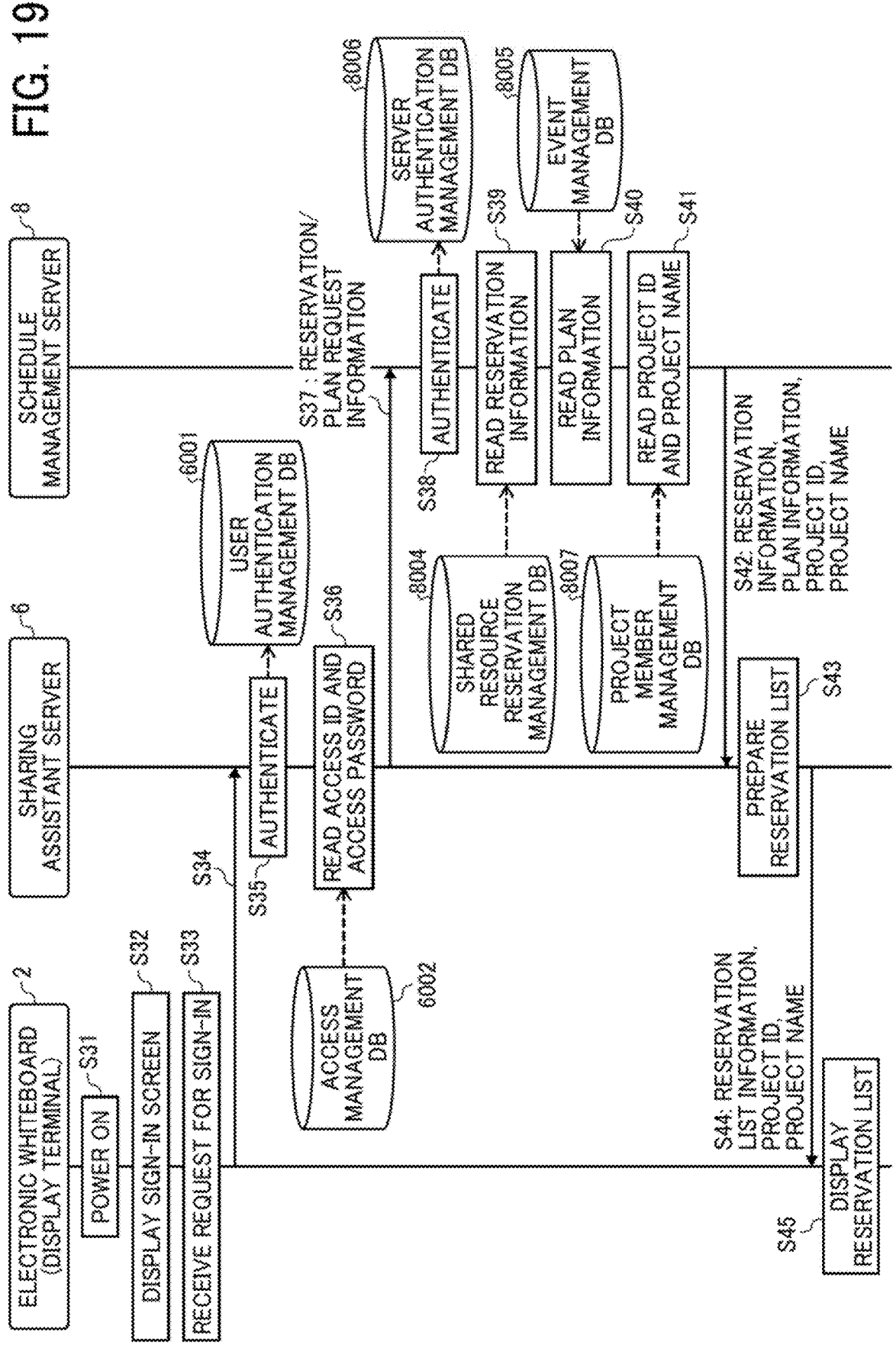
FIG. 19 is a sequence diagram illustrating a process of starting an event, according to an embodiment of the disclosure.
Figure 20:
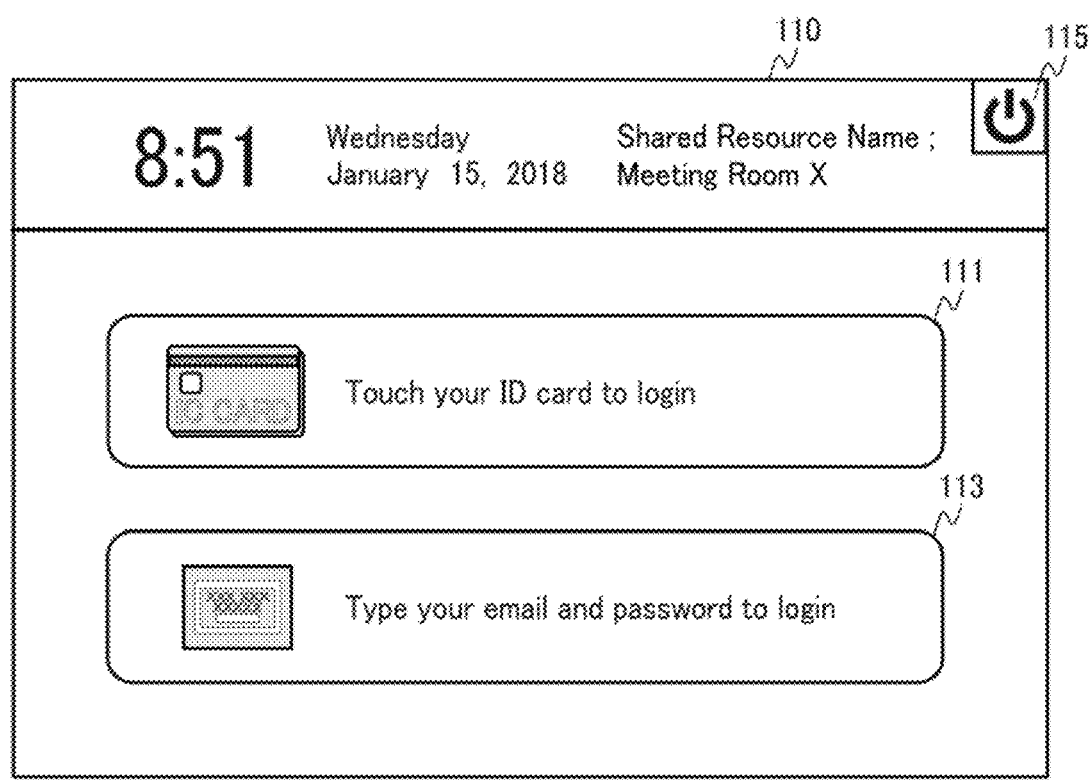
FIG. 20 is an illustration of a sign-in screen displayed on an electronic whiteboard, according to an embodiment of the disclosure.
Figure 22:
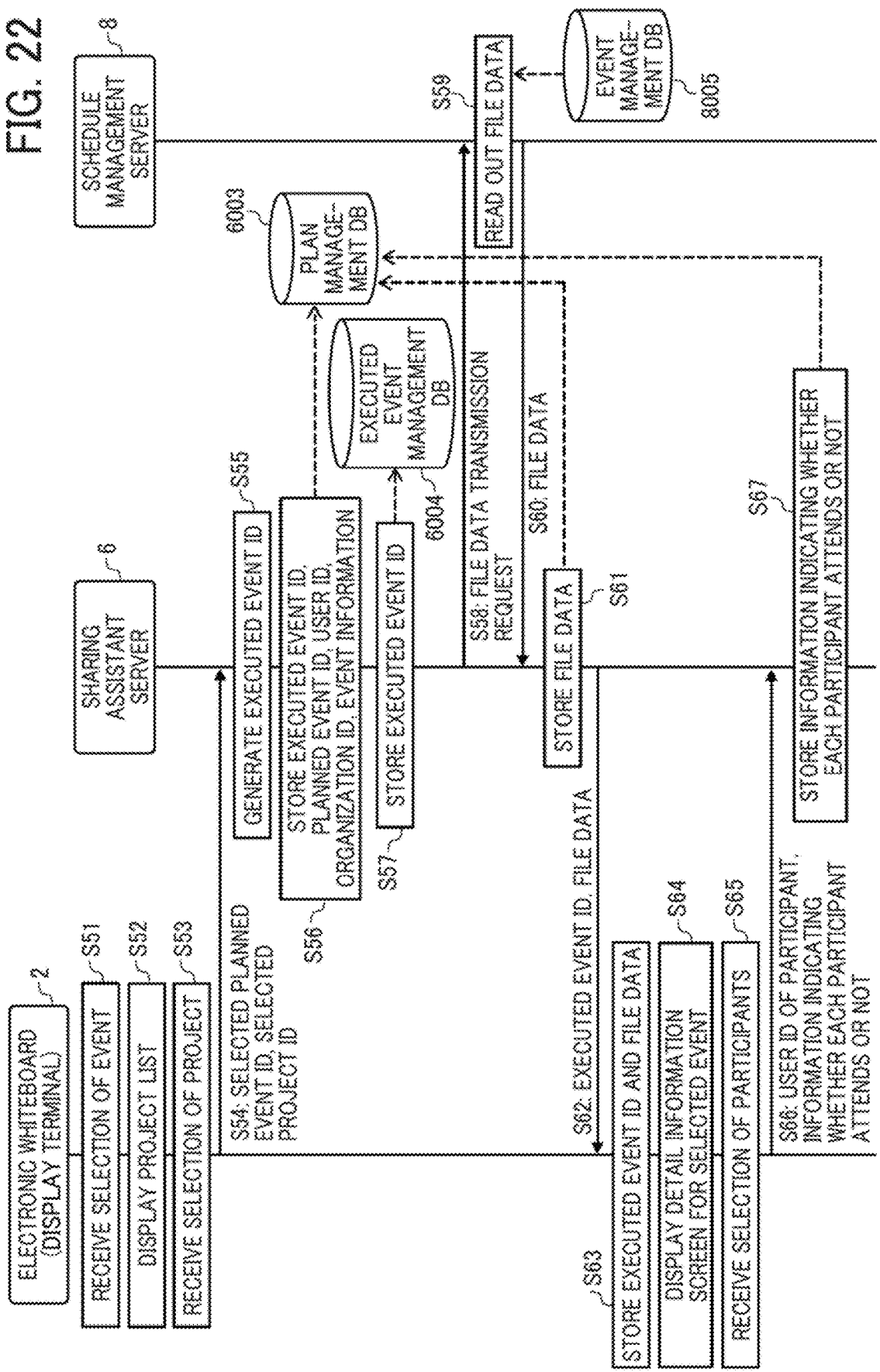
FIG. 22 is a sequence diagram illustrating a process of starting an event, according to an embodiment of the disclosure.
Figure 24:
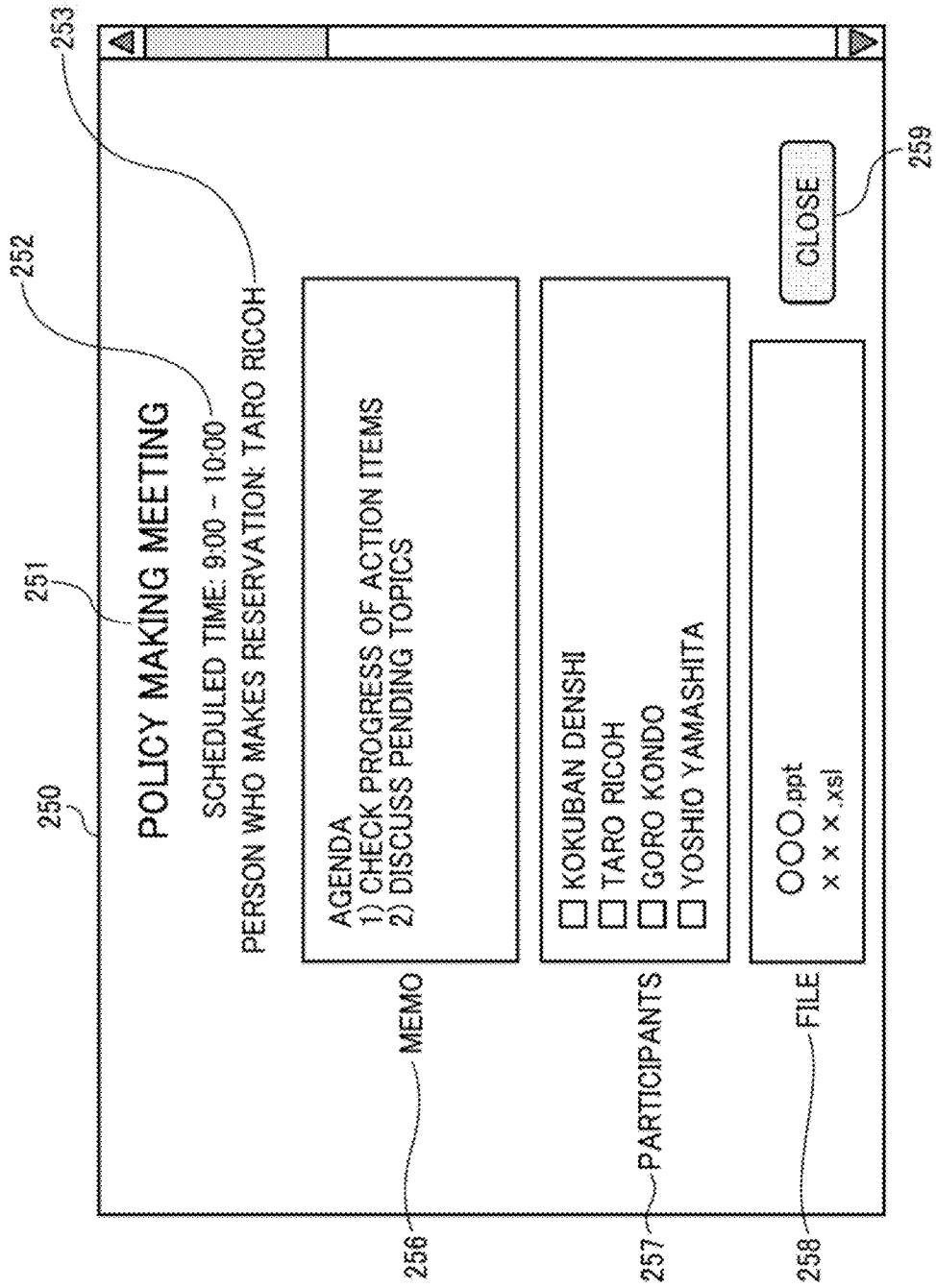
FIG. 24 is an illustration of a detail information screen for an event, according to an embodiment of the disclosure.
Figure 25:
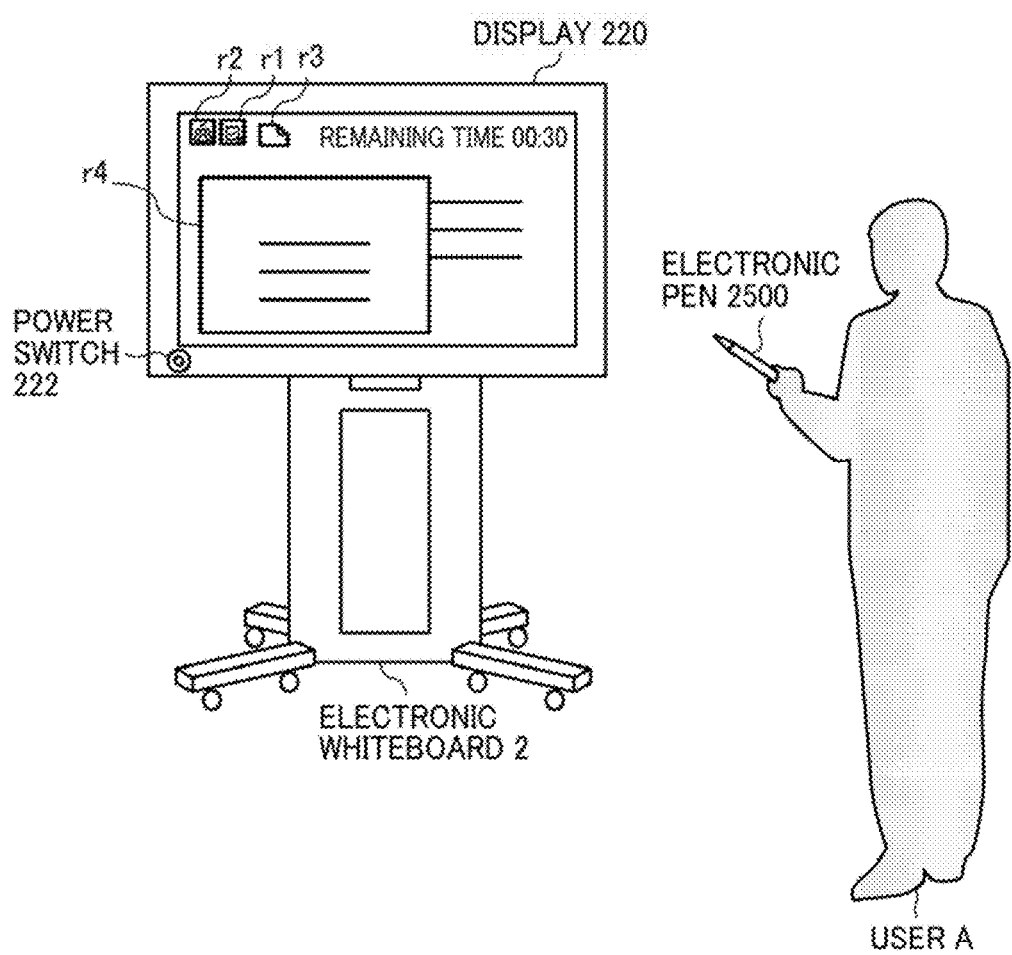
FIG. 25 is an illustration of a use scenario of an electronic whiteboard, according an embodiment of the disclosure.

Process of Starting Event:

Hereinafter, a description is given of a process that the user A (e.g., Taro Ricoh) organizes a meeting with other participants using the electronic whiteboard 2 in the meeting room X that is reserved by the user A in advance with reference to FIGS. 19 to 25. FIGS. 19 and 22 are sequence diagrams each of which illustrates a process of starting an event. FIG. 20 is an illustration of a sign-in screen displayed on the electronic whiteboard 2. FIG. 21 is an illustration of a reservation list screen for shared resource. FIG. 23 is an illustration of a project list screen. FIG. 24 is an illustration of a detail information screen for an event. FIG. 25 is an illustration indicating a use scenario of the electronic whiteboard 2 by a user.

First, when the user A presses the power switch 222 of the electronic whiteboard 2, the receiving unit 22 of the electronic whiteboard 2 receives power ON (step S31). When the power ON is received by the receiving unit 22, the Launcher 102 (FIG. 6) is activated.

Then, the display control unit 24 of the electronic whiteboard 2 causes the display 220 to display a sign-in screen 110, which is illustrated in FIG. 20, to perform the sign-in (step S32). The sign-in screen 110 includes, for example, a selection icon 111 to be pressed when the user A signs in using his or her integrated circuit (IC) card, a selection icon 113 to be pressed when the user A signs in by entering his or her electronic mail address (email) and password, and a power supply icon 115 to be pressed when the power is turned off without executing the sign-in processing.

When the user A presses the selection icon 1 and uses the IC card to establish a communication with the short-range communication circuit 219, such as an IC card reader, or the user A presses the selection icon 113 and enters his or her electronic mail address and password, the receiving unit 22 of the electronic whiteboard 2 receives a request for sign-in processing (step S33). Hereinafter, the request for sign-in processing is also referred to as the sign-in request.

Then, the transmission/reception unit 21 transmits sign-in request information indicating the sign-in request to the sharing assistant server 6 (step S34). The sign-in request information includes, for example, time zone information indicating a country or a region where the electronic whiteboard 2 is located, user ID, organization ID, and password of a user using the display terminal, such as the electronic whiteboard 2. Accordingly, the transmission/reception unit 61 of the sharing assistant server 6 receives the sign-in request information.

Then, the authentication unit 62 of the sharing assistant server 6 authenticates the user A using the user ID, the organization ID, and the password (step S35). Specifically, the writing/reading unit 69 refers to the user authentication management DB 6001 (FIG. 9A) using the user ID, the organization ID, and the password received in step S34 as a search key to search a set of user ID, organization ID, and password corresponding to a set of the user ID, the organization ID, and the password received in step S34.

If there is the corresponding set in the user authentication management DB 6001 in step S35, the authentication unit 62 determines that the user A, who is a source of the sign-in request, is an authorized user. If there is no corresponding set in the user authentication management DB 6001 in step S35, the authentication unit 62 determines that the user A, who is a source of the sign-in request, is not an authorized user that is the unauthorized user. If the user A is not the authorized user, the transmission/reception unit 61 transmits, to the electronic whiteboard 2, a notification indicating that the user A is not the authorized user. In the following description, it is assumed that the user A is the authorized user.

Then, the writing/reading unit 69 of the sharing assistant server 6 searches the access management DB 6002 (FIG. 9B) using the organization ID received in step S34 as a search key to read an access ID and an access password corresponding to the search key (step S36).

Then, the transmission/reception unit 61 transmits, to the schedule management server 8, reservation request information indicating a request for shared resource reservation information and plan request information indicating a request for plan information of the user (step S37). The reservation request information and the plan request information include the time zone information and the user ID and the organization ID of the user using the display terminal received in step S34, and the access ID and the password read out in step S36. Accordingly, the transmission/reception unit 81 of the schedule management server 8 receives the reservation request information and the plan request information.

Then, the authentication unit 82 of the schedule management server 8 authenticates the sharing assistant server 6 using the access ID and access password (step S38). Specifically, the writing/reading unit 89 refers to the server authentication management DB 8006 (FIG. 13A) to search a pair of access ID and access password corresponding to a pair of the access ID and access password received in step S37.

If there is the corresponding pair in the server authentication management DB 8006 in step S38, the authentication unit 82 determines that the access of the sharing assistant server 6, which is a source of the request, is authorized. If there is no corresponding pair in the server authentication management DB 8006 in step S38, the authentication unit 82 determines that the access of the sharing assistant server 6, which is a source of the sign-in request, is not authorized. When the access of the sharing assistant server 6 is not authorized, the transmission/reception unit 81 transmits, to the sharing assistant server 6, a notification indicating that the access is not authorized. In the following description, it is assumed that the sharing assistant server 6 is authorized for access.

Then, the writing/reading unit 89 of the schedule management server 8 searches the shared resource reservation management DB 8004 (FIG. 12A), which is managed or controlled by the scheduler as described above, using the user ID of the user using the display terminal received in step S37 as a search key to read reservation information corresponding to the search key (step S39). In this example case, the writing/reading unit 89 reads the reservation information having the scheduled use start date and time set with "today."

Further, the writing/reading unit 89 searches the event management DB 8005 (FIG. 12B), which is described as above, using the user ID of the user using the display terminal received in step S37 as a search key to read out plan information corresponding to the search key (step S40). In this example case, the writing/reading unit 89 read outs the plan information having the scheduled event start date and time set with "today." If the schedule management server 8 is located in a country or a region different from the display terminal such as the electronic whiteboard 2, the time zone is adjusted in view of the country or the region where the display terminal is located with reference to the time zone information.

Then, the writing/reading unit 89 searches the project member management DB 8007 (FIG. 13B) using the user ID of the user using the display terminal received in step S37 as a search key to read out the project ID and project name of one or more projects including the user ID of the user using the display terminal (step S41).

Then, the transmission/reception unit 81 transmits, to the sharing assistant server 6, the reservation information read out in step S39, the plan information read out in step S40, and all project IDs and all project names read out in step S41 (step S42). Accordingly, the transmission/reception unit 61 of the sharing assistant server 6 receives the reservation information, the plan information, and all project IDs and all project names.

Then, the creation unit 63 of the sharing assistant server 6 creates a reservation list based on the reservation information and the plan information received in step S42 (step S43).

Then, the transmission/reception unit 61 transmits, to the electronic whiteboard 2, reservation list information indicating content of the reservation list, and all project IDs and all project names (step S44). Accordingly, the transmission/reception unit 21 of the electronic whiteboard 2 receives the reservation list information, all project IDs, and all project names.

Then, the display control unit 24 of the electronic whiteboard 2 causes the display 220 to display a reservation list screen 230, which is illustrated in FIG. 21 (step S45).

As illustrated in FIG. 21, the reservation list screen 230 includes a display area 231 for displaying a shared resource name (in this example, a name of place) and a display area 232 for displaying date and time of today. Further, the reservation list screen 230 displays event information 235, 236, and 237 indicating respective events that utilize a specific shared resource (in this example case, the meeting room X) in today. The event information includes, for each event, scheduled use start time to start to use the shared resource and scheduled use end time to end to use the shared resource, event name, and user ID of a user who has made the reservation. The event information is further provided with start buttons 235s, 236s, and 237s, which are to be pressed by the user to specify an event to be started.

Then, in FIG. 22, when the user A presses the start button 235s (FIG. 21) using, for example, the electronic pen 2500, the receiving unit 22 receives the selection of an event indicated by the event information 235 (step S51).

Then, the display control unit 24 causes the display 220 to display a project list screen 240, which is illustrated in FIG. 23, based on the project ID and the project name received in step S42 (step S52). As illustrated in FIG. 23, the project list screen 240 includes project icons 241 to 246 indicating each project. Further, the project list screen 240 includes an "OK" button 248 to be pressed to confirm a selected project icon, and a "CANCEL" button 249 for canceling the selection of the project icon.

Then, when the user A presses the project icon 241 (FIG. 23) using, for example, the electronic pen 2500, the receiving unit 22 receives the selection of a project indicated by the project icon 241 (step S53).

Then, the transmission/reception unit 21 of the electronic whiteboard 2 transmits, to the sharing assistant server 6, the planned event ID indicating the planned event selected in step S51 and the project ID indicating the project selected in step S53 (step S54). In step S54, transmission of executed event identification information is requested. Accordingly, the transmission/reception unit 61 of the sharing assistant server 6 receives the selected planned event ID and the selected project ID.

Then, the generation unit 64 of the sharing assistant server 6 generates a unique executed event ID (step S55).

Then, the writing/reading unit 69 stores the executed event ID generated in step S55, the planned event ID received in step S54, the user ID and the organization ID of the user (i.e., reservation making person), and the event information, in association with each other in the memory 6000 (step S56). The user ID and the organization ID of the user (i.e., reservation making person) and the event information are IDs and information based on the reservation information and the plan information received in step S42. At this stage, no information is input in a column of participation of each user (i.e., presence or absence) in the plan management table (FIG. 9C), which indicates whether each user attends the meeting or not.

Then, the writing/reading unit 69 stores the project ID received in step S54 and the executed event ID generated in step S55, in association with each other in the memory 600 (step S57).

Then, the transmission/reception unit 61 transmits, to the schedule management server 8, file data transmission request information indicating a transmission request of file data registered in the schedule management server 8 (step S58). The file data transmission request information includes the event ID received in step S54, the user ID and the organization ID of the user using the display terminal received in step S34, and the access ID and access password read out in step S36. Accordingly, the transmission/reception unit 81 of the schedule management server 8 receives the file data transmission request information.

Then, the writing/reading unit 89 of the schedule management server 8 searches the event management DB 8005 using the event ID received in step S58 as a search key to read out a file data associated with the event ID (step S59).

Then, the transmission/reception unit 81 transmits the file data read out in step S59 to the sharing assistant server 6 (step S60). Accordingly, the transmission/reception unit 61 of the sharing assistant server 6 receives the file data.

Then, the writing/reading unit 69 of the sharing assistant server 6 stores, in the plan management DB 6003, the file data received in step S60 in association with the planned event ID received in step S54 and the executed event ID generated in step S55 (step S61).

Then, the transmission/reception unit 61 of the sharing assistant server 6 transmits, to the electronic whiteboard 2, the executed event ID generated in step S55 and the file data received in step S60 (step S62). Accordingly, the transmission/reception unit 21 of the electronic whiteboard 2 receives the executed event ID and the file data.

Then, the writing/reading unit 29 of the electronic whiteboard 2 stores the executed event ID and the file data in the memory 2000 (step S63). At this stage, the file data transmitted from the sharing assistant server 6 is stored in a specific storage region of the memory 2000. Therefore, the electronic whiteboard 2 accesses the specific storage region while executing the event, and the display control unit 24 causes the display 220 to display the file data stored in the specific storage region.

Then, the display control unit 24 causes the display 220 to display a detail information screen 250 including detail information on the selected event as illustrated in FIG. 24 (step S64). As illustrated in FIG. 24, the detail information screen 250 settable for the event includes, for example, a display area 251 for displaying an event name, a display area 252 for displaying scheduled date and time to execute the event (scheduled start time and scheduled end time), and a display area 253 for displaying a name of user who has made the reservation.

Further, the detail information screen 250 settable for the event displays a display area 256 for displaying content of memo, a display area 257 for displaying names of expected participants, and a display area 258 for displaying identification information (e.g., file name) identifying specific file data stored in the specific storage region of the memory 2000.

The display area 257 displays the name of the user who has made the reservation and the name of the other participants, which are indicated in FIG. 18, and check boxes set for each user to check or confirm whether each user actually attends the meeting.

The display area 258 displays the file data stored in the specific storage region of the memory 2000, that is, the file name of file data downloaded from the sharing assistant server 6, and the file name of file data being downloaded currently from the sharing assistant server 6.

Further, the detail information screen 250 settable for the event includes a "CLOSE" button 259 for closing the detail information screen 250, at a lower right part of the detail information screen 250.

Then, if the user inputs a check mark in the check box of the user who actually participates the event and presses the "CLOSE" button 259, the receiving unit 22 receives the selection of participant (step S65).

Then, the transmission/reception unit 21 transmits, to the sharing assistant server 6, the user ID of each user who is an expected participant and information on participation of each user (i.e., presence or absence) indicating whether each user attends the meeting or not (step S66). Accordingly, the transmission/reception unit 61 of the sharing assistant server 6 receives the user ID of each user who is the expected participant and information on participation of each user (i.e., presence or absence) indicating whether each user attends the meeting or not.

Then, in the sharing assistant server 6, the information on participation of each user (i.e., presence or absence) indicating whether each user attends the meeting or not is stored in the column of participation of each user set in the plan management DB 6003 (step S67), which is not yet input in step S56.

As described above, the user A starts the event (e.g., policy making meeting) using the shared resource (e.g., meeting room X) and the display terminal (e.g., electronic whiteboard 2). Then, as illustrated in FIG. 25, the user A can organize the meeting using the electronic whiteboard 2 in the meeting room X. As illustrated in FIG. 25, the display control unit 24 displays the remaining time at the upper right region of the display 220, indicating a time period that the shared resource can be used. In this case, the display control unit 24 displays the time (remaining time) between the current time and the scheduled end date and time indicated by the event information selected in step S51.

Further, as illustrated in FIG. 25, the display control unit 24 displays icons r1, r2, and r3 and file data r4 on the display 220. The icon r1 is to be pressed when an action item is to be registered. The icon r2 is to be pressed when the executed event history is to be viewed. The icon r3 is to be pressed when the document file stored in the specific storage region of the memory 2000 is to be viewed. The file data r4 corresponds to the document file. The icon r3 is an example of a selection image that receives a selection and displaying of the file data stored in the specific storage region. For example, when the user of the electronic whiteboard 2 presses the icon r3, the receiving unit 22 receives the selection of the icon r3, and then the display control unit 54 displays the file data r4 of the document file stored in the specific storage region of the memory 2000.

Figure 26:
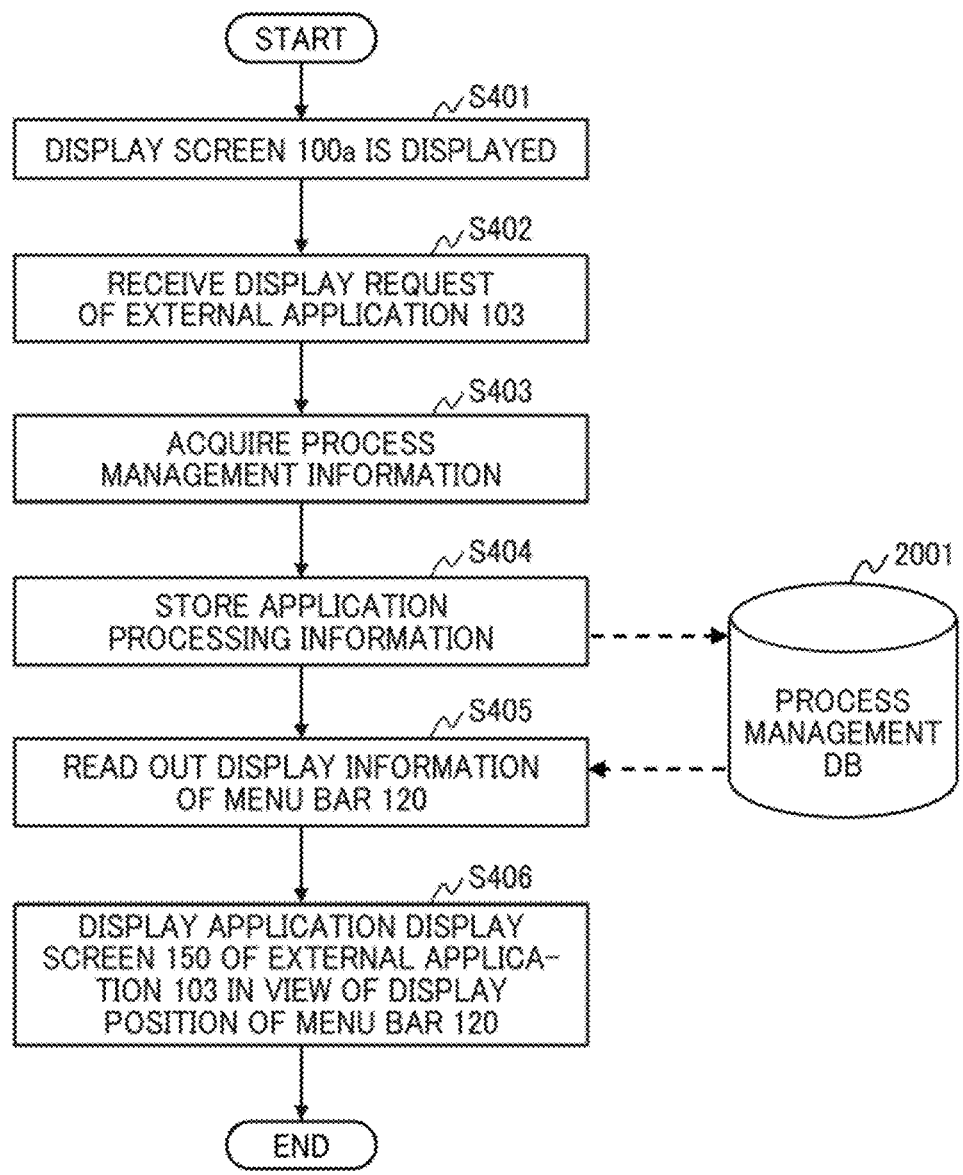
FIG. 26 is an example of a flowchart illustrating a process of displaying an application display screen, according an embodiment of the disclosure.

Processing while Executing Event:

Hereinafter, a description is given of a process while executing an event that has been started using the above described event initiation processing with reference to FIGS. 26 to 32. FIG. 26 is an example of a flowchart illustrating a process of displaying an application display screen. Hereinafter, the operation display screen (window) of the external application 103 is referred to as the application display screen.

Figure 27:
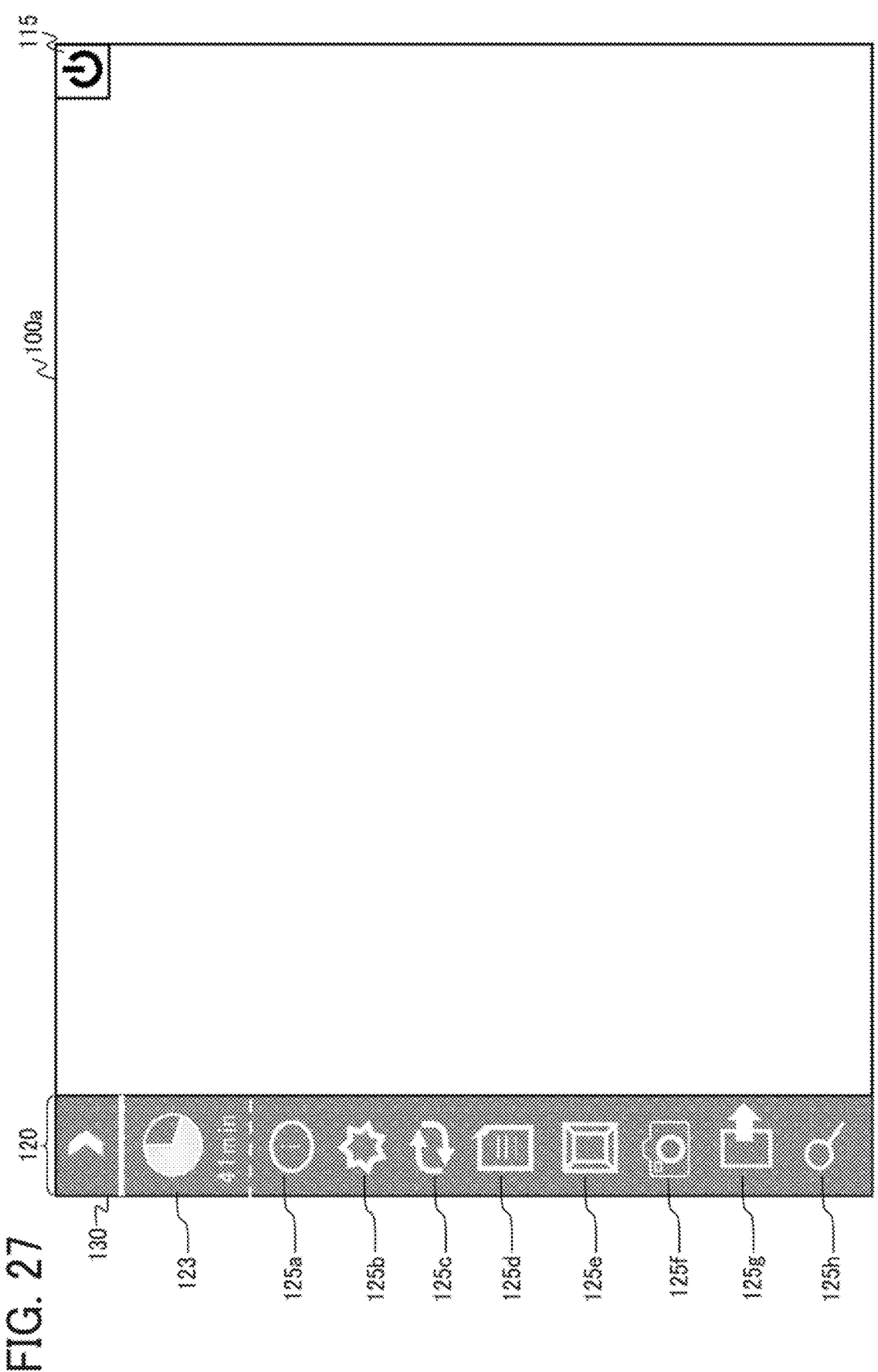
FIG. 27 is an example of a display screen displayed on an electronic whiteboard when an event is started, according an embodiment of the disclosure.
Figure 28:
FIGS. 28A, 28B and 28C are examples of application display screens displayed on a display when a schedule viewer is activated, according an embodiment of the disclosure.

In step S401, when an event is started by performing the event initiation processing, the display control unit 24 displays a display screen 100a, indicated in FIG. 27, on the display 220 (an example of first display control step). FIG. 27 is an example of a display screen displayed on the electronic whiteboard 2 when the event is started. As indicated in FIG. 27, the display screen 100a includes, for example, the menu bar 120 and the power supply icon 115 to be pressed when the electric power supply of the electronic whiteboard 2 is turned off.

The menu bar 120 is an example of the operation display screen (window) of the Launcher 102. The menu bar 120 includes, for example, a display position change icon 130, time information icon 123, and a plurality of operations icons 125 (e.g., operations icons 125a to 125h).

The display position change icon 130 is pressed to change a display position of the menu bar 120. The time information icon 123 indicates the time elapsed from the start of event or the remaining time until the end of the event. Each of the plurality of operations icons 125 (e.g., operations icons 125a to 125h) is selected (pressed) to perform various processing during the execution of the event.

The operation icon 125a is selected (pressed) to view detailed information on the executing event.

The operation icon 125b is selected (pressed) when the external application 103, such as various external applications, is to be activated.

The operation icon 125c is selected (pressed) when the application display screen of the activated external application 103 is switched.

The operation icon 125d is selected (pressed) when the file data stored in the specific storage region of the memory 2000 is to be viewed.

The operation icon 125*e* is selected (pressed) when a screen size of the application display screen of the external application 103 is to be changed.

The operation icon 125*f* is selected (pressed) when the display screen 100 displayed on the display 220 is to be captured.

The operation icon 125*g* is selected (pressed) when to end the executing event.

The operation icon 125*h* is selected (pressed) when to activate the browser application 103*c* to perform a searching operation using the browser.

The various operation icons included in the display screen displayed on the electronic whiteboard 2 are an example of "reception area." The reception area can be represented by, for example, characters, such as "change" or a combination of image and character in addition to the icon and button. The image used for the reception area can be any image that a user can visually recognize, such as illustration and patterns, in addition to the symbol and figure. The reception area is any area that can receive a user input, and may be expressed in any term (e.g., operation area) other than the reception area.

The selection (pressing) of various operation icons is an example of an operation to various icons. The operation to various operation icons include, for example, an input operation to the display 220 using the electronic pen 2500, a double-click or a single-click by a mouse, which is an example of the input unit provided for the PC 2700, and an input operation using a keyboard, which is an example of the input unit provided for the PC 2700. The display position change icon 130 is an example of the reception area, which is used to change the display position of the menu bar 120 (an example of a second operation display screen).

Then, if a user selects the operation icon 125 of the menu bar 120, the receiving unit 22 receives a display request of the external application 103 (step S402). Specifically, if the user selects the operation icon 125*b*, the receiving unit 22 receives the display request of the schedule viewer 103*a* indicated in FIG. 6. Further, if the user selects the operation icon 125*d*, the receiving unit 22 receives a display request of the file viewer 103*b* indicated in FIG. 6. Further, if the user selects the operation icon 125*h*, the receiving unit 22 receives a display request of the browser application 103*c* indicated in FIG. 6. The selection of the operation icon 125*b* of the menu bar 120 is an example of a pre-set input operation to the second operation display screen. The external application 103 is activated in response to the selection of the operation icon 125*b* of the menu bar 120.

Hereinafter, a description is given of an application display screen 150 displayed on the display 220, which is an example of the application display screen corresponding to the external application 103 when the schedule viewer 103*a* is activated with reference to FIGS. 28A, 28B and 28C.

FIGS. 28A, 28B and 28C are examples of application display screens displayed on the display 220 when the schedule viewer 103*a* is activated. The application display screens 150*a* to 150*c* respectively indicated in FIGS. 28A to 20C include detailed information on the executing event. Each of the application display screens 150*a* to 150*c* includes information on event name, name of shared resource (location name), and scheduled execution time of event (scheduled event start time and scheduled event end time). Further, each of the application display screens 150*a* to 150*c* includes, for example, a docking icon 151 for changing the link setting with the menu bar 120, and a close icon 153 for closing the application display screens 150*a* to 150*c*.

The application display screen 150*a* indicated in FIG. 28A is a screen displayed in a state when an icon 155 is pressed, and includes content of a memo input in step S22 of FIG. 15.

Further, the application display screen 150*b* indicated in FIG. 28B is a screen displayed in a state when an icon 156 is pressed, and includes information on an event reservation making person name and participant name, and an "add participant" icon 159 for adding the participant.

Further, the application display screen 150*c* indicated in FIG. 28C is a screen displayed in a state when an icon 157 is pressed, and includes information of file data stored in the specific storage region of the memory 2000.

Referring back to FIG. 26, after the receiving unit 22 receives the display request of the external application 103 in step S402, the application control unit 27 acquires the process management information of the external application 103 (step S403). Specifically, when the receiving unit 22 receives the display request of the external application 103 in step S402, the application control unit 27 acquires the process ID of the external application 103 in step S403. Then, the application control unit 27 acquires a windows handle based on the acquired process ID.

Then, the writing/reading unit 29 stores application processing information including the process management information acquired in step S403 into the process management DB 2001 (step S404). The writing/reading unit 29 stores the link setting with the Launcher 102 and the display information of application in the process management DB 2001 (see FIG. 8) in association with the process management information (process ID and windows handle) acquired in step S403. The display information of application can be pre-set depending on a type of the external application 103, or the display information of application can inherit the display position or display size used at the time of the last activation. In this description, the link setting is set "ON" when the external application 103 is activated, but the link setting can be configured to be set to "OFF."

Then, the writing/reading unit 29 searches the process management DB 2001 to read out display information of the menu bar 120 (step S405). At this stage, the writing/reading unit 29 reads out information on the display position and display size of the menu bar 120 using the process ID and the windows handle of the menu bar 120 as a search key.

Figure 29:
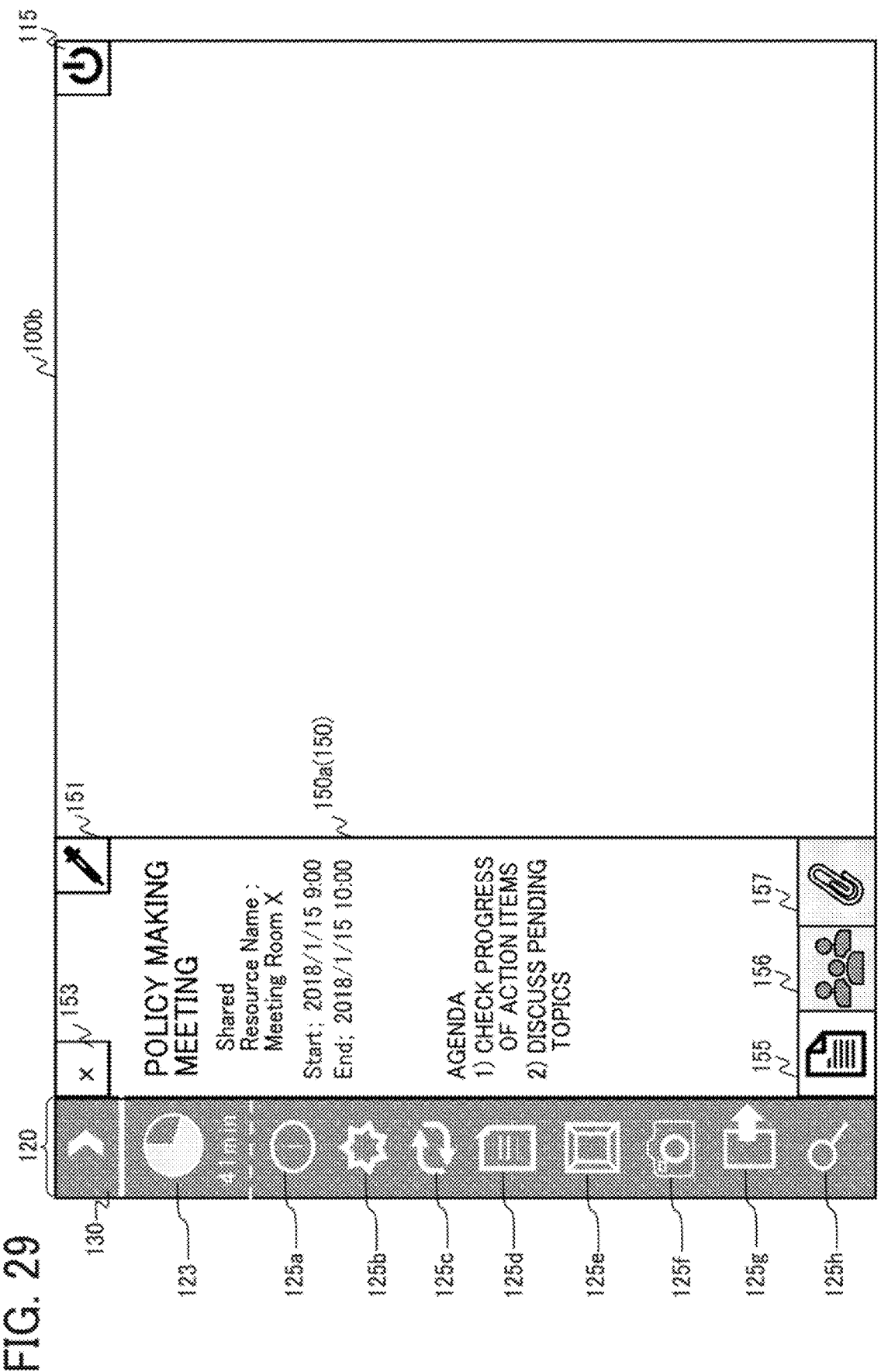
FIG. 29 is an example of application display screen displayed on a display when link setting is ON, according an embodiment of the disclosure.
Figure 30:
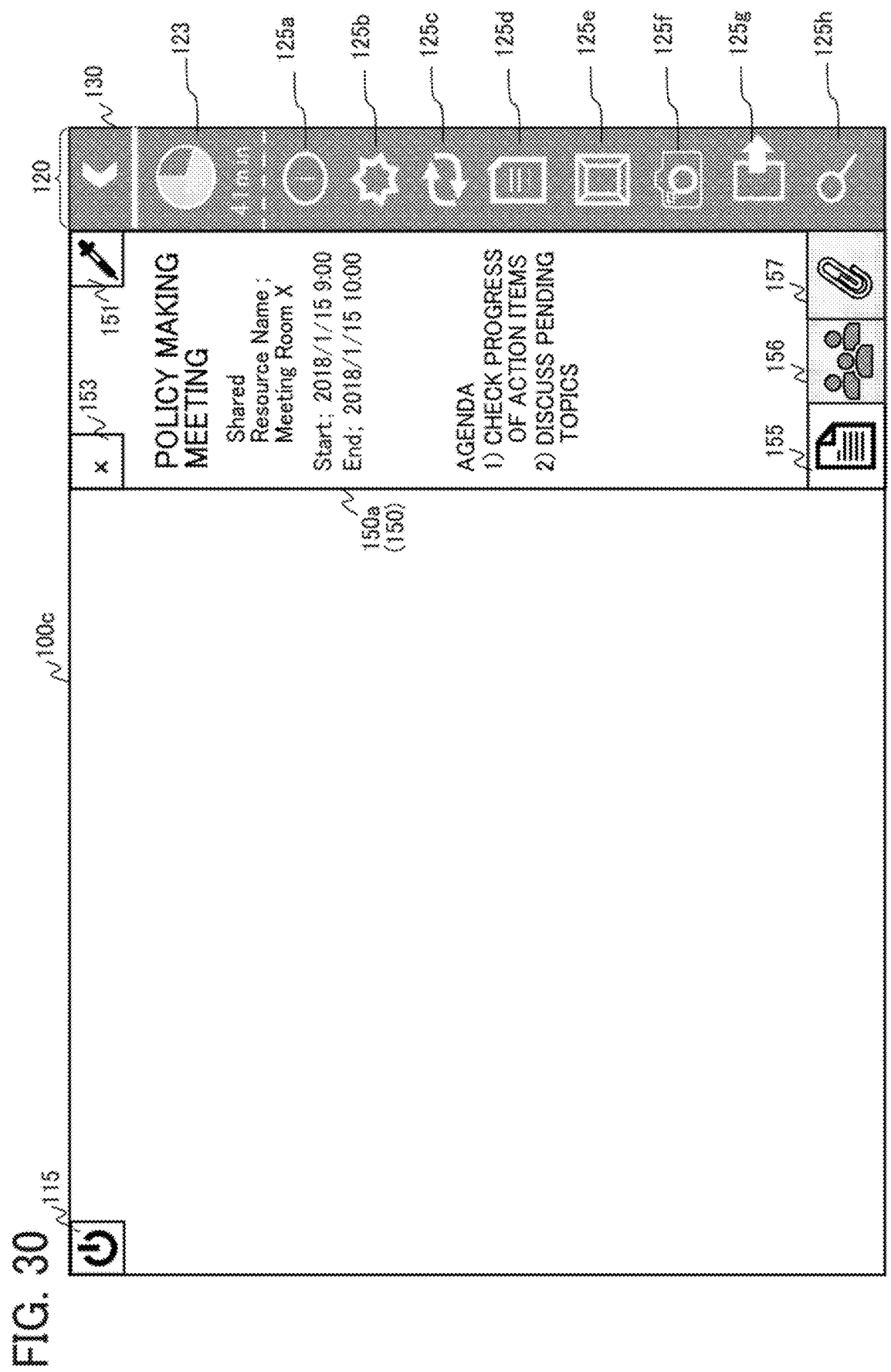
FIG. 30 is another example of application display screen displayed on a display when link setting is ON, according an embodiment of the disclosure.

Then, based on the display information of the menu bar 120 read out in step S405, the display control unit 24 displays the application display screen 150 at a display position in view of the display position of the menu bar 120 on the display 220 (step S406). For example, the display control unit 24 displays the application display screen 150 adjacent to the menu bar 120. More specifically, if the display position of the menu bar 120 is displayed on the left side of the display 220, as indicated in FIG. 29, the display control unit 24 displays the application display screen 150*a* on the left side of the display 220 as similar to the display position of the menu bar 120. On the other hand, for example, if the display position of the menu bar 120 is displayed on the right side of the display 220, as indicated in FIG. 30, the display control unit 24 displays the application display screen 150*a* to the right side of the display 220 as similar to the display position of the menu bar 120.

As described above, the display control unit 24 of the electronic whiteboard 2 can change the display position of the application display screen 150 of the external application 103 in connection with the display position of the menu bar 120, which is the operation display screen of the Launcher 102, with which the operability of user who operates the electronic whiteboard 2 can be improved.

Further, the display control unit 24 can control the display position of the application display screen 150, which can be changed in connection with the change of the display position of the menu bar 120, based on the display position of the menu bar 120 on the display 220. Specifically, if the display position change icon 130, to be described later, is selected while the application display screen 150a is being displayed adjacently on one side of the menu bar 120 (e.g., the right side of the menu bar 120 as indicated in FIG. 29), the display control unit 24 displays the application display screen 150a adjacent to another side of the menu bar 120 (e.g., the left side of the menu bar 120 as indicated in FIG. 30).

Figure 31:
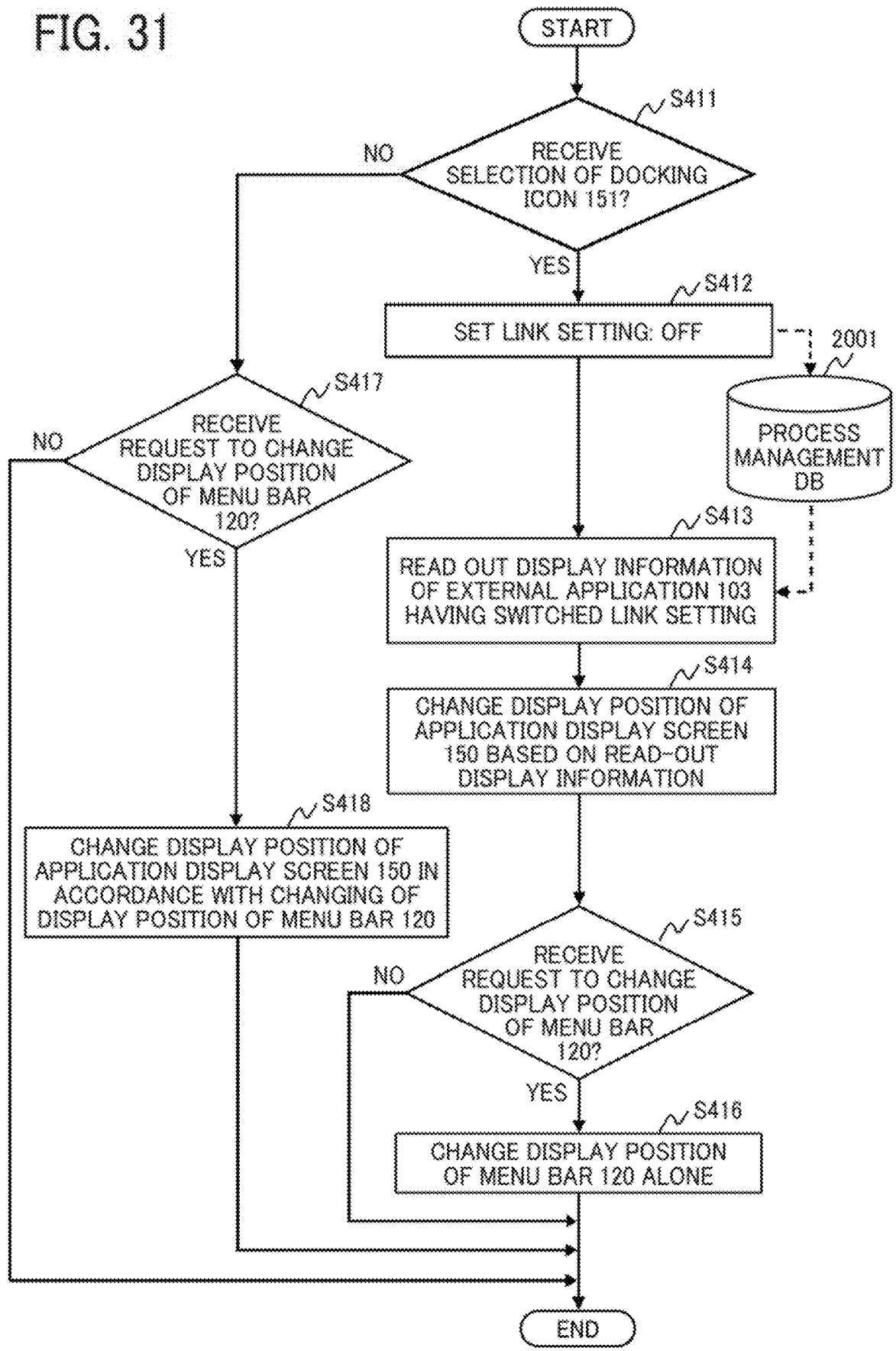
FIG. 31 is a flowchart illustrating a process of changing a display position of an application display screen, according an embodiment of the disclosure.

Change of Link Setting:

Hereinafter, a description is given of a process of changing the link setting of the application display screen 150 with respect to the menu bar 120 with reference to FIGS. 31 and 32. FIG. 31 is a flowchart illustrating a process of changing the display position of the application display screen 150. The process of changing the display position of the application display screen 150 indicated in FIG. 31 is a process of changing the display position of the application display screen 150 displayed on the display 220 in accordance with the link setting with respect to the menu bar 120. FIG. 31 illustrates a case that the link setting of the external application 103, displaying the application display screen 150 is on the display 220, is set "ON."

In step S411, if the receiving unit 22 receives a selection of the docking icon 151 included in the application display screen 150 being displayed on the display 220 (S411: YES), the sequence proceeds to step S412.

Then, the application control unit 27 sets the link setting of the external application 103, corresponding to the application display screen 150 that has received the selection of the docking icon 151, to "OFF" (step S412). In example cases of FIG. 29 or FIG. 30, the application control unit 27 switches the link setting associated with the schedule viewer 103a to "OFF" in the process management DB 2001.

Then, the writing/reading unit 29 reads out the display information of the external application 103 having the link setting that is switched in step S412 (step S413). In example cases of FIG. 29 or FIG. 30, the writing/reading unit 29 reads out the display information associated with the schedule viewer 103a in the process management DB 2001.

Figure 32:
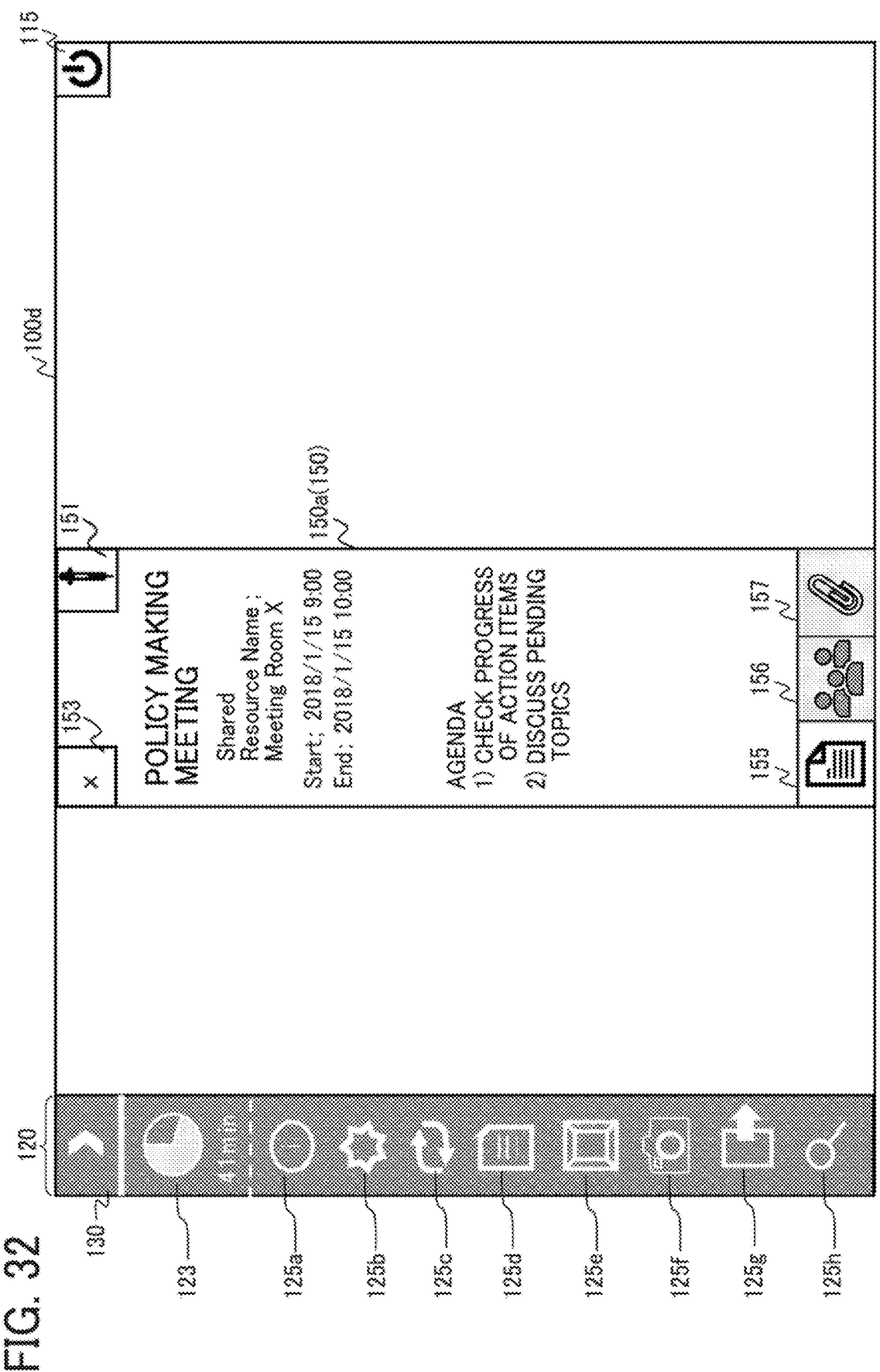
FIG. 32 is an example of an application display screen when link setting is OFF, according an embodiment of the disclosure.

Then, based on the display information read out in step S413, the display control unit 24 changes the display position of the application display screen 150 of the external application 103 (step S414) as indicated in FIG. 32. FIG. 32 is an example of the application display screen 150 when the link setting is OFF. A display screen 100d indicated in FIG. 32 is a screen when the link setting is switched to the "OFF" on the display screen 100b or the display screen 100c indicated in FIG. 29 or FIG. 30. The display screen 100d indicated in FIG. 32 displays the application display screen 150a independently from the menu bar 120. The application display screen 150a is displayed on the display 220 based on the display position and display size indicated by the display information read out in step S413.

Further, in step S415, if the receiving unit 22 receives a request to change the display position of the menu bar 120 (S415: YES), the reception unit 31 proceeds the sequence to step S416. When a user selects (presses) the display position change icon 130 of the menu bar 120, the receiving unit 22 receives a request to change the display position of the menu bar 120. On the other hand, if the receiving unit 22 does not receive the request to change the display position of the menu bar 120 (S415: NO), that is, when the user does not select (press) the display position change icon 130 of the menu bar 120, the sequence ends.

Then, if the display position change icon 130 is selected and the change request is received by the receiving unit 22 (S415: YES), in step S416, the display control unit 24 changes the display position of the menu bar 120 alone (an example of second display control step). In this case, since the link setting is set "OFF," the display position of the application display screen 150 of the external application 103 is not changed.

As described above, when the application control unit 27 of the electronic whiteboard 2 receives the selection of the docking icon 151 (an example of the input region) via the receiving unit 22, the application control unit 27 of the electronic whiteboard 2 sets the link setting of the menu bar 120 to "OFF." Then, when the link setting is switched to "OFF," the display control unit 24 displays the application display screen 150 at the display position indicated by the display information stored in the process management DB 2001. Thus, the electronic whiteboard 2 can change the display position of the application display screen 150 by switching the link setting, with which the display screen of the electronic whiteboard 2 can be changed flexibly.

On the other hand, if the selection of the docking icon 151 included in the application display screen 150 displayed on the display 220 is not received in step S411 (S411: NO), the sequence proceeds to step S417.

In step S417, if the receiving unit 22 receives a request to change the display position of the menu bar 120 (S417: YES), the sequence proceeds to step S418. The receiving unit 22 receives the request to change the display position of the menu bar 120 when the user selects (presses) the display position change icon 130 of the menu bar 120. On the other hand, if the receiving unit 22 does not receive the request to change the display position of the menu bar 120 (S417: NO), that is if the user does not select the display position change icon 130 of the menu bar 120, the sequence ends.

If the display position change icon 130 of the menu bar 120 is selected (S417: YES), in step S418, the display control unit 24 changes the display position of the application display screen 150 in connection with the display position of the menu bar 120 to be changed based on the selection of the display position change icon 130 (an example of second display control step). For example, if the display position change icon 130 is selected on the display screen 100 indicated in FIG. 29, the display control unit 24 changes the display position of the application display screen 150 in connection with the change of the display position of the menu bar 120 so that the display screen 100 is displayed in a state indicated in FIG. 30.

As described above, as to the electronic whiteboard 2, if the display position change icon 130 of the menu bar 120 displayed on the display 220 is selected when the Launcher 102 is activated, the electronic whiteboard 2 receives the change request of the display position of the menu bar 120. Then, the electronic whiteboard 2 changes the display position of the application display screen 150 of the external application 103 having set the link setting with the menu bar 120 to "ON," in connection with the change of the display position of the menu bar 120. Thus, the electronic whiteboard 2 can control the display position of the application display screen 150 based on the display position of the menu bar 120, with which the operation screen having improved the user's operability can be provided.

On the other hand, the electronic whiteboard 2 does not change the display position of the application display screen 150 of the external application 103 having set the link setting with the menu bar 120 to "OFF" even if the display position of the menu bar 120 is changed. Therefore, the electronic whiteboard 2 can determine whether or not the display position of the application display screen 150 is changed in connection with the change of the display position of the menu bar 120 by switching the link setting with the menu bar 120, with which the display screen of the electronic whiteboard 2 can be changed flexibly.

Figure 33:
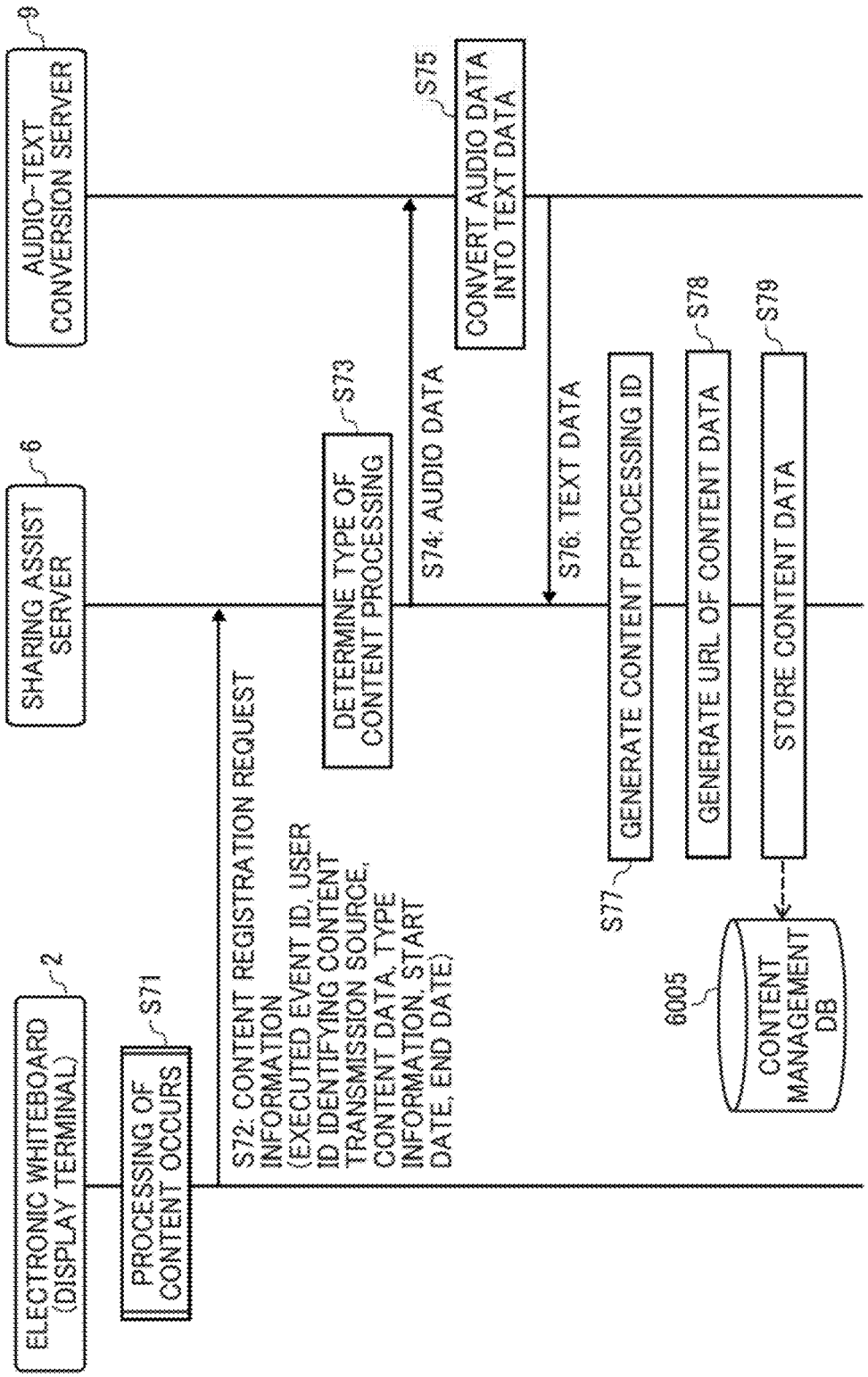
FIG. 33 is a sequence diagram illustrating a process of registering executed event history, according an embodiment of the disclosure.
Figure 34:
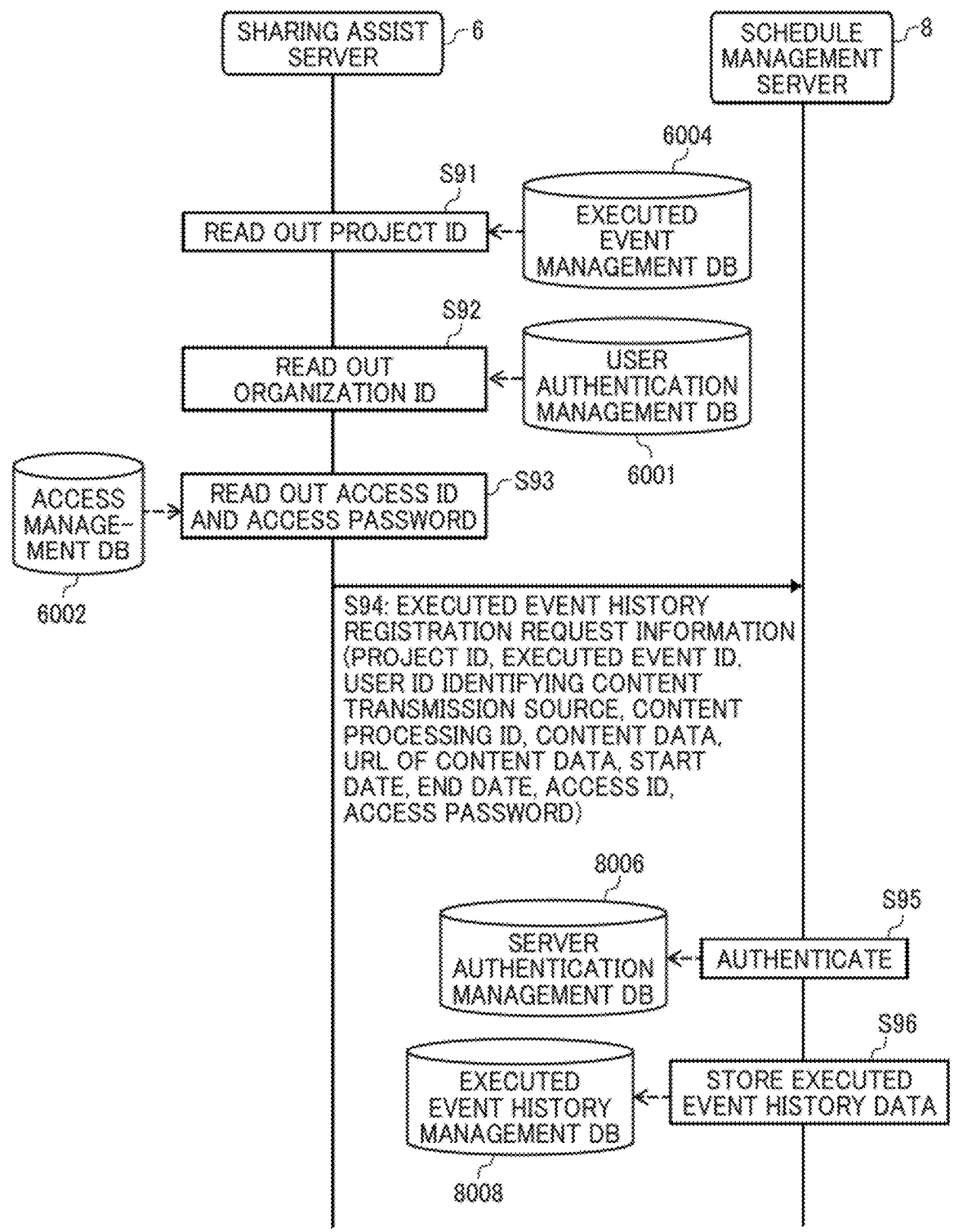
FIG. 34 is a sequence diagram illustrating the process of registering the executed event history, continued from FIG. 33, according an embodiment of the disclosure.

Registration Processing of Executed Event History:

Hereinafter, a description is given of a registration process of the executed event history with reference to FIGS. 33 to 38. FIGS. 33 and 34 are example sequence diagrams illustrating a process of registering the executed event history.

At first, the determination unit 25 of the electronic whiteboard 2 determines a type of content processing for the executing event (step S71). Specifically, if the content is audio data generated by the recording performed by the image/audio processing unit 23, the determination unit 25 determines that the type of content processing is "recording." If the content is image data acquired by snapshot (capturing) by the image/audio processing unit 23, the determination unit 25 determines that the type of the content processing is "snapshot." If the content is file data of reference material transmitted by the transmission/reception unit 21, the determination unit 25 determines that the type of the content processing is "reference material transmission."

Then, the transmission/reception unit 21 transmits registration request information indicating a request for registering the generated content to the sharing assistant server 6 (step S72). In this configuration, the transmission/reception unit 21 automatically transmits the registration request information each time the content is generated. The registration request information includes, for example, executed event ID, user ID identifying a content transmission source (e.g., a user who has transmitted the content), content data, information on type of content processing (e.g., recording, snapshot, transmission), and start date and end date of content processing. Accordingly, the transmission/reception unit 61 of the sharing assistant server 6 receives the registration request information.

Then, when the transmission/reception unit 61 receives the registration request information including the type information in step S72, the determination unit 65 of the sharing assistant server 6 determines the type of content processing based on the type information included in the registration request information (step S73).

If the determination unit 65 determines that the type of content processing is "recording," the transmission/reception unit 61 of the sharing assistant server 6 transmits audio data, which is the content data, to the audio-text conversion server 9 (step S74). Accordingly, the transmission/reception unit 91 of the audio-text conversion server 9 receives the audio data in step S74. If the type of content processing is other than "recording," the sharing assistant server 6 proceeds to step S77 without performing steps S74 to S76.

Then, the conversion unit 93 of the audio-text conversion server 9 converts the audio data received by the transmission/reception unit 91 into text data (step S75).

Then, the transmission/reception unit 91 transmits the text data converted by the conversion unit 93 to the sharing assistant server 6 (step S76). With this configuration, the transmission/reception unit 61 of the sharing assistant server 6 receives the text data.

Then, the generation unit 64 generates a unique content processing ID identifying the content processing generated by the event (step S77).

Further, the generation unit 64 generates a URL of the content data indicating the detail of content (step S78).

Then, the writing/reading unit 69 stores the executed event ID, the type of content processing, the start date of content processing, the end date of content processing received in step S72, the content processing ID generated in step S77, and the URL indicating a storage destination of the content generated in step S78 into the content management DB 6005 in association with each other, for the executed event ID (step S79).

Then, as indicated in FIG. 34, the writing/reading unit 69 of the sharing assistant server 6 searches the executed event management DB 6004 using the executed event ID received in step S72 as a search key to read out the corresponding project ID (step S91).

Then, the writing/reading unit 69 searches the user authentication management DB 6001 using the user ID identifying the content transmission source as a search key to read out the corresponding organization ID (step S92).

Then, the writing/reading unit 69 searches the access management DB 6002 using the organization ID read out in step S92 as a search key to read out the corresponding access ID and access password (step S93).

Then, the transmission/reception unit 61 transmits, to the schedule management server 8, executed event history registration request information indicating a request for registering the executed event history with the content data (step S94). The executed event history registration request information includes the project ID read out in step S91, the executed event ID, the user ID identifying the content transmission source, the content data, the start date and end date of content processing, received in step S72, the content processing ID generated in step S77, the URL of the content data generated in step S78, and the access ID and access password read out in step S93. Accordingly, the transmission/reception unit 81 of the schedule management server 8 receives the executed event history registration request information.

Then, in the schedule management server 8, the authentication unit 82 authenticates the sharing assistant server 6 using the access ID, the access password and the server authentication management DB 8006 (step S95). Since this authentication processing is the same as the authentication processing in step S38, the description thereof will be omitted. In the following, it is assumed that the sharing assistant server 6 is authorized for access.

Then, the writing/reading unit 89 stores various data (information) received in step S94 into the executed event history management DB 8008 (step S96). Specifically, the writing/reading unit 89 stores the various data (information) in association with the project ID and the executed event ID received in step S94, into the executed event history management DB 8008. As a result, the schedule management server 8 can control or manage data of the same content as the sharing assistant server 6.

As described above, the electronic whiteboard 2 can transmit the event ID of the event for a specific or particular project and the content generated by executing the corresponding event to the schedule management server 8. Further, the schedule management server 8 can store the received content in the executed event history management DB 8008 for each event ID associated with the project ID. With this configuration, the sharing system 1 allows a user to select an event belonging to the specific project when starting the event, with which the content generated by the event can be stored for each project.

Figure 35:
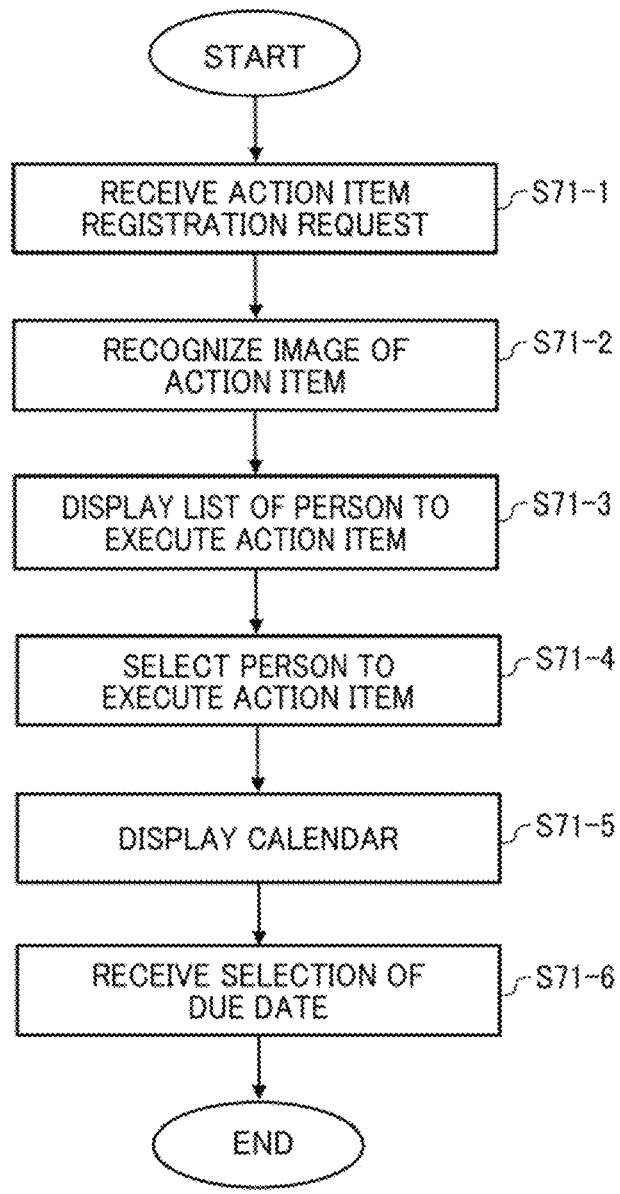
FIG. 35 is a flowchart illustrating a process of registering an action item, according an embodiment of the disclosure.
Figure 37:
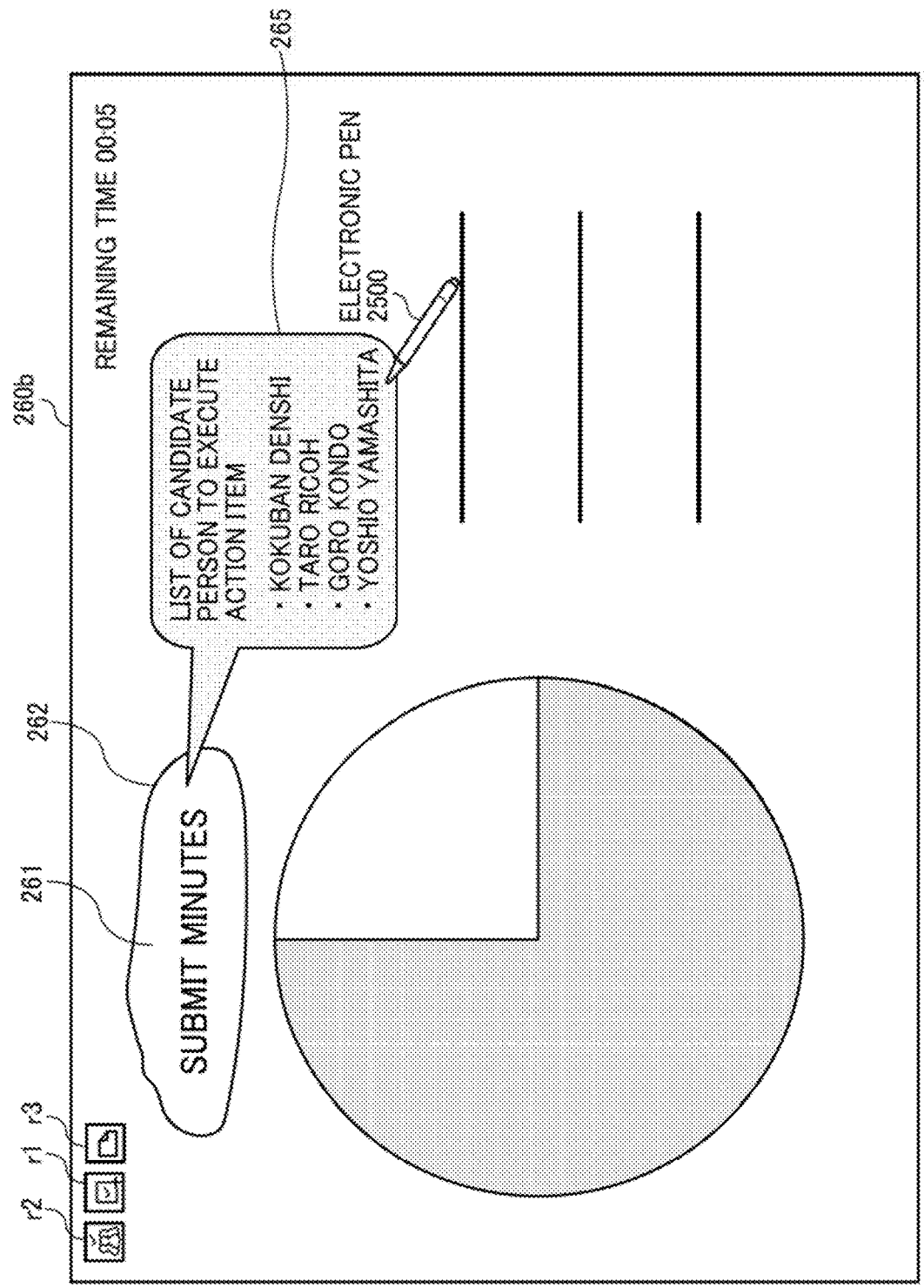
FIG. 37 is an illustration of a screen for displaying a candidate person list to execute an action item, according to an embodiment of the disclosure.
Figure 38:
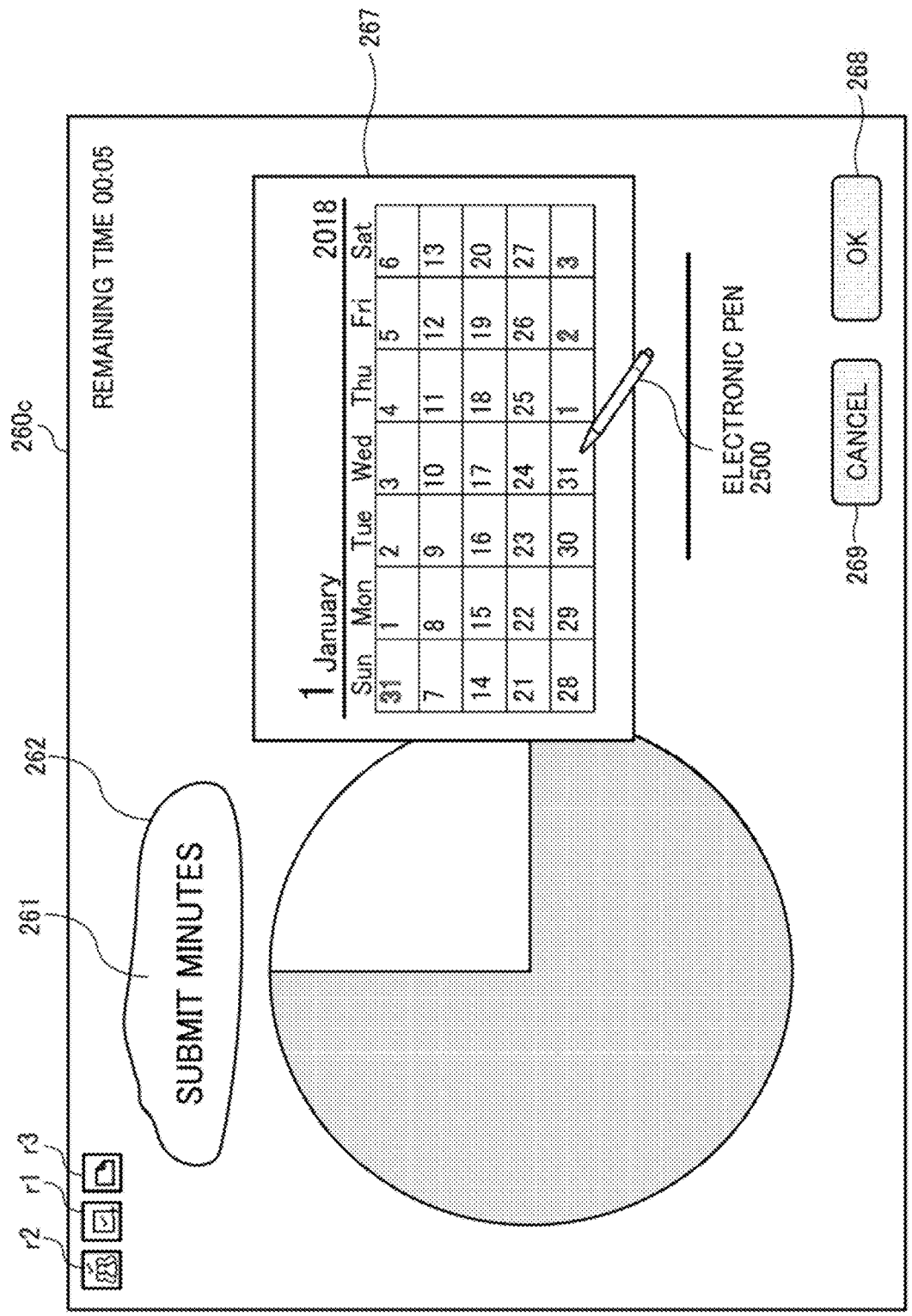
FIG. 38 is an illustration of a screen for displaying a screen indicating a calendar for setting a due date of an action item, according to an embodiment of the disclosure.

Registration of Action Item:

Hereinafter, a description is given of a process when the generated content is an action item with reference to FIGS. 35 to 38. FIG. 35 is a flowchart illustrating a process of registering an action item. FIG. 36 is an illustration of a screen for recognizing an action item. FIG. 37 is an example of a screen illustrating a candidate person list to execute an action item. FIG. 38 is an example of a screen illustrating a calendar for selecting the due date of an action item.

At first, as indicated in FIG. 35, when the user presses the icon r1 (FIG. 25), the receiving unit 22 receives the registration request of an action item (step S71-1).

Figure 36:
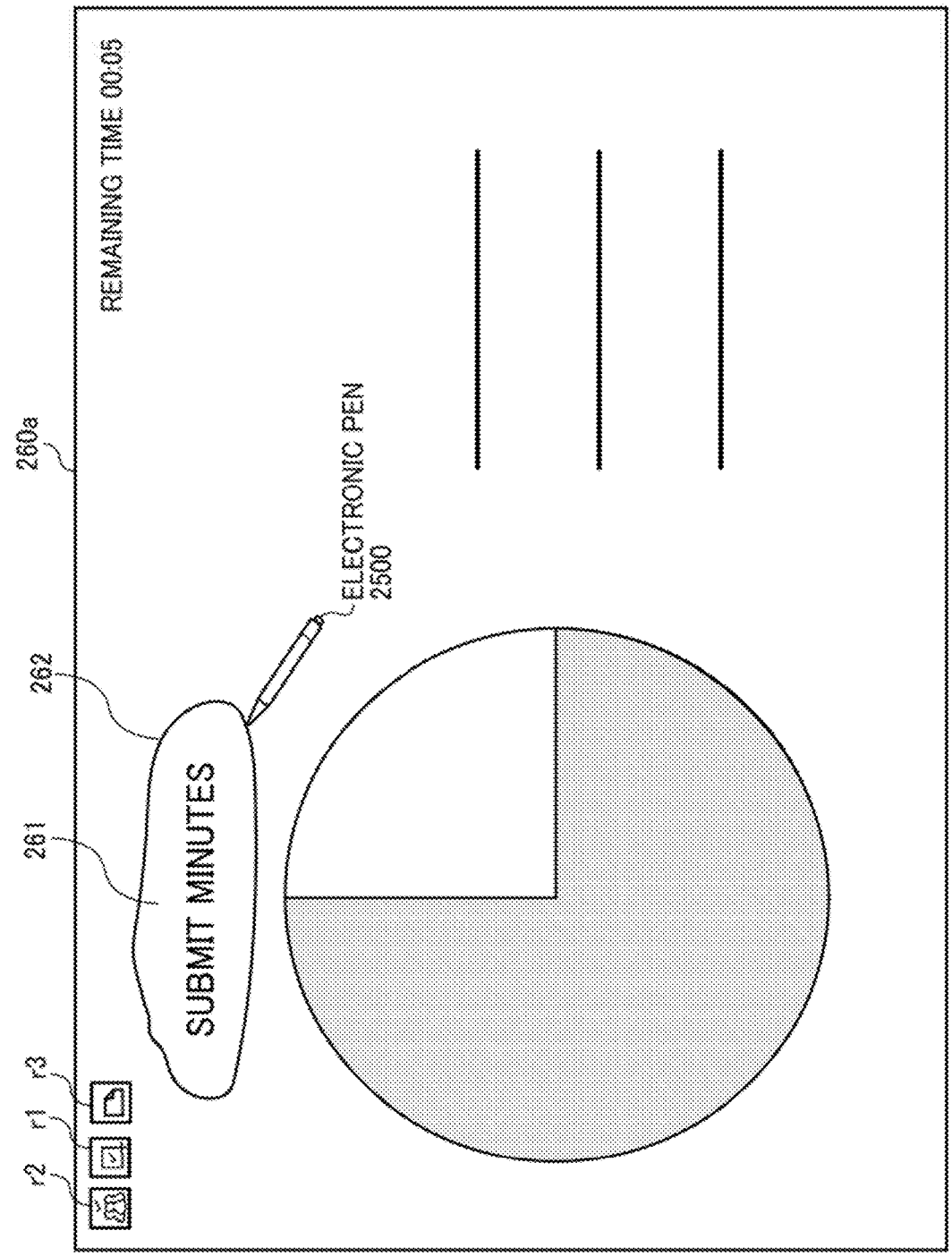
FIG. 36 is an illustration of a screen for recognizing an action item, according to an embodiment of the disclosure.

Then, as indicated in FIG. 36, when a user draws an action item (e.g., "submit minutes") on a drawing screen 260a of the electronic whiteboard 2 using the electronic pen 2500, and further draws a designated area 262 (line encircling area) encircling an image 261 (drawn image) indicating the content of the action item using the electronic pen 2500, the receiving unit 22 receives a designation of the designated area 262 including the image 261, and the recognition unit 26 recognizes the image 261 included in the designated area 262 (step S71-2).

Then, as indicated in FIG. 37, the display control unit 24 displays a candidate person list 265 of person to execute the action item on a drawing screen 260b (step S71-3).

Then, if the user selects a specific person to execute the action item using the electronic pen 2500 from the candidate person list 265, the receiving unit 22 receives a selection of the specific person (step S71-4).

Then, as indicated in FIG. 38, the display control unit 24 displays a calendar 267 used for designating the due date to execute the action item on a drawing screen 260c (step S71-5).

Then, if the user selects a specific due date on the calendar 267 using the electronic pen 2500 and presses an "OK" button 268, the receiving unit 22 receives a selection of the specific due date (step S71-6). The calendar 267 is an example of a due date designation screen. The due date designation screen can be a date list that does not include information on the day of week, such as Monday to Sunday. Further, if a "CACEL" button 269 is pressed, the input of specific due date is cancelled.

With this processing, the electronic whiteboard 2 transmits, to the sharing assistant server 6, the content registration request information indicating the registration request of the action item as the content registration request. The content registration request information includes the executed event ID indicating a specific event in which the action item has occurred, the user ID of the person who executes the action item selected in step S71-4, the image data of the action item recognized in step S71-2 (in this case, image data of "submit minutes"), and the due date to execute the action item received in step S71-5. That is, the transmission/reception unit 21 transmits the image inside the designated area 262 as the image data indicating the content of the action item generated in the executed event. Then, the transmission/reception unit 61 of the sharing assistant server 6 receives the content registration request information. Since the processing after the sharing assistant server 6 receives the content registration request information is the same as the processing indicated in FIGS. 33 and 34, the description thereof will be omitted.

Figure 39:
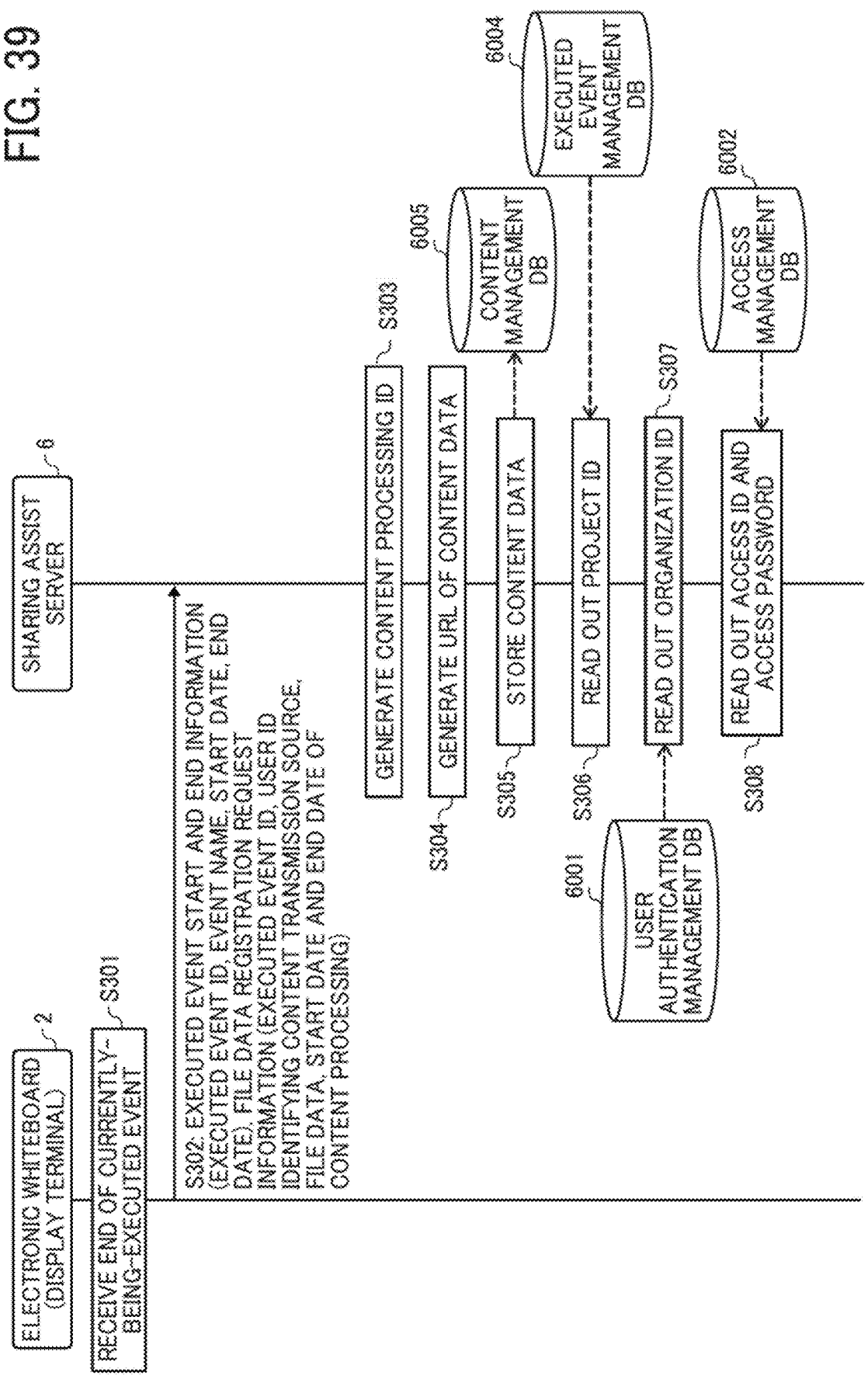
FIG. 39 is a sequence diagram illustrating a process of ending an event, according to an embodiment of the disclosure.
Figure 40:
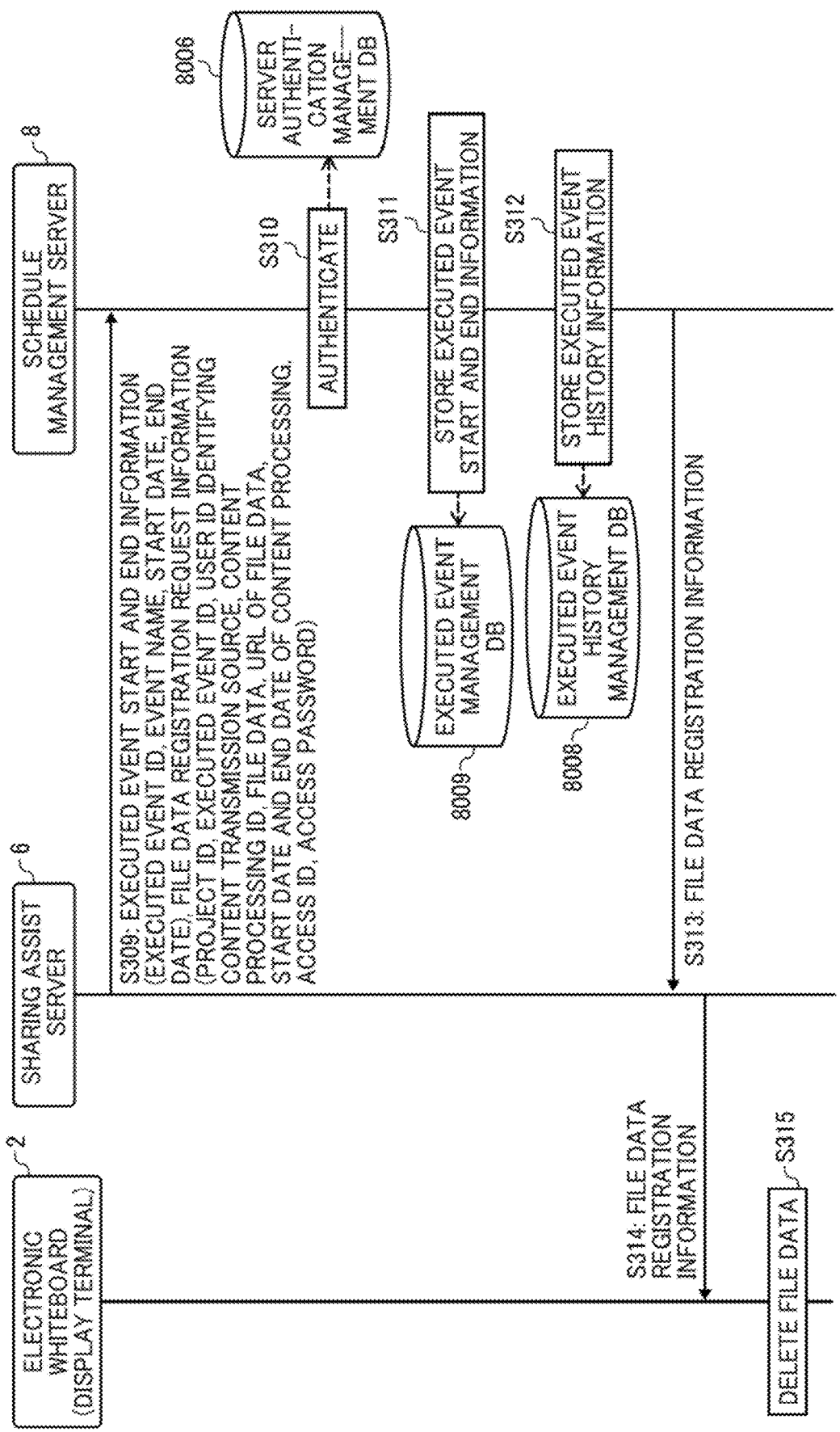
FIG. 40 is a sequence diagram illustrating the process of ending the event, continued from FIG. 39, according to an embodiment of the disclosure.

Ending of Event:

Hereinafter, a description is given of a process of ending or terminating an executing event with reference to FIGS. 39 to 43. FIGS. 39 and 40 are example sequence diagrams illustrating a process of ending or terminating an event. FIG. 41 is an example of an event end screen displayed on the electronic whiteboard 2. FIG. 42 is an example of a file upload screen of file data displayed on the electronic whiteboard 2. FIG. 43 in an example of an upload completion screen of file data displayed on the electronic whiteboard 2.

If a user presses the operation icon 125g included in the menu bar 120 on the display screen 100 (FIG. 27), the receiving unit 22 receives an end of the currently-being-executed event (step S301).

Then, the transmission/reception unit 21 transmits, to the sharing assistant server 6, the executed event start and end information indicating the start date and the end date of the executed event, and the file data registration request information indicating a request for registering the file data (step S302). The executed event start and end information includes the executed event ID, the event name, and the start date and the end date of the executed event. Further, the file data registration request information includes the executed event ID, the user ID identifying the content transmission source, the file data, and the start date and end date of the content processing. With this configuration, the transmission/reception unit 61 of the sharing assistant server 6 receives the executed event start and end information and the file data registration request information.

Then, the generation unit 64 of the sharing assistant server 6 generates a unique content processing ID identifying the content processing generated by the event (step S303).

Further, the generation unit 64 generates a URL of the content data indicating the detail of content (step S304).

Then, the writing/reading unit 69 stores, for each of the executed event ID, the executed event ID and the type of content processing, the start date and end date of the content processing received in step S302, the content processing ID generated in step S303, and the URL indicating a storage destination of the content generated in step S304 into the content management DB 6005 in association with each other (step S305).

Then, the writing/reading unit 69 of the sharing assistant server 6 searches the executed event management DB 6004 using the executed event ID received in step S72 as a search key to read out the corresponding project ID (step S306).

Then, the writing/reading unit 69 searches the user authentication management DB 6001 using the user ID identifying the content transmission source as a search key to read out the corresponding organization ID (step S307).

Then, the writing/reading unit 69 searches the access management DB 6002 using the organization ID read out in step S92 as a search key to read out the corresponding access ID and access password (step S308).

Then, as indicated in FIG. 40, the transmission/reception unit 61 transmits, to the schedule management server 8, the executed event start and end information and the file data registration request information indicating the request for registering the file data received in step S302 (step S309). The file data registration request information includes the project ID read out in step S306, the executed event ID, the user ID identifying the content transmission source, the file data, and the start date and end date of content processing received in step S302, the content processing ID generated in step S303, the URL of the file data generated in step S304, and the access ID and access password read out in step S308. With this configuration, the transmission/reception unit 81 of the schedule management server 8 receives the executed event start and end information and the file data registration request information.

Then, in the schedule management server 8, the authentication unit 82 authenticates the sharing assistant server 6 using the access ID and access password (step S310). Since this authentication processing is the same as the authentication processing in step S38, the description thereof will be omitted. In the following, it is assumed that the sharing assistant server 6 is authorized for access.

Then, the writing/reading unit 89 of the schedule management server 8 stores the executed event start and end information received in step S309 in the executed event management DB 8009 of FIG. 14B (step S311). In this case, the writing/reading unit 89 adds one record of the executed event start and end information to the executed event management table stored in the executed event management DB 8009.

Then, the writing/reading unit 89 stores various data (information) received in step S309 into the executed event history management DB 8008 as executed event history information or data (step S312). Specifically, the writing/reading unit 89 stores various data (information) including the file data into the executed event history management DB 8008 in association with the project ID and the executed event ID received in step S309. As a result, the schedule management server 8 can control or manage data of the same content as the sharing assistant server 6.

Then, the transmission/reception unit 81 transmits, to the sharing assistant server 6, file data registration information indicating that the file data has been registered (step S313). Then, the transmission/reception unit 61 of the sharing assistant server 6 receives the file data registration information.

Then, the transmission/reception unit 61 of the sharing assistant server 6 transmits, to the electronic whiteboard 2, the file data registration information received from the schedule management server 8 (step S314). Then, the transmission/reception unit 21 of the electronic whiteboard 2 receives the file data registration information.

Then, after the transmission/reception unit 21 receives the file data registration information, the writing/reading unit 29 of the electronic whiteboard 2 deletes the file data stored in the specific storage region of the memory 2000 (step S315). With this configuration, the file data transmitted to the sharing assistant server 6 can be deleted from the electronic whiteboard 2, with which the risk of leaking the conference information can be reduced.

Hereinafter, a description is given of a transition of screens displayed on the electronic whiteboard 2 when terminating or ending the executing event. At first, in step S301, if the receiving unit 22 receives the end of the currently-being-executed event, the display control unit 24 causes the display 508 to display an event end screen 270, indicated in FIG. 41, on the display 508 of the PC 5. The event end screen 270 includes, for example, a toolbar region 271, a file display region 272, a file upload selection region 273, a "Close" button 278 to proceed to the ending of the executing event, and a "CANCEL" button 279 to cancel the end processing of the executing event.

The toolbar region 271 displays images indicating the icons r1, r2 and r3 indicated in FIG. 25. The file display region 272 displays file data images 272a, 272b and 272c identifying file data of reference files stored in the specific storage region of the memory 2000. The file upload selection region 273 includes, for example, a check box (an example of a selection region) that receives a selection of whether or not the file data corresponding to the file data image displayed in the file display region 272 is uploaded to the sharing assistant server 6. The event end screen 270 is an example of a selection screen.

When the receiving unit 22 receives a selection of the "Close" button 278 while the file upload selection region 273 is being selected, the display control unit 24 causes the display 220 to display a file upload screen 280a as indicated in FIG. 42. The file upload screen 280a is being displayed on the display 220 when the file data stored in the specific storage region of the memory 2000 is being uploaded to the sharing assistant server 6. The file upload screen 280a includes, for example, an event name 281 of an event to be ended, end date and time 282 of the event, an upload progress display region 283 of the file data, and "CANCEL" button 288 to interrupt or stop the uploading of the file data. The upload progress display region 283 displays the number of file data to be uploaded (e.g., "3" in FIG. 42) and the number of file data that has been uploaded (e.g., "0" in FIG. 42).

When the uploading of the file data is completed, the display control unit 24 displays an upload completion screen 280b as indicated in FIG. 43. The upload completion screen 280b includes, for example, a "Close" button 289 to be pressed when to end the event. When the upload completion screen 280b is displayed on the display 220, as indicated in step S315 (FIG. 40), the writing/reading unit 29 of the electronic whiteboard 2 deletes the file data, which has been uploaded, from the specific storage region of the memory 2000.

On the other hand, if the uploading of the file data fails while the file upload screen 280a is being displayed on the display 220, the display control unit 24 displays information (e.g., file name) identifying the file data that has failed to be uploaded. With this configuration, for example, when a failure of the communication network 10 occurs, the event participant can bring back the file data created or edited in the event, which has failed to be uploaded, by printing the file data or by storing the file data in the USB memory 2600 connected to the electronic whiteboard 2.

Further, if the file data still remains in the specific storage region of the memory 2000 after the event is ended, the writing/reading unit 29 of the electronic whiteboard 2 can delete the file data stored in the specific storage region, for example, at the start of the next event that uses the same electronic whiteboard 2. Thus, the electronic whiteboard 2 can reduce the risk of leakage of the conference information According to the above described embodiment, as indicated in FIG. 26 and FIGS. 29 to 32, the electronic whiteboard 2 (an example of the display terminal) includes the Launcher 102 (an example of the second application) that activates the external application 103 (an example of the first application) that displays the application display screen 150 (an example of the first operation display screen) on the display 220 (an example of display unit). The electronic whiteboard 2 includes the display control unit 24 (an example of the display control unit) that displays the menu bar 120 (an example of the second operation display screen) used for receiving an operation to be used for executing the processing by the Launcher 102. The electronic whiteboard 2 includes the receiving unit 22 (an example of the receiving unit) for receiving a request to change the display position of the menu bar 120 displayed on the display 220. When the display position change icon 130 (an example of the reception area), included in the menu bar 120 displayed on the display 220 used for changing the display position of the menu bar 120, is selected, the display control unit 24 can change the display position of the application display screen 150 displayed on the display 220. With this configuration, the electronic whiteboard 2 can control the process of changing the display position of the application display screen 150 based on the selection of the display position change icon 130, with which the operation screen having improved the user's operability can be provided.

Further, according to the above described embodiment, as indicated in FIG. 26 and FIGS. 29 to 32, the display control unit 24 (an example of the display control unit) of the electronic whiteboard 2 (an example of the display terminal) changes the display position of the application display screen 150 (an example of the first operation display screen) in connection with the display position of the menu bar 120 (an example of the second operation display screen) to be changed when the display position change icon 130 (an example of the reception area) included in the menu bar 120 is selected. With this configuration, the electronic whiteboard 2 can change the display position of the application display screen 150 in connection with the display position of the menu bar 120, with which the display position of the application display screen 150 can be set at the desired position by simply changing the display position of the menu bar 120.

Further, according to the above described embodiment, as indicated in FIGS. 26, 29 and 30, the display control unit 24 (an example of the display control unit) of the electronic whiteboard 2 (an example of the display terminal) changes the display position of the application display screen 150 (an example of the first operation display screen) by displaying the application display screen 150 adjacent to the menu bar 120 (an example of the second operation display screen). With this configuration, the electronic whiteboard 2 can display the application display screen 150 adjacent to the menu bar 120 displayed at a position where the user is easy to operate, with which the operation screen having improved the user's operability can be provided.

Further, according to the above described embodiment, as indicated in FIGS. 26, 29 and 30, the display control unit 24 (an example of the display control unit) of the electronic whiteboard 2 (an example of the display terminal) can change the display position of the application display screen 150 (an example of the first operation display screen) in connection with the display position of the menu bar 120 (an example of the second operation display screen). With this configuration, the electronic whiteboard 2 can change the display position of the application display screen 150 each time the display position of the menu bar 120 is changed, so that the display position of the application display screen 150 does not need to be changed manually, with which the operation screen having improved the user's operability can be provided.

Further, according to the above described embodiment, as indicated in FIGS. 8, 26 and FIGS. 29 to 32, the electronic whiteboard 2 (an example of the display terminal) includes the writing/reading unit 29 (an example of the storage control unit) for storing the link setting (an example of the setting information) indicating whether or not there is a link to the change of the display position of the menu bar 120 (an example of the second operation display screen) in the process management DB 2001 (an example of the storage region). The display control unit 24 (an example of the display control unit) of the electronic whiteboard 2 (an example of the display terminal) can change the display position of the application display screen 150 (an example of the first operation display screen) in connection with the display position of the menu bar 120 to be changed when the display position change icon 130 (an example of the reception area) is selected when the link setting is set "ON" for the change of the display position of the menu bar 120. Further, the display control unit 24 does not change the display position of the application display screen 150 when the link setting is set "OFF" for the change of the display position of the menu bar 120. With this configuration, the electronic whiteboard 2 can change the display position of the application display screen 150 based on the link setting with respect to the menu bar 120, with which the display screen of the electronic whiteboard 2 can be changed flexibly.

Further, as to the above described embodiment, as indicated in FIGS. 8, 26 and FIGS. 29 to 32, the application control unit 27 (an example of the first acquisition unit) of the electronic whiteboard 2 (an example of the display terminal) acquires the process ID (an example of the process identification information) identifying the particular processing of the activated external application 103 (an example of the first application) and acquires the display position information indicating the display position of the application display screen 150 (an example of the first operation display screen) based on the acquired process ID. Further, the writing/reading unit 29 (an example of the storage control unit) of the electronic whiteboard 2 stores the link setting (an example of the setting information) in the process management DB (an example of the storage region) in association with the acquired process ID and the operation display screen information. With this configuration, the electronic whiteboard 2 can change the display position of the application display screen 150 for each of the external application 103 by controlling the link setting with respect to the menu bar 120 for each of the activated external applications 103, with which the display screen of the electronic whiteboard 2 can be changed flexibly.

Further, as to the above described embodiment, as indicated in FIGS. 28 to 32, the application display screen 150 (an example of the first operation display screen) includes the docking icon 151 (an example of the input region) that receives an input for switching the link or not-link with respect to the changing of the display position of the menu bar 120 (an example of the second operation display screen) set in the link setting (an example of the setting information). The application control unit 27 (an example of the setting information switching unit) of the electronic whiteboard 2 (an example of the display terminal) switches the link setting stored in the process management DB 2001 (an example of the storage region) when the input to the docking icon 151 is received. With this configuration, the electronic whiteboard 2 can change the display position of the application display screen 150 by switching the link setting with respect to the menu bar 120, with which the display screen of the electronic whiteboard 2 can be changed flexibly.

In conventional methods, even if a display position of a launcher application (e.g., second application), which is used to activate an external service application (e.g., first application), on a window (e.g., operation display screen) is changed, a display position of the external service application on the window, activated by the launcher application, cannot be changed. Therefore, there has been an issue of improving the user's operability on displaying style of a plurality of applications on a display.

As to the above described embodiment, an operation display screen that improves user's operability can be displayed.

The functions of the embodiment described above can be implemented by one or more processing circuits. Herein, the term "processing circuit" includes a processor programmed to execute each function by the software, such as a processor implemented by an electronic circuit, application specific integrated circuit (ASIC), digital signal processor (DSP), field programmable gate array (FPGA), system on a chip (SOC), graphics processing unit (GPU), and conventional circuit module.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the above described disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

What is claimed is:

1. A display terminal, comprising:
    a memory that stores a second application used for activating a first application that causes the display terminal to control a display to display a first operation display screen; and
    circuitry configured to
        control the display to display the first operation display screen by the first application and to display a second operation display screen by the second application, wherein
            the first operation display screen includes a first reception area for receiving a first operation to link a change of the display position of the first operation display screen to a change of the display position of the second operation display screen, and
            the second operation display screen initiates a specific processing, the second operation display screen including a second reception area for receiving a second operation to change the display position of the second operation display screen;
        in response to reception of the first operation in the first reception area and the second operation input in the second reception area, control the display to change the display position of the first operation display screen in accordance with the change to the display position of the second operation display screen; and
        in response to reception of the second operation in the second reception area without reception of the first operation in the first reception area, control the display to change the display position of the second operation display screen without changing the display position of the first operation display screen.

2. The display terminal according to claim 1, wherein the circuitry changes the display position of the first operation display screen in connection with the display position of the second operation display screen so as to display the first operation display screen adjacent to the second operation display screen.

3. The display terminal according to claim 2, wherein in a case that the second operation of the second reception area is received while the first operation display screen is displayed adjacently at one side of the second operation display screen, the circuitry changes the display position of the first operation display screen so as to display the first operation display screen adjacent to another side of the second operation display screen.

4. The display terminal according to claim 1, wherein
    the memory stores setting information indicating whether a link is set for the display position of the first operation display screen and a change of the display position of the second operation display screen, and
    the circuitry changes the display position of the first operation display screen based on the stored setting information.

5. The display terminal according to claim 4, wherein
    in a case that the setting information indicates that the link is set for the display position of the first operation display screen and the change of the display position of the second operation display screen, the circuitry changes the display position of the first operation display screen in connection with the display position of the second operation display screen to be changed in response to reception of the second operation in the second reception area, and
    in a case that the setting information indicates that the link is not set for the display position of the first operation display screen and the change of the display position of the second operation display screen, the circuitry does not change the display position of the first operation display screen even when the display position of the second operation display screen is changed.

6. The display terminal according to claim 4, wherein
    the circuitry is configured to acquire process identification information identifying particular processing on an operating system of the first application in response to the first application being activated,
    the circuitry is configured to acquire operation display screen information including display position information indicating the display position of the first operation display screen based on the acquired process identification information, and the memory stores the setting information in association with the acquired process identification information and the acquired operation display screen information.

7. The display terminal according to claim 6, wherein in a case that the setting information indicates that the link is not set for the display position of the first operation display screen and the change of the display position of the second operation display screen, the circuitry displays the first operation display screen at a display position indicated by the display position information.

8. The display terminal according to claim 4, wherein
the circuitry is configured to switch an ON-state and an OFF-state of the link between the display position of the first operation display screen and the change of the display position of the second operation display screen indicated by the setting information stored in the memory, and the circuitry switches the setting information stored in the memory in response to reception of the first operation in the first reception area.

9. The display terminal according to claim 4, wherein the circuitry updates the setting information to indicate that the link is set in response to reception of the first operation in the first reception area.

10. The display terminal according to claim 9, wherein the circuitry further updates the setting information to indicate that the link is no longer set in response to another first operation in the first reception area.

11. The display terminal according to claim 1, wherein
the second application is a launcher application operable on an operating system, and the first application is activated in response to performing a pre-set input operation on the second operation display screen.

12. The display terminal according to claim 1, wherein the first reception area is a button.

13. A method of controlling display of information on a display terminal, the display terminal storing a second application used for activating a first application that causes the display terminal to control a display to display a first operation display screen, the method comprising:
controlling the display to display the first operation display screen by the first application and to display a second operation display screen by the second application, wherein
the first operation display screen includes a first reception area for receiving a first operation to link a change of the display position of the first operation display screen to a change of the display position of the second operation display screen, and
the second operation display screen initiates a specific processing, the second operation display screen including a second reception area for receiving a second operation to change the display position of the second operation display screen;
in response to reception of the first operation in the first reception area and the second operation input in the second reception area, controlling the display to change the display position of the first operation display screen in accordance with the change to the display position of the second operation display screen; and
in response to reception of the second operation in the second reception area without reception of the first operation in the first reception area, controlling the display to change the display position of the second operation display screen without changing the display position of the first operation display screen.

14. The method according to claim 13, further comprising:
storing setting information indicating whether a link is set for the display position of the first operation display screen and a change of the display position of the second operation display screen; and
changing the display position of the first operation display screen based on the stored setting information.

15. The method according to claim 14, further comprising updating the setting information to indicate that the link is set in response to reception of the first operation in the first reception area.

16. The method according to claim 15, further comprising updating updates the setting information to indicate that the link is no longer set in response to another first operation in the first reception area.

17. The method according to claim 13, further comprising changing changes the display position of the first operation display screen in connection with the display position of the second operation display screen so as to display the first operation display screen adjacent to the second operation display screen.

18. The method according to claim 17, further comprising:
in a case that the second operation of the second reception area is received while the first operation display screen is displayed adjacently at one side of the second operation display screen, changing the display position of the first operation display screen so as to display the first operation display screen adjacent to another side of the second operation display screen.

19. The method according to claim 13, wherein
the second application is a launcher application operable on an operating system, and
the first application is activated in response to performing a pre-set input operation on the second operation display screen.

20. The method according to claim 13, wherein the first reception area is a button.

21. A non-transitory computer readable storage medium storing one or more instructions that, when executed by one or more processors, cause the one or more processors to perform a method of controlling display of information on a display terminal, the display terminal storing a second application used for activating a first application that causes the display terminal to control a display to display a first operation display screen, the method comprising:
controlling the display to display the first operation display screen by the first application and to display a second operation display screen by the second application, wherein
the first operation display screen includes a first reception area for receiving a first operation to link a change of the display position of the first operation display screen to a change of the display position of the second operation display screen, and
the second operation display screen initiates a specific processing, the second operation display screen including a second reception area for receiving a second operation to change the display position of the second operation display screen;
in response to reception of the first operation in the first reception area and the second operation input in the second reception area, controlling the display to change the display position of the first operation display screen in accordance with the change to the display position of the second operation display screen; and in response to reception of the second operation in the second reception area without reception of the first operation in the first reception area, controlling the display to change the display position of the second operation display screen without changing the display position of the first operation display screen.

22. The non-transitory computer readable storage medium according to claim 21, wherein the second application is a launcher application operable on an operating system, and the first application is activated in response to performing a pre-set input operation on the second operation display screen.

23. The non-transitory computer readable storage medium according to claim 21, wherein the first reception area is a button.

* * * * *